United States Patent [19]

Ueno et al.

[11] Patent Number: 5,166,859

[45] Date of Patent: Nov. 24, 1992

[54] LAMINATED SEMICONDUCTOR CERAMIC CAPACITOR WITH A GRAIN BOUNDARY-INSULATED STRUCTURE AND A METHOD FOR PRODUCING THE SAME

[75] Inventors: Iwao Ueno, Joyo; Yasuo Wakahata, Katano; Kimio Kobayashi, Hirakata; Kaori Shiraishi, Neyagawa; Akihiro Takami, Katano; Youichi Ogoshi, Neyagawa, all of Japan

[73] Assignee: Matsushita Electric Industrial Co., Ltd., Osaka, Japan

[21] Appl. No.: 812,350

[22] Filed: Dec. 20, 1991

[51] Int. Cl.$^5$ .................... H01G 4/10; H01G 7/00; C04B 33/32; H01B 1/06
[52] U.S. Cl. .................... 361/321; 29/25.42; 252/520; 264/61
[58] Field of Search ............ 361/320, 321; 29/25.42; 501/134–139; 264/61; 252/520

[56] References Cited

U.S. PATENT DOCUMENTS

| | | | |
|---|---|---|---|
| 4,290,041 | 9/1981 | Utsumi et al. | 338/21 |
| 4,519,942 | 5/1985 | Yamaoka et al. | 252/520 |
| 4,541,974 | 9/1985 | Yamaoka et al. | 264/61 |
| 4,607,018 | 8/1986 | Nishioka et al. | 501/135 |
| 4,799,127 | 1/1989 | Ono et al. | 361/321 |

FOREIGN PATENT DOCUMENTS

| | | |
|---|---|---|
| 54-53248 | 4/1979 | Japan . |
| 54-53250 | 4/1979 | Japan . |
| 57-27001 | 2/1982 | Japan . |
| 59-215701 | 12/1984 | Japan . |
| 2-215112 | 8/1990 | Japan . |
| 2-240904 | 9/1990 | Japan . |
| 2-248014 | 10/1990 | Japan . |

Primary Examiner—Donald A. Griffin
Attorney, Agent, or Firm—Panitch, Schwarze Jacobs & Nadel

[57] ABSTRACT

A laminated semiconductor ceramic capacitor with a grain boundary-insulated structure comprises a semiconductor ceramic block with a grain boundary-insulated structure, a plurality of Ni inner electrodes and outer electrodes, wherein the Ni inner electrodes are obtained from a paste containing a powder prepared by solubilizing at least one compound containing an atom selected from the group consisting of Li, Na and K into Ni or an Ni containing compound; the Ni inner electrodes are placed in a substantially parallel manner within the ceramic block to reach to the corresponding opposite edges of the ceramic block alternatively one by one; and the outer electrodes are electrically connected to the corresponding edges of the inner electrodes, respectively.

43 Claims, 22 Drawing Sheets

LAMINATED SEMICONDUCTOR CERAMIC CAPACITOR WITH A GRAIN BOUNDARY-INSULATED STRUCTURE AND A METHOD FOR PRODUCING THE SAME

BACKGROUND OF THE INVENTION

1. Field of the Invention

The present invention relates to a laminated semiconductor ceramic capacitor with a grain boundary-insulated structure and a method for manufacturing the same, and more particularly to a ceramic capacitor which absorbs both low voltage noises and high frequency noises under normal operational conditions, and works as a varistor against invading high voltage pulses and high voltage static electricity, thereby protecting built-in semiconductors and electronic equipment from being damaged by abnormal voltages caused by noises, pulses, and static electricity generated within the electronic equipment.

2. Description of the Prior Art

In recent years, semiconductor devices such as ICs and LSIs have been widely used in electronic equipment for the purpose of realizing multifunctional applications of the equipment and making the equipment light, small, and handy. However, the use of many semiconductor devices has caused the decrease in noise resistance of the equipment. In order to maintain the noise resistance of the electronic equipment, by-pass capacitors such as a film capacitor, a laminated ceramic capacitor, and a semiconductor ceramic capacitor have been integrated into power source lines of various kinds of ICs and LSIs. These capacitors exhibit excellent performances in absorbing low voltage noises and high frequency noises. However, these capacitors themselves do not have a function of absorbing high voltage pulses and high voltage static electricity, so that the invasion of high voltage pulses and high voltage static electricity causes the malfunction of the equipment, and the break-down of semiconductors and/or capacitors.

As a new type capacitor, which has sufficient pulse resistance and excellent pulse absorptivity as well as good noise absorptivity and stability with respect to temperature and frequency changes, a semiconductor ceramic capacitor with a grain boundary-insulated structure in which a varistor function is provided to an $SrTiO_3$ type semiconductor ceramic capacitor (hereinafter, this type of capacitor is referred to as a ceramic capacitor having a varistor function) has been developed. This kind of ceramic capacitor is disclosed in Japanese Laid-Open Patent Publication Nos. 57-27001 and 57-35303. Usually, this ceramic capacitor having a varistor function absorbs low voltage noises and high frequency noises, and when high voltage pulses and high voltage static electricity invade it, the capacitor works as a varistor, thereby protecting the electronic equipment and built-in semiconductors from abnormal voltages caused by noises, pulses, and static electricity generated in the electronic equipment. Thus, its applications have been increased in various fields.

Since electronic parts have been made lighter, smaller, more handy, and higher in their performance, there has been a strong demand for miniaturizing and achieving high performance of a ceramic capacitor having a varistor function. However, since a conventional ceramic capacitor having a varistor function is of a single-plate type, so that the effective electrode area becomes small when the capacitor is miniaturized, leading to a decrease in capacitance and inferior reliability. As a solution to the above-mentioned problems, it is considered that an electrode area be enlarged by laminating sheet-shaped electrodes.

In general, a capacitor which does not have a lamination structure is manufactured by a method comprising the steps of: sintering a ceramic sheet under a reducing atmosphere to make ceramics of the green sheet semiconductive; insulating a grain-boundary portion of the semiconductive ceramics by oxidizing the green sheet in air; and attaching an outer electrode to the resulting green sheet. However, when this method is applied to the above-mentioned laminated capacitor, the following problems arise. When the green sheet having an inner electrode on the surface thereof is laminated and sintered, cracks are generated or the inner electrode is oxidized so as to be insulated during the step of oxidizing because of the difference in coefficient of contraction between the inner electrode and the ceramics constituting the green sheet. Accordingly, it has been considered to be very difficult to manufacture a lamination-type capacitor having a varistor function (hereinafter, this type of capacitor is referred to as a laminated ceramic capacitor having a varistor function) by sintering a material of the ceramic capacitor having a varistor function and a material of the inner electrode at the same time, wherein the material of the ceramic capacitor includes the green sheets, a material of outer electrodes, etc. but which excludes the material of the inner electrode.

As a method for simultaneously sintering a material of the laminated ceramic capacitor having a varistor function and a material of the inner electrode, the following method for manufacturing a laminated ceramic capacitor having a varistor function has been developed and proposed, which employs processes disclosed in Japanese Laid-Open Patent Publication Nos. 54-53250 and 54-54250, comprising the steps of: printing a pattern corresponding to the inner electrode by using ceramic paste enriched in organic binder on the surface of the ceramic substrate; sintering the ceramic substrate to make the pattern of the inner electrode porous; and impregnating the porous pattern with electrically conductive metals under the appropriate pressure, or alternatively a step of forming a pattern of the inner electrode by a gilding or fusion method. However, these processes involve many production difficulties and they have not reached a practical level.

Japanese Laid-Open Patent Publication No. 59-215701 discloses a method comprising the steps of: forming a green sheet made of ceramic powder calcinated under a non-oxidizing atmosphere; printing a pattern of the inner electrode by using an electrically conductive paste mixed with a thermal diffusion material on the surface of the green sheet, the thermal diffusion material having the ability to form an electrically insulated layer in a grain boundary; and sintering the green sheet under the oxidizing atmosphere. Another method disclosed in Japanese Laid-Open Patent Publication No. 63-219115 comprises the steps of: forming a green sheet made of semiconductive ceramic powder as a main component, the main component being mixed with an oxidizing agent and/or a dispersing agent containing a glass component for the purpose of forming an insulated layer; alternately laminating the green sheets with a plurality of inner electrodes; and sintering the laminated sheets in air or under the oxidizing atmosphere. However, according to the above-mentioned two methods, sintering temperature is relatively low in the range of 1,000° to 1,200° C., so that the ceramics are not readily sintered and crystal grains do not come into contact with each other. The resulting ceramic capacitor which is not a completely sintered body entails shortcomings including: a relatively small electrical capacitance; a small value of voltage non-linear index (the non-liner index is a representative factor for showing charcteristics for a varistor); and instability of varistor voltage; and inferior reliability as a capacitor. Moreover, in Japanese Laid-Open Patent Publication No. 63-219115 involving the step of adding a glass material to the ceramic powder as an additive entails a problem in that a glass phase deposits in the crystal grain boundary, whereby the electrical characteristics tend to be degraded and the reliability of the capacitor becomes poor. Thus, this method has not reached a practical level.

Then, as described in Japanese Patent Application No. 1-36757, the present inventors have improved a method for producing a capacitor by using a composition of $SrTiO_3$ containing an excess amount of Ti as a semiconductor component and $MnO_2-SiO_2$ type compound as a base material; and have made it possible to develop a laminated ceramic capacitor with a varistor function which has inner electrodes essentially made of Au, Pt, Rh, Pd or Ni. Since Ni inner electrodes may cause the oxidation of Ni at relatively lower temperatures, thereby being insulated easily, a mixture of Ni and Pd, or a $SiTiO_3$ containing a slightly excess amount of Ti has been proposed to use as an inner electrode material. However, even in this case, because Ni may be oxidized at a re-oxidation temperature of 1200° C. or more, it is difficult to obtain a substantial resolution to the above-discussed disadvantages.

As a patent concerning the laminated capacitors having a varistor function, laminated voltage non-linear elements made of ceramic material such as ZnO, $Fe_2O_3$, or $TiO_2$ have been provided in Japanese Patent Publication No. 58-23921. This type of element has a very small capacitance. Therefore, although it exhibits excellent performance with respect to pulses having a relatively high voltage and absorption of static electricity, it exhibits little effect with respect to noises with a voltage below the varistor voltage or high frequency noises.

As described above, in the laminated ceramic capacitor having a varistor function using Ni as inner electrodes, Ni is oxidized at relatively low temperatures. Therefore, depending on the production method, Ni is oxidized and inner electrodes are insulated, whereby electrical characteristics cannot be obtained. Accordingly, it is expected that novel inner electrode compositions which prevent Ni from being oxidized and a method for manufacturing laminated ceramic capacitors having a varistor function using such Ni inner electrodes are being developed.

SUMMARY OF THE INVENTION

The laminated semiconductor ceramic capacitor with a grain boundary-insulated structure of this invention, which overcomes the above-discussed and numerous other disadvantages and deficiencies of the prior art, comprises a semiconductor ceramic block with a grain boundary-insulated structure, a plurality of Ni inner electrodes and outer electrodes, wherein the Ni inner electrodes are obtained from paste containing a powder prepared by solubilizing at least one compound containing an atom selected from the group consisting of Li, Na and K into Ni or an Ni containing compound; the Ni inner electrodes are placed in a substantially parallel manner within the ceramic block to reach the corresponding opposite edges of the ceramic block alternatively one by one; and the outer electrodes are electrically connected to the corresponding edges of the inner electrodes, respectively.

In a preferred embodiment, the outer electrodes of the capacitor are made of at least one metal selected from the group consisting of Pd, Ag, Cu, Zn, and Ni; an alloy thereof; or a mixture thereof.

In a preferred embodiment, the outer electrodes are obtained by solubilizing at least one compound containing an atom selected from the group consisting of Li, Na, and K; or a combination of at least one compound containing an atom selected from the group consisting of Li, Na, and K and at least one compound containing a Pd atom or a Pt atom into Ni or an Ni containing compound.

In a preferred embodiment, the outer electrodes comprise (1) lower outer electrodes which are obtained by solubilizing at least one compound containing an atom selected from the group consisting of Li, Na and K, or a combination of at least one compound containing an atom selected from the group consisting of Li, Na, and K and at least one compound containing a Pd atom or a Pt atom into Ni or an Ni containing compound, and (2) upper outer electrodes of an Ag or Ag-Pd type.

In a preferred embodiment, the outer electrodes are obtained by solubilizing at least one compound containing a Pd atom or a Pt atom into Ni or an Ni containing compound.

In a preferred embodiment, the outer electrodes comprise (1) lower outer electrodes which are obtained by solubilizing at least one compound containing a Pd atom or a Pt atom into Ni or an Ni containing compound, and (2) upper outer electrodes of an Ag or Ag-Pd type.

In a preferred embodiment, the grain boundary insulated semiconductor ceramic comprises as its main component $SrTiO_3$ containing an excess amount of Ti so as to make a molar ratio of Sr to Ti in the range of $0.95 \leq Sr/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; and a combination of at least one compound containing an Mn atom and at least one compound containing an Si atom, the total amount of said combination being in the range of 0.2 to 5.0 mol % in terms of $MnO_2$ and $SiO_2$, respectively.

In a preferred embodiment, the grain boundary insulated semiconductor ceramic further comprises at least one compound selected from the group consisting of $Na_2SiO_3$ and $Li_2SiO_3$ in the range of 0.05 to 2.0 mol %; at least one compound selected from the group consisting of $Na_2SiO_3$ and $Li_2SiO_3$ in the range of 0.05 to 2.0 mol %, and $Al_2O_3$ in the range of 0.05 to 2.0 mol %; or at least one compound selected from the group consisting of $NaAlO_2$ and $LiAlO_2$ in the range of 0.05 to 4.0 mol %.

In place of the above-mentioned $SrTiO_3$, $Sr_{(1-x)}Ba_xTiO_3$ or $Sr_{(1-x)}Ca_xTiO_3$ can be used.

A first method for manufacturing a laminated semiconductor ceramic capacitor with a grain boundary-insulated structure comprises the steps of:

calcinating a mixed powder of a ceramic composition for the formation of a grain boundary-insulated structure in air or in a nitrogen atmosphere;

forming green sheets by dispersing the calcinated powder in a solvent with an organic binder and molding the dispersed powder, the calcinated powder being ground before dispersing and after calcinating;

preparing a mixed powder containing at least one compound containing an atom selected from the group consisting of Li, Na, and K; and Ni or an Ni containing compound;

calcinating the mixed powder in air or in a nitrogen atmosphere to solubilize the compound containing an atom selected from the group consisting of Li, Na, or K into the Ni or an Ni containing compound;

grinding the calcinated mixed powder and mixing in a solvent with an organic binder, resulting in an inner electrode paste;

forming an inner electrode pattern by the application of the inner electrode paste on one surface of each of the green sheets except for the uppermost and lowermost sheets, terminals of the inner electrodes being extended to reach the corresponding opposite edges of the green sheets alternatively one by one;

laminating and compressing the green sheets with the inner electrode pattern with the uppermost and lowermost green sheets, followed by calcinating the resulting green sheets in air;

sintering the calcinated sheets in a reducing atmosphere, resulting in a sintered ceramic body with inner electrodes;

re-oxidizing the sintered ceramic body in air;

covering the edges of the sintered ceramic sheets with an outer electrode paste, terminals of the inner electrodes being exposed to the edges; and baking the paste to form outer electrodes so that the inner electrodes are electrically connected to the outer electrodes.

A second method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the resulting green sheets in air;

raising the temperature of the calcinated sheets to a temperature in the range from 1,000° to 1,200° C. in a nitrogen atmosphere and sintering the calcinated sheets in a reducing atmosphere, resulting in a sintered ceramic body with inner electrodes;

re-oxidizing the sintered ceramic body in air;

covering the edges of the sintered ceramic body with an outer electrode paste, terminals of the inner electrodes being exposed to the edges, and baking the paste to form outer electrodes so that the inner electrodes are electrically connected to the outer electrodes.

A third method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method;

covering the edges of the green sheets with an outer electrode paste, terminals of the inner electrodes being exposed to the edges, followed by calcinating the resulting green sheets in air;

sintering the calcinated sheets in a reducing atmosphere, resulting in a sintered ceramic body with inner and outer electrodes;

re-oxidizing the sintered ceramic body in air; and re-reducing the outer electrodes.

A fourth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method and covering the edges of the green sheets with an outer electrode paste, terminals of the inner electrodes being exposed to the edges, followed by calcinating the resulting green sheets in air;

raising the temperature of the calcinated sheets to a temperature in the range from 1,000° to 1,200° C. in a nitrogen atmosphere and sintering the calcinated laminated sheets in a reducing atmosphere, resulting in a sintered ceramic body with inner and outer electrodes;

re-oxidizing the sintered ceramic body in air; and re-reducing the outer electrodes.

A fifth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the resulting green sheets in air;

covering the edges of the calcinated ceramic sheets with an outer electrode paste, terminals of the inner electrodes being exposed to the edges, and sintering the calcinated ceramic sheets in a reducing atmosphere, resulting in a sintered ceramic body with inner and outer electrodes;

re-oxidizing the sintered ceramic body in air; and re-reducing the outer electrodes.

A sixth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the resulting green sheets in air;

covering the edges of the calcinated ceramic sheets with an outer electrode paste, terminals of the inner electrodes being exposed to the edges;

raising the temperature of the calcinated sheets to a temperature in the range from 1,000° to 1,200° C. in a nitrogen atmosphere and sintering the calcinated sheets in a reducing atmosphere, resulting in a sintered ceramic body with inner and outer electrodes;

re-oxidizing the sintered ceramic body in air; and re-reducing the outer electrodes.

A seventh method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method and covering the edges of the green sheets with a lower layer outer electrode paste, terminals of the inner electrodes being exposed to the edges, followed by calcinating the green sheets;

sintering the calcinated sheets in a reducing atmosphere, resulting in a sintered ceramic body with inner electrodes and lower layer outer electrodes;

applying an upper layer outer electrode paste containing Ag or a mixture of Ag and Pd on the lower layer outer electrodes; and baking the upper layer electrode paste in air or in a nitrogen atmosphere to form upper layer outer electrodes on the lower layer outer electrodes.

A eighth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method and covering the edges of the green sheets with a lower layer outer electrode paste, terminals of the inner electrodes being exposed to the edges, followed by calcinating the green sheets;

raising the temperature of the calcinated laminated sheets to a temperature in the range from 1,000° to 1,200° C. in a nitrogen atmosphere and sintering the calcinated sheets in a reducing atmosphere, resulting in a sintered ceramic body with inner electrodes and lower layer outer electrodes;

applying an upper layer outer electrode paste containing Ag or a mixture of Ag and Pd on the lower layer outer electrodes; and baking the upper layer electrode paste in air or in a nitrogen atmosphere to form upper layer outer electrodes on the lower layer outer electrodes in air or in a nitrogen atmosphere.

A ninth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method and covering the edges of the green sheets with a lower layer outer electrode paste containing Ni, terminals of the inner electrodes being exposed to the edges, followed by calcinating the green sheets;

sintering the calcinated green sheets in a reducing atmosphere, resulting in a sintered ceramic body with inner electrodes and lower layer outer electrodes;

re-oxidizing the sintered ceramic body in air;

re-reducing the lower layer outer electrodes;

applying an upper layer outer electrode paste containing Ag or a mixture of Ag and Pd on the lower layer outer electrodes; and baking the upper layer electrode paste to form upper layer outer electrodes on the lower layer outer electrodes in air or in a nitrogen atmosphere.

A tenth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method and covering the edges of the green sheets with a lower layer outer electrode paste containing Ni, terminals of the inner electrodes being exposed to the edges, followed by calcinating the green sheets;

raising the temperature of the calcinated sheets to a temperature in the range from 1,000° to 1,200° C. in a nitrogen atmosphere and sintering the calcinated sheets in a reducing atmosphere, resulting in a sintered ceramic body with inner electrodes and lower layer outer electrodes;

re-oxidizing the sintered ceramic body in air;

re-reducing the lower layer outer electrodes;

applying an upper layer outer electrode paste containing Ag or a mixture of Ag and Pd on the lower layer outer electrodes; and baking the upper layer electrode paste to form upper layer outer electrodes on the lower layer outer electrodes in air or in a nitrogen atmosphere.

A eleventh method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method and covering the edges of the green sheets with a lower layer outer electrode paste, terminals of the inner electrodes being exposed to the edges, followed by calcinating the green sheets;

sintering the calcinated sheets in a reducing atmosphere;

re-oxidizing the sintered sheets in air;

applying an upper layer outer electrode paste containing Ag or a mixture of Ag and Pd on the lower layer outer electrodes;

re-reducing the sheets with inner electrodes and lower outer electrodes on which the upper layer outer electrode paste is applied; and heat-treating the re-reduced sheets in air to from upper layer outer electrodes on the lower layer outer electrodes.

A twelfth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method and covering the edges of the green sheets with a lower layer outer electrode paste, terminals of the inner electrodes being exposed to the edges, followed by calcinating the green sheets;

raising the temperature of the calcinated laminated sheets to a temperature in the range from 1,000° to 1,200° C. in a nitrogen atmosphere and sintering the calcinated sheets in a reducing atmosphere, resulting in a sintered ceramic body with inner electrodes and lower layer outer electrodes;

re-oxidizing the sintered ceramic body in the air;

applying an upper layer outer electrode paste containing Ag or a mixture of Ag and Pd on the lower layer outer electrodes;

re-reducing the sintered ceramic body with inner electrodes and lower outer electrodes on which the upper layer outer electrode paste is applied: and heat-treating the re-reduced ceramic body in air to form upper layer outer electrodes on the lower layer outer electrodes.

A thirteenth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the green sheets in air;

covering the edges of the calcinated sheets with a lower layer outer electrode paste, terminals of the inner electrodes being exposed to the edges, and sintering the calcinated sheets in a reducing atmosphere;

applying an upper layer outer electrode paste containing Ag or a mixture of Ag and Pd on the lower layer outer electrodes; and baking the upper layer outer electrode paste to form upper layer outer electrodes on the lower layer outer electrodes in air or in a nitrogen atmosphere.

A fourteenth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the resulting green sheets in air;

covering the edges of the green sheets with a lower layer outer electrode paste, terminals of the inner electrodes being exposed to the edges, and raising the temperature of the calcinated laminated sheets to a temperature in the range from 1,000° to 1,200° C. in a nitrogen atmosphere, followed by sintering the calcinated laminated sheets in a reducing atmosphere, resulting in a sintered ceramic body with inner electrodes and lower layer outer electrodes;

applying an upper layer outer electrode paste containing Ag or a mixture of Ag and Pd on the lower layer outer electrodes; and baking the upper layer outer electrode paste to form upper layer outer electrodes on the lower layer electrodes in air or in a nitrogen atmosphere.

A fifteenth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the resulting green sheets in air;

covering the edges of the green sheets with a lower layer outer electrode paste, terminals of the inner electrodes being exposed to the edges, followed by sintering the green sheets in a reducing atmosphere to obtain a sintered ceramic body with inner electrodes and lower layer outer electrodes;

re-oxidizing the sintered ceramic body in air;

re-reducing the re-oxidized sintered ceramic body;

applying an upper layer outer electrode paste containing Ag or a mixture of Ag and Pd on the lower layer outer electrodes; and baking the upper layer outer electrode paste to form upper layer outer electrodes on the lower layer outer electrodes in air or in a nitrogen atmosphere.

A sixteenth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the resulting green sheets in air;

covering the edges of the calcinated sheets with a lower layer outer electrode paste, terminals of the inner electrodes being exposed to the edges, followed by raising the temperature of the calcinated sheets to a temperature in the range from 1,000° to 1,200° C., followed by sintering in a reducing atmosphere to obtain a sintered ceramic body with inner electrodes and lower layer outer electrodes;

re-oxidizing the sintered ceramic body in air;

re-reducing the sintered and re-oxidized ceramic body;

applying an upper layer outer electrode paste containing Ag or a mixture of Ag and Pd on the lower layer outer electrodes; and baking the upper layer outer electrode paste to form upper layer outer electrodes on the lower layer outer electrodes in air or in a nitrogen atmosphere.

A seventeenth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the resulting green sheets in air;

covering the edges of the green sheets with a lower layer outer electrode paste, terminals of the inner electrodes being exposed to the edges, followed by sintering the green sheets in a reducing atmosphere to obtain a sintered ceramic body with inner electrodes and lower layer outer electrodes;

re-oxidizing the sintered ceramic body in air;

applying an upper layer outer electrode paste containing Ag or a mixture of Ag and Pd on the lower layer outer electrodes;

re-reducing the sintered and re-oxidized ceramic body; and heat-treating the sintered re-oxidized, and re-reduced ceramic body in air.

An eighteenth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the resulting green sheets in air;

covering the edges of the green sheets with a lower layer outer electrode paste, terminals of the inner electrodes being exposed to the edges, and raising the temperature of the green sheets to a temperature in the range from 1,000° to 1,200° C. in a nitrogen atomosphere, followed by sintering in a reducing atmosphere to obtain a sintered ceramic body with inner electrodes and lower layer outer electrodes;

re-oxidizing the sintered ceramic body in the air;

applying an upper layer outer electrode paste containing Ag or a mixture of Ag and Pd on the lower layer outer electrodes;

re-reducing the sintered and re-oxidized ceramic body; and heat-treating the sintered, re-oxidized, and re-reduced ceramic body in air.

A nineteenth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the resulting green sheets in air;

sintering the green sheets in a reducing atmosphere, resulting in a sintered ceramic body;

re-oxidizing the sintered ceramic body in air;

covering the edges of the sintered ceramic body with a lower layer outer electrode paste, terminals of the inner electrodes being exposed to the edges, and baking the lower layer outer electrode paste in a reducing or in a nitrogen atmosphere;

applying an upper layer outer electrode paste containing Ag or a mixture of Ag and Pd on the lower layer outer electrodes; and baking the upper layer electrode paste to form upper layer outer electrodes on the lower layer outer electrodes in air or in a nitrogen atmosphere.

A twentieth method for manufacturing a laminated semiconductor ceramic capacitor with a grain boundary-insulated structure comprises the steps of:

laminating and compressing the green sheets with the inner electrode pattern of the first method with the uppermost and lowermost green sheets of the first method, followed by calcinating the resulting green sheets in air;

raising the temperature of the green sheets to a temperature in the range from 1,000° to 1,200° C. and sintering the green sheets in a reducing atmosphere, resulting in a sintered ceramic body;

oxidizing the sintered ceramic body in air;

covering the edges of the sintered ceramic body with a lower layer outer electrode paste, terminals of the inner electrodes being exposed to the edges, and baking the lower layer outer electrode paste in a reducing or in a nitrogen atmosphere;

applying an upper layer outer electrode paste containing Ag or a mixture of Ag and Pd on the lower layer outer electrodes; and baking the upper layer outer electrode paste to form upper layer outer electrodes on the lower layer outer electrodes in air or in a nitrogen atmosphere.

Thus, the invention described herein makes possible the objectives of: (1) providing a laminated semiconductor ceramic capacitor with a grain boundary-insulated structure having a varistor function which absorbs low voltage noises and high frequency noises under the normal operational conditions and works as a varistor when high voltage pulses and high voltage static electricity invade the circuit; (2) providing a laminated semiconductor ceramic capacitor with a grain boundary-insulated structure having a varistor function which contains as its main component $SrTiO_3$, in which the ceramic capacitor material and the inner electrode material are simultaneously sintered; (3) providing a laminated semiconductor ceramic capacitor with a grain boundary-insulated structure having a varistor function which includes Ni as its inner electrodes; and (4) providing a method for manufacturing a laminated semiconductor ceramic capacitor with a grain boundary-insulated structure having a varistor function which has the above-mentioned properties.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

When a ceramic capacitor with a varistor function is manufactured, a ceramic element which is made semiconductive under a reducing or a nitrogen atmosphere should be subjected to a heat treatment in air (hereinafter this heat treatment is referred to as re-oxidation) to provide its crystal grain boundaries with high resistance. Therefore, the following two subjects are the most important in the case of manufacturing a laminated ceramic capacitor with a varistor function: First, inner electrodes are excellent in oxidation resistance; and secondly, the crystal boundaries of the ceramic element are excellent in oxidation properties. It means that the inner electrodes and the ceramic element require opposite characteristics in the re-oxidation process.

Therefore, when a laminated ceramic capacitor with a varistor function having Ni inner electrodes according to the present invention is manufactured, the following subject arises: The oxidation resistance of the Ni inner electrodes should be improved, and simultaneously the oxidation properties of the crystal boundaries of a ceramic element should also be improved. The present inventors have found that (1) the oxidation resistance of the Ni inner electrodes is improved by solubilizing at least one compound containing an atom selected from the group consisting of Li, Na and K into Ni or an Ni-containing compound which produces a P-type oxide to reduce the oxidation rate; and (2) at least one atom selected from the group consisting of Li, Na, and K which is added to the Ni inner electrodes is readily dispersed in the crystal boundaries of a ceramic element during the re-oxidation step, and works as an oxygen carrier, thereby accelerating the oxidation of the crystal boundaries.

According to the present invention, it is possible to improve both the oxidation resistance of the Ni inner electrodes, and the oxidation properties of the crystal boundaries of a ceramic element by solubilizing at least one compound containing an atom selected from the group consisting of Li, Na and K into Ni or an Ni-containing compound, which makes it possible to readily manufacture a laminated ceramic capacitor with a varistor function having Ni inner electrodes.

EXAMPLES

The present invention will be described by way of illustrating the following examples.

EXAMPLE 1

Figure 2:
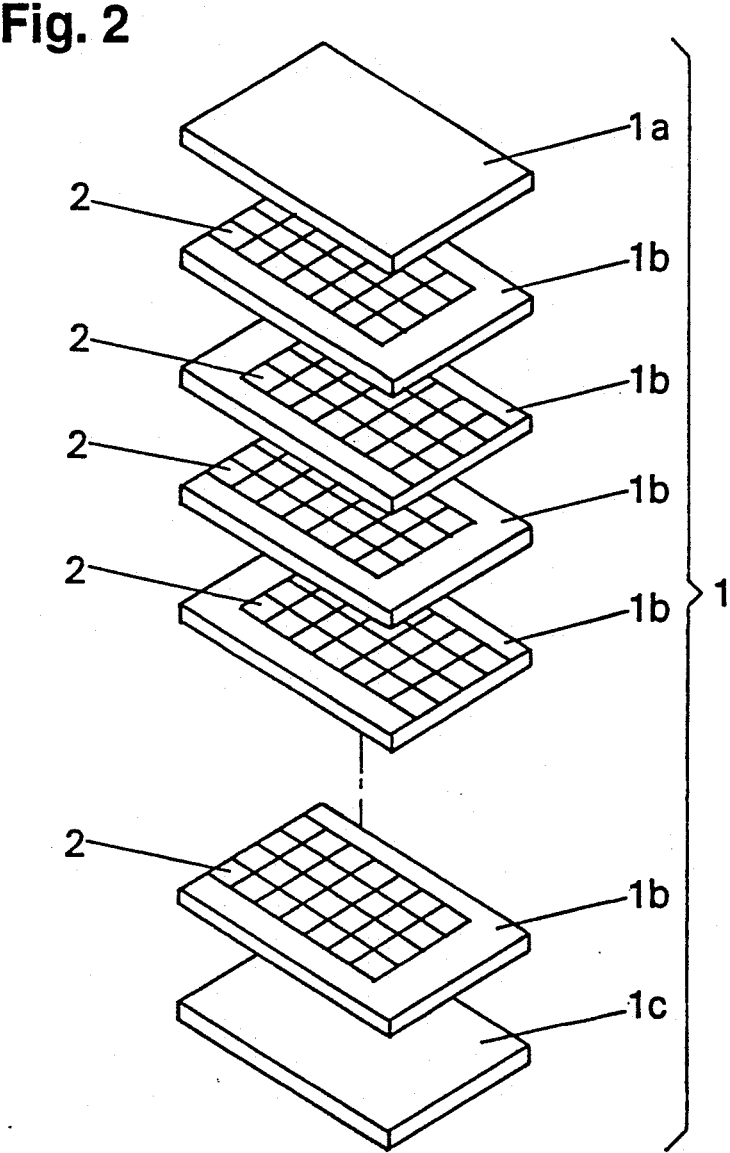
FIG. 2 is an exploded perspective view illustrating an example of the laminated ceramic capacitor with a varistor function according to the present invention and showing laminated green sheets and a pattern of the inner electrode paste printed on the green sheets.
Figure 3:
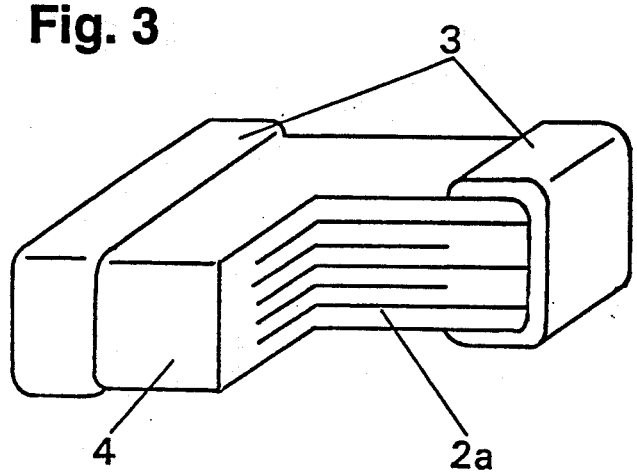
FIG. 3 is a partially cutaway view of the laminated ceramic capacitor with a varistor function obtained from Examples 1 to 7 of the present invention.

First, a $Li_2CO_3$ powder in the range of 0.05 to 2.5 mol % was added to a NiO powder having an average particle size of 0.5 $\mu$m or less and a purity of 90%, and the mixture was calcinated in air at a temperature in the range of 500° to 1,300° C. The calcinated powder was ground again so as to make an average particle size of 1.5 $\mu$m or less and provided as a starting material for inner electrodes. The powdered starting material was dispersed in a solvent together with an organic binder such as a butyral resin to form an inner electrode paste. Then, as shown in FIG. 2, 97 mol % of $SrTiO_3$ (Sr/Ti=0.97) powder, 1 mol % of $Nb_2O_5$ powder, 1 mol % of $MnO_2$ powder, and 1 mol % of $SiO_2$ powder were mixed and formed into green sheets 1b with a thickness of about 50 $\mu$m by the doctor blade method, followed by cutting into a predetermined size. Patterns of the inner electrode paste 2 were printed on the green sheets 1b obtained as shown in FIG. 2 in accordance with a predetermined size. As is apparent from FIG. 2, the inner electrode paste 2 was not printed on the uppermost and lowermost green sheets 1a and 1c. Usually, a plurality of the green sheets 1b are laminated. The patterns of the inner electrode paste 2 were printed on intermediate layers of the laminated green sheets 1 so as to reach one edge of the sheet, and the green sheets 1b are stacked in such a manner that the edges which the inner electrodes reach are alternately overlaid and the edges which the inner electrodes do not reach are alternately overlaid. Then, the uppermost and lowermost green sheets 1a and 1c were placed on the uppermost and lowermost parts, respectively, and the green sheets 1b printed with the above inner electrode paste 2 thereon were laminated therebetween. The resulting laminated green sheets 1b were heat-pressed and contacted together with the uppermost and lowermost green sheets 1a and 1c to obtain a laminated body 1. The laminated body 1 was heated at a temperature in the range of 600° to 1,250° C. in air so as to remove the above binder therefrom, whereby the laminated body was calcinated. The calcinated body was next sintered by heating to a temperature in the range of 1,200° to 1,350° C. in a reducing atmosphere, followed by re-oxidation by heating at a temperature of 900° to 1,100° C. in air. As shown in FIG. 3, the outer electrode paste containing Ag was coated on both edges of the semiconductor ceramic with a grain boundary-insulated structure (hereinafter, this semiconductor ceramic is referred to as a ceramic element) in which terminals of the inner electrodes 2a were exposed alternatively in the opposite directions, and the Ag paste was baked by heating at 800° C. for 15 minutes in air, thereby obtaining a laminated ceramic capacitor 4 with a varistor function, comprising a plurality of inner electrodes 2a in the ceramic element, the terminals of the inner electrodes 2a reaching each opposite edge of the ceramic element alternatively one by one; and outer electrodes 3 placed at opposite edges of the ceramic element so that the outer electrodes 3 can be electrically connected to the terminals of the inner electrodes 2a.

Figure 1:
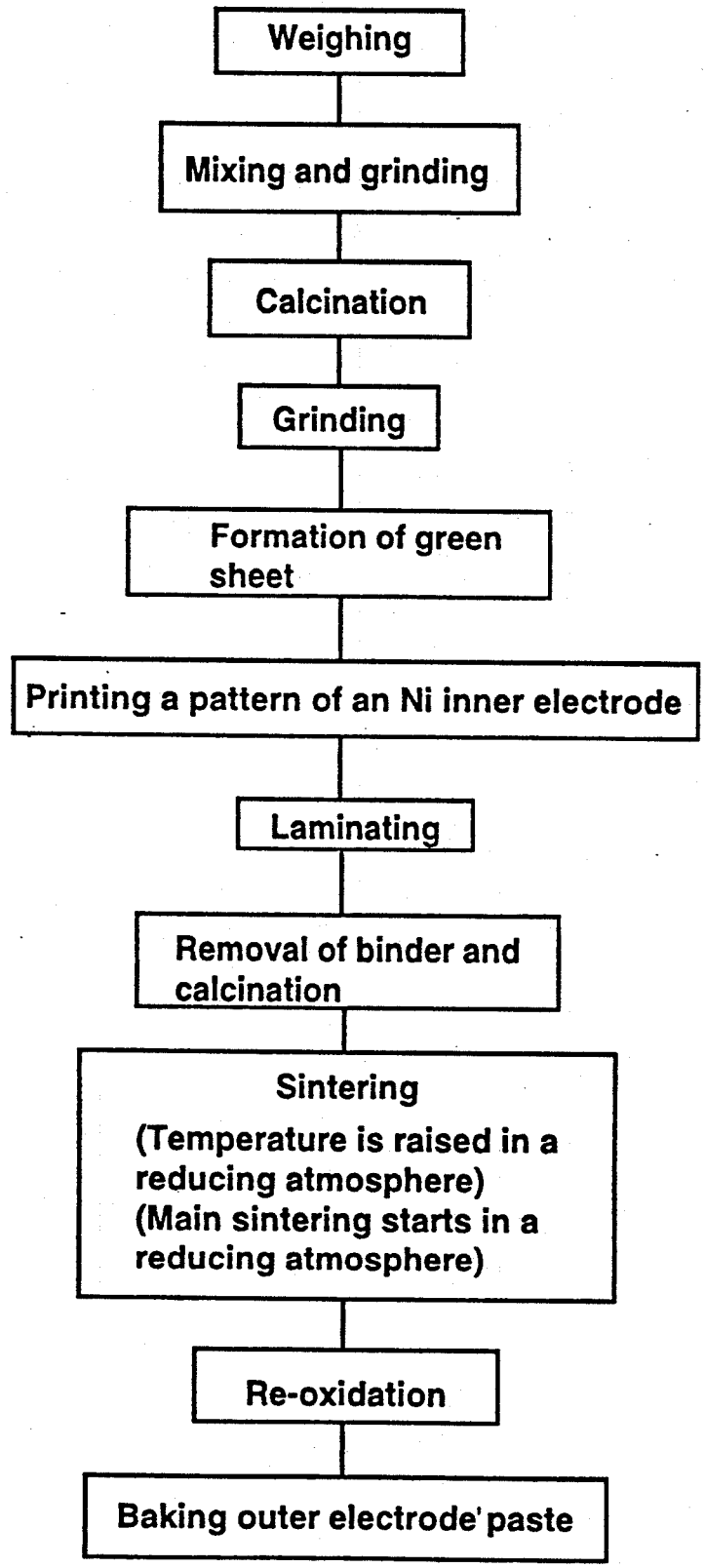
FIG. 1 is a flow chart showing a process for manufacturing a laminated ceramic capacitor with a varistor function of Example 1 of the present invention.

Size of the laminated ceramic capacitor with a varistor function, abbreviated as Type 5.5, is 5.70 mm in width, 5.00 mm in length, and 2.00 mm in thickness. The capacitor is composed of 10 layers on which patterns of the inner electrodes are printed. FIG. 1 is a flow chart showing a manufacturing process according to present invention.

In the laminated ceramic capacitor with a varistor function thus manufactured, various kinds of electrical characteristics such as a capacitance, tan $\delta$, a varistor voltage, a voltage non-linear index $\alpha$, an equivalent series resistance (ESR), a capacitance-temperature change rate, and a temperature coefficient of varistor voltage are shown in Tables 1 to 5, varying with the re-oxidation temperatures.

The experimental conditions for preparing laminated samples were 1,200° C., 2 hours for removal of the binder and calcination in air; and 1,300° C., 2 hours for sintering in a reducing atmosphere of $N_2:H_2=99:1$. The inner electrode paste contains a powder prepared by calcinating a mixed powder of NiO and $Li_2CO_3$ (the amount of $LiCO_3$ is 0 to 2.5 mol % based on the total moles of NiO and $Li_2CO_3$) at 1,100° C. for 2 hours in air.

Each electrical characteristic was obtained under the following experimental conditions.

Capacitance (C) was measured at 1.0 V and 1.0 kHz.

Varistor voltage $V_{0.1\,mA}$ was measured at 0.1 mA.

Voltage non-linear index α was calculated from the values of varistor voltage measured at 0.1 mA and 1.0 mA, respectively, using the following equation:

$$\alpha = 1/\log(V_{1mA}/V_{0.1mA}).$$

Equivalent series resistance (ESR) is defined as resistance at the resonance frequency measured at 1.0 V.

Capacitance-temperature change rate was obtained from the following equation:

Capacitance-temperature change rate (%) =

$$\frac{\text{Capacitance at 85° C.} - \text{(Capacitance at } -25° \text{ C.)}}{\text{Capacitance at } -25° \text{ C.}} \times 100$$

Temperature coefficient of varistor voltage was obtained by the following equation:

Temperature coefficient of varistor voltage =

$$\frac{\text{Varistor voltage at 50° C.} - \text{Varistor voltage at 25° C.}}{(50-25) \times \text{Varistor voltage at 25° C.}} \times 100$$

TABLE 1

Re-oxidation: 900° C.  Ag outer electrode
SrTiO₃ (Sr/Ti = 0.97)
Nb₂O₅: 0.5 mol % MnO₂: 1.0 mol % SiO₂: 1.0 mol %

| Sample No. | Inner electrode Li₂CO₃ (mol %) | C (nF) | tan δ (%) | $V_{0.1\,mA}$ (V) | α | ESR (mΩ) | ΔC/C (%) | ΔV/V (%) |
|---|---|---|---|---|---|---|---|---|
| *1 | 0.00 | 381 | 1.9 | 5 | 8 | 41 | −4.5 | −2.8 |
| 2 | 0.05 | 374 | 1.9 | 7 | 12 | 38 | −3.4 | −2.0 |
| 3 | 0.10 | 367 | 1.8 | 8 | 13 | 36 | −3.1 | −1.6 |
| 4 | 0.20 | 359 | 1.7 | 8 | 15 | 27 | −2.9 | −1.5 |
| 5 | 0.50 | 322 | 1.5 | 9 | 16 | 27 | −2.6 | −1.1 |
| 6 | 0.75 | 289 | 1.6 | 10 | 13 | 28 | −2.7 | −1.3 |
| 7 | 1.00 | 253 | 1.6 | 12 | 12 | 31 | −3.0 | −1.6 |
| 8 | 1.50 | 189 | 1.7 | 15 | 10 | 35 | −3.1 | −1.7 |
| 9 | 2.00 | 118 | 1.9 | 22 | 9 | 42 | −3.7 | −2.2 |
| *10 | 2.50 | 52 | 3.1 | 24 | 5 | 52 | −4.4 | −3.8 |

TABLE 2

Re-oxidation: 950° C.  Ag outer electrode
SrTiO₃ (Sr/Ti = 0.97)
Nb₂O₅: 0.5 mol % MnO₂: 1.0 mol % SiO₂: 1.0 mol %

| Sample No. | Inner electrode Li₂CO₃ (mol %) | C (nF) | tan δ | $V_{0.1\,mA}$ (V) | α | ESR (mΩ) | ΔC/C (%) | ΔV/V (%) |
|---|---|---|---|---|---|---|---|---|
| *11 | 0.00 | 98 | 1.5 | 32 | 7 | 250 | −4.5 | −2.6 |
| 12 | 0.05 | 183 | 1.7 | 12 | 10 | 45 | −3.1 | −2.0 |
| 13 | 0.10 | 200 | 1.7 | 13 | 12 | 38 | −3.0 | −1.6 |
| 14 | 0.20 | 224 | 1.7 | 13 | 14 | 31 | −2.9 | −1.5 |
| 15 | 0.50 | 246 | 1.5 | 15 | 15 | 32 | −2.6 | −1.0 |
| 16 | 0.75 | 241 | 1.5 | 18 | 13 | 34 | −2.7 | −1.3 |
| 17 | 1.00 | 233 | 1.6 | 20 | 11 | 35 | −3.0 | −1.7 |
| 18 | 1.50 | 160 | 1.7 | 30 | 10 | 38 | −3.1 | −1.8 |
| 19 | 2.00 | 108 | 1.9 | 36 | 9 | 46 | −3.4 | −2.1 |
| *20 | 2.50 | 45 | 4.3 | 44 | 5 | 58 | −4.4 | −3.8 |

TABLE 3

Re-oxidation: 1000° C.  Ag outer electrode
SrTiO₃ (Sr/Ti = 0.97)
Nb₂O₅: 0.5 mol % MnO₂: 1.0 mol % SiO₂: 1.0 mol %

| Sample No. | Inner electrode Li₂CO₃ (mol %) | C (nF) | tan δ (%) | $V_{0.1\,mA}$ (V) | α | ESR (mΩ) | ΔC/C (%) | ΔV/V (%) |
|---|---|---|---|---|---|---|---|---|
| *21 | 0.00 | 32 | 1.3 | 65 | 5 | 1000 | −4.8 | −2.8 |
| 22 | 0.05 | 115 | 1.5 | 18 | 9 | 48 | −3.2 | −1.9 |
| 23 | 0.10 | 152 | 1.5 | 15 | 10 | 45 | −3.0 | −1.6 |
| 24 | 0.20 | 171 | 1.5 | 15 | 12 | 42 | −2.7 | −1.4 |
| 25 | 0.50 | 204 | 1.5 | 17 | 12 | 34 | −2.5 | −0.9 |
| 26 | 0.75 | 211 | 1.5 | 19 | 12 | 36 | −2.7 | −1.3 |
| 27 | 1.00 | 204 | 1.5 | 21 | 9 | 40 | −3.0 | −1.5 |
| 28 | 1.50 | 141 | 1.6 | 33 | 8 | 42 | −3.0 | −1.7 |
| 29 | 2.00 | 95 | 1.7 | 38 | 7 | 52 | −3.3 | −1.9 |
| *30 | 2.50 | 35 | 2.1 | 48 | 5 | 61 | −4.2 | −3.5 |

TABLE 4

Re-oxidation: 1050° C.  Ag outer electrode
SrTiO₃ (Sr/Ti = 0.97)
Nb₂O₅: 0.5 mol % MnO₂: 1.0 mol % SiO₂: 1.0 mol %

| Sample No. | Inner electrode Li₂CO₃ (mol %) | C (nF) | tan δ (%) | $V_{0.1\,mA}$ (V) | α | ESR (mΩ) | ΔC/C (%) | ΔV/V (%) |
|---|---|---|---|---|---|---|---|---|
| *31 | 0.00 | 0.5 | 1.0 | 457 | 2 | 1115 | −4.5 | −2.8 |
| 32 | 0.05 | 74 | 1.4 | 26 | 8 | 51 | −3.3 | −1.8 |
| 33 | 0.10 | 112 | 1.5 | 21 | 9 | 48 | −3.2 | −1.7 |
| 34 | 0.20 | 125 | 1.5 | 21 | 10 | 45 | −3.2 | −1.5 |
| 35 | 0.50 | 138 | 1.5 | 22 | 11 | 37 | −2.7 | −1.0 |
| 36 | 0.75 | 191 | 1.4 | 23 | 11 | 39 | −2.6 | −1.3 |
| 37 | 1.00 | 175 | 1.5 | 23 | 8 | 42 | −3.0 | −1.6 |
| 38 | 1.50 | 124 | 1.5 | 35 | 8 | 51 | −3.2 | −1.7 |
| 39 | 2.00 | 82 | 1.9 | 45 | 7 | 61 | −3.4 | −2.2 |
| *40 | 2.50 | 31 | 2.6 | 52 | 5 | 65 | −4.3 | −3.4 |

TABLE 5

Re-oxidation: 1100° C.  Ag outer electrode
SrTiO₃ (Sr/Ti = 0.97)
Nb₂O₅: 0.5 mol % MnO₂: 1.0 mol % SiO₂: 1.0 mol %

| Sample No. | Inner electrode Li₂CO₃ (mol %) | C (nF) | tan δ (%) | $V_{0.1\,mA}$ (V) | α | ESR (mΩ) | ΔC/C (%) | ΔV/V (%) |
|---|---|---|---|---|---|---|---|---|
| *41 | 0.00 | — | 0.8 | OVER | 2 | 6287 | −4.8 | −2.7 |
| 42 | 0.05 | 33 | 1.4 | 36 | 8 | 55 | −3.4 | −1.8 |
| 43 | 0.10 | 71 | 1.4 | 27 | 9 | 52 | −3.3 | −1.7 |
| 44 | 0.20 | 78 | 1.4 | 27 | 9 | 51 | −2.7 | −1.5 |
| 45 | 0.50 | 100 | 1.4 | 27 | 9 | 42 | −2.2 | −1.2 |
| 46 | 0.75 | 172 | 1.4 | 29 | 9 | 51 | −2.4 | −1.3 |
| 47 | 1.00 | 154 | 1.4 | 31 | 8 | 52 | −3.0 | −1.7 |
| 48 | 1.50 | 106 | 1.5 | 39 | 7 | 59 | −3.1 | −1.8 |
| 49 | 2.00 | 72 | 1.8 | 51 | 6 | 68 | −3.5 | −2.8 |
| *50 | 2.50 | 24 | 2.3 | 61 | 4 | 81 | −4.9 | −3.7 |

The samples marked by the symbol * in Tables 1 to 5 are comparative examples. The Ni inner electrodes of these sintered elements marked by the symbol * are significantly oxidized. The capacitor having these inner electrodes cannot exhibit the performances as both of a normal capacitor which absorbs low voltage noises and high frequency noises, and of a varistor which absorbs high voltage pulses and high voltage static electricity, at the same time. Moreover, this kind of capacitor has a large capacitance-temperature change rate and a large temperature coefficient of varistor voltage due to the presence of an unreacted Li ion, whereby reliability and electrical characteristics of the capacitor are liable to be influenced by temperature change. Therefore, these samples are not suitable as a ceramic capacitor with a varistor function which protects semiconductors and electronic equipment from abnormal voltages such as noises, pulses, and static electricity generated in the electronic equipment. On the other hand, the other samples which are not marked by the symbol * possess a large capacitance, a large value of voltage non-linear index α and a small equivalent series resistance (ESR). A capacitor with these characteristics exhibits the performances both of a normal capacitor which absorbs low voltage noises and high frequency noises, and of a varistor which absorbs high voltage pulses and high voltage static electricity. Moreover, this kind of capacitor has a small capacitance-temperature change rate and a small temperature coefficient of varistor voltage, whereby reliability and electrical characteristics are not liable to be influenced by temperature change. Therefore, these samples are well suited for use as a ceramic capacitor with a varistor function which protects semiconductors and electronic equipment from abnormal voltages such as noises, pulses, and static electricity generated in the electronic equipment.

The amount of $Li_2CO_3$ contained in the inner electrode paste in this example was adjusted in the range of 0.05 to 2.0 mol % based on the total moles of NiO and $Li_2CO_3$ for the following reasons. When the amount of $Li_2CO_3$ is less than 0.05 mol %, the effect of the added material is hardly obtained and the Ni inner electrodes are significantly oxidized as the re-oxidation temperature rises. On the other hand, when the amount of $Li_2CO_3$ is more than 2.0 mol %, the presence of a great amount of unreacted Li ions may influence the electrical characteristics and reliability of the resulting laminated ceramic capacitor. Therefore, it can be seen that when the added amount of $Li_2CO_3$ is in range of 0.05 to 2.0 mol %, (1) the oxidation resistance of the Ni inner electrodes is improved, (2) Li atoms are readily dispersed in the crystal boundaries of the ceramic element and work as oxygen carriers, thereby accelerating the oxidation of the crystal boundaries, which results in the improvement of the varistor function of the laminated ceramic capacitor, and (3) the capacitance-temperature change rate and temperature coefficient of varistor voltage of the resulting laminated semiconductor capacitor are also improved. For these reasons, the variation of the amount of $Li_2CO_3$ added to the inner electrode paste is expected to provide a laminated ceramic capacitor with a varistor function which has different electrical characteristics and excellent temperature characteristics.

Although a mixture of NiO and $Li_2CO_3$ was used as a powdered starting material as an inner electrode paste in this example, NiO may be replaced by Ni, or Ni-containing carbonates, hydroxides, nitrates, or the like; $Li_2CO_3$ may be replaced by Li-containing oxides, hydroxides, fluorides, silicates, aluminates, or the like; and Li may be replaced by Na-containing or K-containing oxides, hydroxides, fluorides, silicates, aluminates, or the like, which provides the same effect as achieved herein.

Also, a mixture of two or more kinds of Li, Na and K may be used in this material.

Although Ag was used as an outer electrode material in this example, it was confirmed that other materials such as Pd, Cu, Zn, and Ni may provide the same effect. This means that at least one metal selected from the group consisting of Pd, Ag, Cu, Zn, and Ni, an alloy thereof, or a mixture thereof may be used as an outer electrode material. Moreover, it was confirmed that Ni outer electrodes which are made of an outer electrode paste prepared by solubilizing at least one compound containing an atom selected from the group consisting of Li, Na, and K into Ni or an Ni-containing compound may provide the same effect.

It was also confirmed that Ni outer electrodes made of an outer electrode paste prepared by solubilizing a combination of at least one compound containing an atom selected from the group consisting of Li, Na, and K and at least one compound containing a Pd atom or a Pt atom into Ni or an Ni-containing compound may provide the same effect.

However, when an atom such as Cu, Zn, and Ni is present in the outer electrodes, it is required to lower the baking temperature, to shorten baking time, and to control the atmosphere in which the baking is carried out because these atoms tend to be oxidized.

The effect in withstanding surge current (maximum current wave value observed under the condition that the variation of a varistor voltage $V_{0.1mA}$ is within ±10% when 8×20 μs of impulse current is applied twice at 5-minute interval in the same direction) of the samples obtained in this example was measured to be in the range of 300 to 400 A, which indicated the same characteristics as, or better characteristics than the conventional ZnO type varistors.

Also, it was found that the laminated ceramic capacitor having the inner electrodes of the present invention had excellent effect in withstanding surge current for the following reasons, compared to those having the inner electrodes with the same structure made of Au, Pt, Rh, Pd, and the like. At least one atom selected from the group consisting of Li, Na, and K which is added to inner electrodes forms (1) a firm insulated layer in the grain boundaries of a ceramic element, and works as a sintering assistant to provide (2) a tight adhesiveness between the inner electrodes and the ceramic element. Thus, the laminated ceramic capacitor is not likely to be destroyed because of the above firm insulated layer and flashover is hardly generated because of the tight adhesiveness between the inner electrodes and the ceramic element.

The laminated ceramic capacitor with a varistor function thus manufactured has larger capacitance and exhibits much better temperature and frequency characteristics than the laminated varistor disclosed in the above-mentioned Japanese Patent Publication No. 58-23921. The laminated ceramic capacitor in the present invention is manufactured by laminating ceramic capacitor materials with a varistor function which can form a capacitor which possesses both functions of a normal capacitor which absorbs noises, and of a varistor which absorbs pulses and static electricity, while the above-mentioned varistor in the prior art is simply made of piled varistor materials which show prominent absorbing ability for surge current. The laminated ceramic capacitor with a varistor function in the present invention is completely different from the varistor in the prior art in both functions and uses.

EXAMPLE 2

A laminated body prepared by using green sheets and an inner electrode paste having the same composition as that in Example 1 was heated at a temperature in the range of 600° to 1,250° C. in air to remove the binder, whereby the laminated body was calcinated. The calcinated body was sintered by heating to a temperature in the range of 1,000° to 1,200° C. in a nitrogen atmosphere and then at a temperature in the range of 1,200° to 1,350° C. in a reducing atmosphere, followed by re-oxidation by heating at a temperature of 900° to 1100° C. in air. Then, the outer electrode paste containing Ag was coated on both edges of the ceramic element in which terminals of the inner electrodes were exposed alternatively in the opposite directions, and the Ag paste was baked by heating at 800° C. for 15 minutes in air, thereby obtaining a laminated ceramic capacitor with a varistor function. The various electrical characteristics of the resulting laminated ceramic capacitor with a varistor function are shown in Tables 6 to 10.

Figure 4:
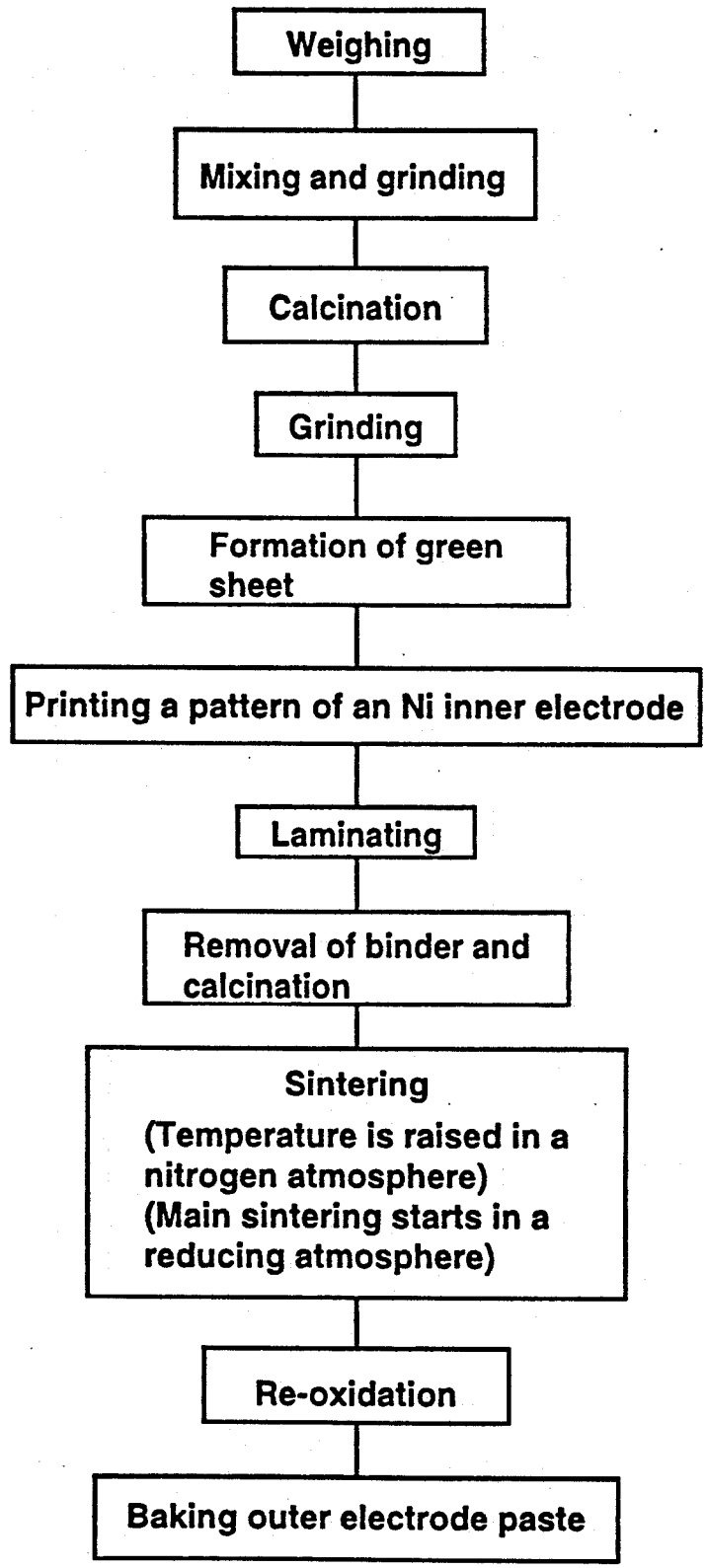
FIG. 4 is a flow chart showing a process for manufacturing a laminated ceramic capacitor with a varistor function in Example 2 of the present invention.

The experimental conditions for preparing laminated samples were 1,200° C., 2 hours for calcination in air; a total of 2 hours for heating at 1,200° C. in a nitrogen atmosphere and at 1,300° C. in the reducing atmosphere of $N_2:H_2=99:1$; and 900°–1,100° C., 2 hours for re-oxidation in air. Also, the inner electrode paste and the outer electrode paste were prepared by calcinating a mixed powder of NiO and $Li_2CO_3$ at 1,100° C. for 2 hours in air. FIG. 4 is a flow chart showing the manufacturing process.

The other manufacturing conditions such as the number of laminated sheets were identical to those in Example 1, and various electrical characteristics were measured as described therein.

TABLE 6

Re-oxidation: 900° C.   Ag outer electrode
$SrTiO_3$ (Sr/Ti = 0.97)
$Nb_2O_5$: 0.5 mol % $MnO_2$: 1.0 mol % $SiO_3$: 1.0 mol %

| Sample No. | Inner electrode $Li_2CO_3$ (mol %) | C (nF) | tan δ (%) | $V_{0.1\,mA}$ (V) | α | ESR (mΩ) | ΔC/C (%) | ΔV/V (%) |
|---|---|---|---|---|---|---|---|---|
| *51 | 0.00 | 388 | 1.9 | 5 | 8 | 40 | −4.5 | −2.8 |
| 52 | 0.05 | 382 | 1.9 | 7 | 12 | 37 | −3.4 | −2.0 |
| 53 | 0.10 | 375 | 1.8 | 8 | 13 | 35 | −3.1 | −1.6 |
| 54 | 0.20 | 368 | 1.7 | 8 | 15 | 26 | −2.9 | −1.5 |
| 55 | 0.50 | 330 | 1.5 | 9 | 16 | 25 | −2.6 | −1.1 |
| 56 | 0.75 | 297 | 1.6 | 10 | 13 | 26 | −2.7 | −1.3 |
| 57 | 1.00 | 260 | 1.6 | 12 | 12 | 30 | −3.0 | −1.6 |
| 58 | 1.50 | 197 | 1.7 | 15 | 10 | 34 | −3.1 | −1.7 |
| 59 | 2.00 | 128 | 1.9 | 22 | 9 | 40 | −3.7 | −2.2 |
| *60 | 2.50 | 60 | 3.1 | 24 | 5 | 50 | −4.4 | −3.8 |

TABLE 7

Re-oxidation: 950° C.   Ag outer electrode
$SrTiO_3$ (Sr/Ti = 0.97)
$Nb_2O_5$: 0.5 mol % $MnO_2$: 1.0 mol % $SiO_2$: 1.0 mol %

| Sample No. | Inner electrode $Li_2CO_3$ (mol %) | C (nF) | tan δ (%) | $V_{0.1\,mA}$ (V) | α | ESR (mΩ) | ΔC/C (%) | ΔV/V (%) |
|---|---|---|---|---|---|---|---|---|
| *61 | 0.00 | 106 | 1.5 | 18 | 7 | 101 | −4.5 | −2.6 |
| 62 | 0.05 | 191 | 1.7 | 12 | 10 | 45 | −3.1 | −2.0 |
| 63 | 0.10 | 208 | 1.7 | 13 | 12 | 37 | −3.0 | −1.6 |
| 64 | 0.20 | 233 | 1.7 | 13 | 14 | 30 | −2.9 | −1.5 |
| 65 | 0.50 | 256 | 1.5 | 15 | 15 | 32 | −2.6 | −1.0 |
| 66 | 0.75 | 250 | 1.5 | 18 | 13 | 33 | −2.7 | −1.3 |
| 67 | 1.00 | 241 | 1.6 | 20 | 11 | 35 | −3.0 | −1.7 |
| 68 | 1.50 | 168 | 1.7 | 30 | 10 | 38 | −3.1 | −1.8 |
| 69 | 2.00 | 115 | 1.9 | 36 | 9 | 47 | −3.4 | −2.1 |
| *70 | 2.50 | 54 | 3.3 | 44 | 5 | 57 | −4.4 | −3.8 |

TABLE 8

Re-oxidation: 1000° C.   Ag outer electrode
$SrTiO_3$ (Sr/Ti = 0.97)
$Nb_2O_5$: 0.5 mol % $MnO_2$: 1.0 mol % $SiO_2$: 1.0 mol %

| Sample No. | Inner electrode $Li_2CO_3$ (mol %) | C (nF) | tan δ (%) | $V_{0.1\,mA}$ (V) | α | ESR (mΩ) | ΔC/C (%) | ΔV/V (%) |
|---|---|---|---|---|---|---|---|---|
| *71 | 0.00 | 40 | 1.3 | 65 | 5 | 578 | −4.8 | −2.8 |
| 72 | 0.05 | 123 | 1.5 | 18 | 9 | 47 | −3.2 | −1.9 |
| 73 | 0.10 | 160 | 1.5 | 15 | 10 | 45 | −3.0 | −1.6 |
| 74 | 0.20 | 181 | 1.5 | 15 | 12 | 41 | −2.7 | −1.4 |
| 75 | 0.50 | 215 | 1.5 | 17 | 12 | 33 | −2.5 | −0.9 |
| 76 | 0.75 | 219 | 1.5 | 19 | 12 | 35 | −2.7 | −1.3 |
| 77 | 1.00 | 212 | 1.5 | 21 | 9 | 40 | −3.0 | −1.5 |
| 78 | 1.50 | 149 | 1.6 | 33 | 8 | 41 | −3.0 | −1.7 |
| 79 | 2.00 | 106 | 1.7 | 38 | 7 | 52 | −3.3 | −1.9 |
| *80 | 2.50 | 43 | 2.1 | 48 | 5 | 60 | −4.2 | −3.5 |

TABLE 9

Re-oxidation: 1050° C.   Ag outer electrode
$SrTiO_3$ (Sr/Ti = 0.97)
$Nb_2O_5$: 0.5 mol % $MnO_2$: 1.0 mol % $SiO_2$: 1.0 mol %

| Sample No. | Inner electrode $Li_2CO_3$ (mol %) | C (nF) | tan δ (%) | $V_{0.1\,mA}$ (V) | α | ESR (mΩ) | ΔC/C (%) | ΔV/V (%) |
|---|---|---|---|---|---|---|---|---|
| *81 | 0.00 | 0.5 | 1.0 | 457 | 2 | 1115 | −4.5 | −2.8 |
| 82 | 0.05 | 85 | 1.4 | 26 | 8 | 50 | −3.3 | −1.8 |
| 83 | 0.10 | 120 | 1.5 | 21 | 9 | 47 | −3.2 | −1.7 |
| 84 | 0.20 | 132 | 1.5 | 21 | 10 | 44 | −3.2 | −1.5 |
| 85 | 0.50 | 142 | 1.5 | 22 | 11 | 37 | −2.7 | −1.0 |
| 86 | 0.75 | 199 | 1.4 | 23 | 11 | 39 | −2.6 | −1.3 |
| 87 | 1.00 | 183 | 1.5 | 23 | 8 | 41 | −3.0 | −1.6 |
| 88 | 1.50 | 132 | 1.5 | 35 | 8 | 50 | −3.2 | −1.7 |
| 89 | 2.00 | 91 | 1.9 | 45 | 7 | 61 | −3.4 | −2.2 |
| *90 | 2.50 | 39 | 2.6 | 52 | 5 | 64 | −4.3 | −3.4 |

TABLE 10

Re-oxidation: 1100° C.   Ag outer electrode
$SrTiO_3$ (Sr/Ti = 0.97)
$Nb_2O_5$: 0.5 mol % $MnO_2$: 1.0 mol % $SiO_2$: 1.0 mol %

| Sample No. | Inner electrode $Li_2CO_3$ (mol %) | C (nF) | tan δ (%) | $V_{0.1\,mA}$ (V) | α | ESR (mΩ) | ΔC/C (%) | ΔV/V (%) |
|---|---|---|---|---|---|---|---|---|
| *91 | 0.00 | — | 0.8 | OVER | 2 | 6287 | −4.8 | −2.7 |
| 92 | 0.05 | 41 | 1.4 | 36 | 8 | 54 | −3.4 | −1.8 |
| 93 | 0.10 | 79 | 1.4 | 27 | 9 | 51 | −3.3 | −1.7 |
| 94 | 0.20 | 84 | 1.4 | 27 | 9 | 50 | −2.7 | −1.5 |
| 95 | 0.50 | 107 | 1.4 | 27 | 9 | 42 | −2.2 | −1.2 |
| 96 | 0.75 | 181 | 1.4 | 29 | 9 | 51 | −2.4 | −1.3 |
| 97 | 1.00 | 163 | 1.4 | 31 | 8 | 52 | −3.0 | −1.7 |
| 98 | 1.50 | 115 | 1.5 | 39 | 7 | 58 | −3.1 | −1.8 |
| 99 | 2.00 | 79 | 1.8 | 51 | 6 | 67 | −3.5 | −2.8 |
| *100 | 2.50 | 33 | 2.3 | 61 | 4 | 81 | −4.9 | −3.7 |

It was confirmed that pre-heating in a nitrogen atmosphere during the sintering step of Example 2 (1) intentionally delayed the time when sintering and reduction of Ni contained in the inner electrode material were completed and made it close to the time when sintering of the ceramic element is completed, which prevented the de-lamination of the laminated body; and (2) controlled the expansion and shrinkage of the inner electrode material caused by the occlusion of $H_2$ gas in Ni, which prevented the electrical disconnection of the inner electrodes and the imperfect contact between the outer electrodes and the inner electrodes. Therefore, the laminated ceramic capacitor with a varistor function of Example 2 is expected to have improved capacitance and effect in withstanding surge current (350–500 A).

Also, the same inner electrode paste as in Example 1 prepared by solubilizing at least one compound containing an atom selected from the group consisting of Li, Na, and K into Ni or an Ni-containing compound, and the outer electrode having the same structure as in Example 1 may be used in Example 2.

EXAMPLE 3

Patterns of an inner electrode paste obtained by adding 0.5 mol % of $Li_2CO_3$ to NiO and dispersed in a binder were printed on green sheets having the same ceramic composition as in Examples 1 and 2 to form a laminated body. An outer electrode paste obtained by adding $Li_2CO_3$ to NiO and dispersed in a binder was coated on both edges of the ceramic element of the laminated body in which terminals of the inner electrodes were exposed alternatively in the opposite directions, heated at a temperature in the range of 600° to 1,250° C. in air so as to remove the binder therefrom, whereby the laminated body was calcinated. Then, the laminated body was sintered at a temperature in the range of 1,200° to 1,350° C. in a reducing atmosphere, re-oxidized at a temperature of 900° to 1,100° C. in air after sintering, and re-reduced at a temperature of 350° to 800° C. in a reducing atmosphere to obtain a laminated ceramic capacitor with a varistor function.

Figure 5:
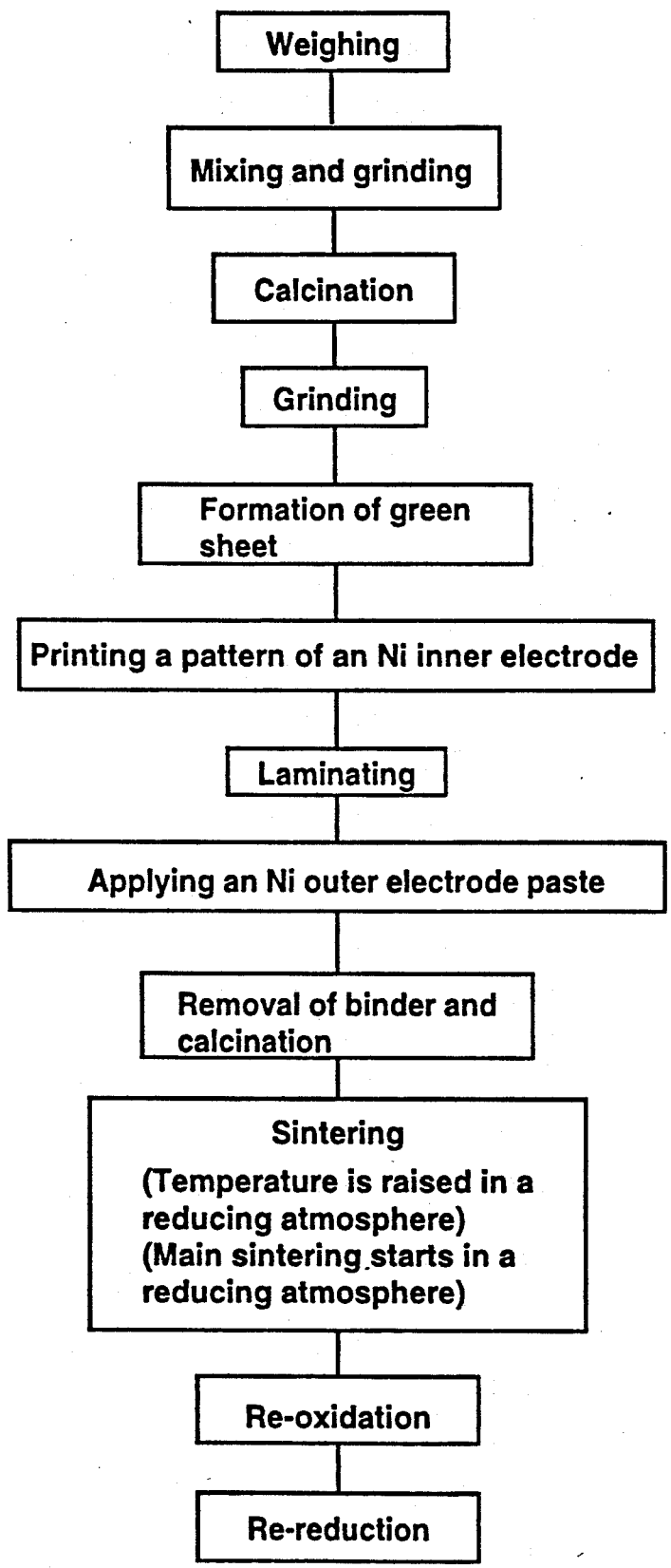
FIG. 5 is a flow chart showing a process for manufacturing the laminated ceramic capacitor with a varistor function in Examples 3 and 4 of the present invention.

The electrical characteristics of the laminated ceramic capacitor thus obtained are shown in Table 11. The experimental conditions for preparing the laminated samples were 1,200° C., 2 hours for removal of the binder and calcination in air; 1300° C., 2 hours for sintering in the reducing atmosphere of $N_2:H_2=99:1$; 900° C., 2 hours for re-oxidation in air; and 400° C., 30 minutes for re-reduction in the reducing atmosphere of $N_2:H_2=99:1$. Also, the inner electrode paste and the outer electrode paste were prepared by calcinating a mixed powder of NiO and $Li_2CO_3$ at 1,100° C. for 2 hours in air. FIG. 5 is a flow chart showing this manufacturing process.

The other manufacturing conditions such as the number of laminated sheets were identical to those of Examples 1 and 2, and various electrical characteristics were measured as described therein.

TABLE 11

Re-oxidation: 900° C. Re-reduction: 400° C.
Inner electrode NiO—$Li_2CO_3$ (0.5 mol %)
$SrTiO_3$ (Sr/Ti = 0.97)
$Nb_2O_5$: 0.5 mol % $MnO_2$: 1.0 mol % $SiO_2$: 1.0 mol %

| Sample No. | Inner electrode $Li_2CO_3$ (mol %) | C (nF) | tan δ (%) | $V_{0.1\,mA}$ (V) | α | ESR (mΩ) | ΔC/C (%) | ΔV/V (%) |
|---|---|---|---|---|---|---|---|---|
| *101 | 0.00 | 85 | 5.2 | 40 | 7 | 292 | −4.5 | −2.6 |
| 102 | 0.05 | 200 | 3.1 | 15 | 13 | 39 | −3.2 | −1.8 |
| 103 | 0.10 | 286 | 1.6 | 10 | 15 | 36 | −3.1 | −1.5 |
| 104 | 0.20 | 320 | 1.6 | 9 | 15 | 30 | −2.9 | −1.5 |
| 105 | 0.50 | 362 | 1.6 | 8 | 15 | 27 | −2.8 | −1.2 |
| 106 | 0.75 | 359 | 1.7 | 8 | 13 | 27 | −3.0 | −1.5 |
| 107 | 1.00 | 392 | 2.0 | 7 | 10 | 29 | −3.1 | −1.9 |
| 108 | 2.00 | 400 | 2.6 | 7 | 9 | 31 | −3.9 | −3.2 |
| *109 | 2.50 | 420 | 2.9 | 6 | 7 | 40 | −4.0 | −3.8 |

It was found from Example 3 that a laminated ceramic capacitor with a varistor function could be readily manufactured by using a manufacturing process such as shown in FIG. 5. Since the Ni of the outer electrodes is oxidized into NiO after the re-oxidation of the ceramic element in Example 3, functioning as the outer electrodes was lost because of the elevated resistance value. Therefore, a step for reducing NiO to Ni in the outer electrodes (hereinafter, referred to as a re-reduction step) is the most important step in Example 3. The outer electrodes were re-reduced at 400° C. for 30 minutes in the reducing atmosphere of $N_2:H_2=99:1$ in this example. It was confirmed that when it was re-reduced at lower temperatures or in the reducing atmosphere containing a lower concentration of $H_2$, oxidized portions remained on the surface of the outer electrodes. When the re-reduction temperature exceeds 700° C., not only the outer electrodes but the ceramic element may be undesirably reduced. For that reason, the re-reduction time should be shortened. Optimum re-reduction temperature was in the range of 400° to 600° C. according to the experimental results.

The effect in withstanding surge current of the laminated ceramic capacitor with a varistor function was significantly decreased to 200 A when the amount of $Li_2CO_3$ added to the outer electrodes exceeded 1.0 mol % (300–400 A for 1.0 mol % or less of $Li_2CO_3$). This is because when both the outer electrode material and the ceramic material are sintered simultaneously as described in Example 3, the increase in the amount of $Li_2CO_3$ added to the outer electrodes may accelerate the sintering properties of Ni, and create tensile stress in the vicinity of the outer electrodes in the ceramic element, which causes the generation of micro-cracks and the reduction of the effect in withstanding surge current of the laminated ceramic capacitor. This phenomenon is related to the thickness of the coated outer electrode paste. Preferred effect in withstanding surge current is obtained if the thickness of the coated outer electrode paste is thinner. Therefore, when the added amount of $Li_2CO_3$ is more than 1.0 mol %, the thickness of the coated outer electrode paste should be controlled to a certain level.

Although a mixture of NiO with $Li_2CO_3$ was used as a powdered starting material for an inner electrode paste and outer electrode paste in Example 3, a powdered starting material obtained by solubilizing at least one compound containing an atom selected from the group consisting of Li, Na, and K into Ni or an Ni-containing compound can be used for inner and outer electrode paste as is mentioned in Example 1.

Also, a powdered starting material obtained by solubilizing a combination of at least one compound containing an atom selected from the group consisting of Li, Na, and K and at least one compound containing a Pd atom or Pt atom into Ni or an Ni-containing compound can be used for an outer electrode paste as is mentioned in Example 1.

EXAMPLE 4

A laminated ceramic capacitor with a varistor function was manufactured by using an electrode paste obtained by further adding Pd to the outer electrode paste of Example 3, i.e., by further adding Pd to the outer electrode paste in which 0.5 mol % of $Li_2CO_3$ is added to NiO, in accordance with a manufacturing process shown in FIG. 5. The electrical characteristics of the laminated ceramic capacitor thus obtained are shown in Table 12.

The other manufacturing conditions such as the number of laminated layers were identical to those of Examples 1 to 3, and various electrical characteristics were measured as described therein.

TABLE 12

Re-oxidation: 900° C. Re-reduction: 400° C.
Inner electrode NiO—Li$_2$CO$_3$ (0.5 mol %)
SrTiO$_3$ (Sr/Ti = 0.97)
Nb$_2$O$_5$: 0.5 mol % MnO$_2$: 1.0 mol % SiO$_2$: 1.0 mol %

| Sample No. | Pd Added amount (wt %) | C (nF) | tan δ (%) | V$_{0.1\ mA}$ (V) | α | ESR (mΩ) | ΔC/C (%) | ΔV/V (%) |
|---|---|---|---|---|---|---|---|---|
| 110 | 0  | 362 | 1.6 | 8  | 15 | 27 | −2.8 | −1.2 |
| 111 | 2  | 287 | 1.6 | 10 | 15 | 33 | −3.0 | −1.8 |
| 112 | 4  | 288 | 1.5 | 10 | 15 | 25 | −3.0 | −1.8 |
| 113 | 8  | 289 | 1.5 | 10 | 15 | 20 | −3.0 | −1.8 |
| 114 | 12 | 290 | 1.5 | 10 | 15 | 10 | −3.0 | −1.8 |
| 115 | 15 | 290 | 1.5 | 10 | 15 | 8  | −3.0 | −1.8 |
| 116 | 18 | 290 | 1.5 | 10 | 15 | 5  | −3.0 | −1.8 |
| 117 | 20 | 290 | 1.5 | 10 | 15 | 5  | −2.9 | −1.8 |
| 118 | 22 | 290 | 1.5 | 10 | 15 | 5  | −2.9 | −1.8 |

It was confirmed that the laminated ceramic capacitor with a varistor function of Example 4, which was manufactured by using an outer electrode material obtained by adding Pd as well as Li$_2$CO$_3$ to NiO had lower tan δ and lower equivalent series resistance (ESR), compared to the capacitor of Example 3. This is because the added Pd may function as a reducing agent, control the oxidation of the surface of the outer electrodes, and therefore reduce the resistance value thereof. Also, it was confirmed that the same effect of the additive could be attained when Pt, or a mixture of Pd and Pt was added to the outer electrode material.

Although a mixture of NiO and Li$_2$CO$_3$ was used as a powdered starting material for an inner electrode paste in Example 4, a powdered starting material obtained by solubilizing at least one compound containing an atom selected from the group consisting of Li, Na, and K into Ni or an Ni-containing compound can be used for an inner electrode paste as is mentioned in Example 1.

Moreover, although a mixture of NiO, Li$_2$CO$_3$, and Pd was used as a powdered starting material for an outer electrode paste in Example 4, a powdered starting material obtained by solubilizing a combination of at least one compound containing an atom selected from the group consisting of Li, Na, and K and at least one compound containing a Pd atom or a Pt atom into Ni or an Ni-containing compound can be used for an outer electrode paste as is mentioned in Example 1.

EXAMPLE 5

Figure 6:
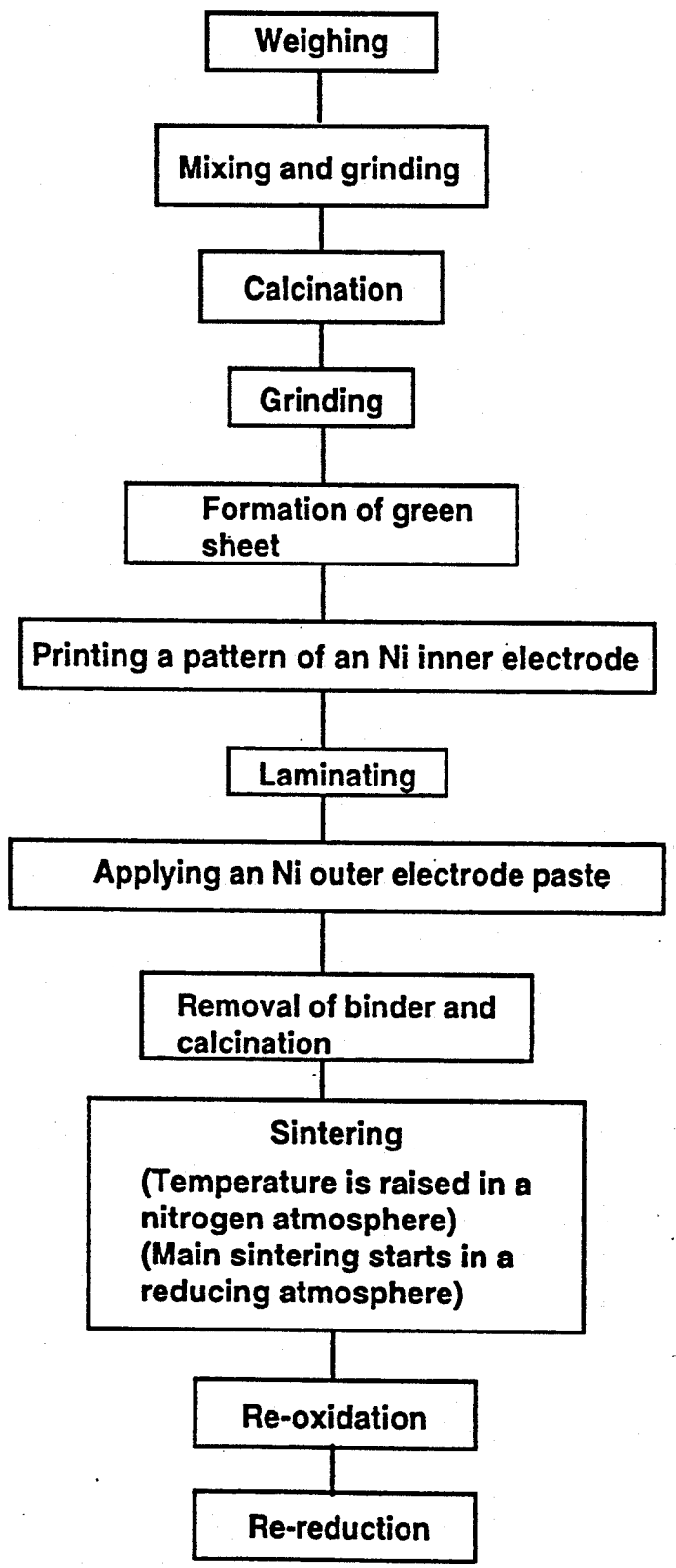
FIG. 6 is a flow chart showing a process for manufacturing the laminated ceramic capacitor with a varistor function in Example 5 of the present invention.

The sintering step of Example 3 was replaced by first heating in a nitrogen atmosphere at an elevated temperature of 1,000° to 1,200° C. and then in a reducing atmosphere at 1,200° to 1,350° C. The same re-oxidation and re-reduction steps as in Example 3 were used to manufacture a laminated ceramic capacitor with a varistor function. FIG. 6 is a flow chart showing this manufacturing process.

The other manufacturing conditions such as the number of laminated sheets were identical to those of Examples 1 to 4, and various electrical characteristics were measured as described therein.

Almost the same electrical characteristics as in Example 4 were obtained except that the laminated ceramic capacitor of Example 5 had improved capacitance, and effect in withstanding surge current (350–500 A), compared to that of Example 3. This is because pre-heating in a nitrogen atmosphere during the sintering step prevents the de-lamination of the capacitor, the electrical disconnection of the inner electrodes, and the imperfect contact between the inner electrodes and the outer electrodes as is mentioned in Example 2.

It was confirmed that when the outer electrodes of Example 4 which contained Pd were used in Example 5, the resulting laminated ceramic capacitor with a varistor function had a lower tan δ and equivalent series resistance (ESR) as well as improved capacitance and effect in withstanding surge current. It was also confirmed that this effect of the additive could be attained in the case of using not only Pd, but Pt or a mixture of Pd and Pt.

EXAMPLE 6

Figure 7:
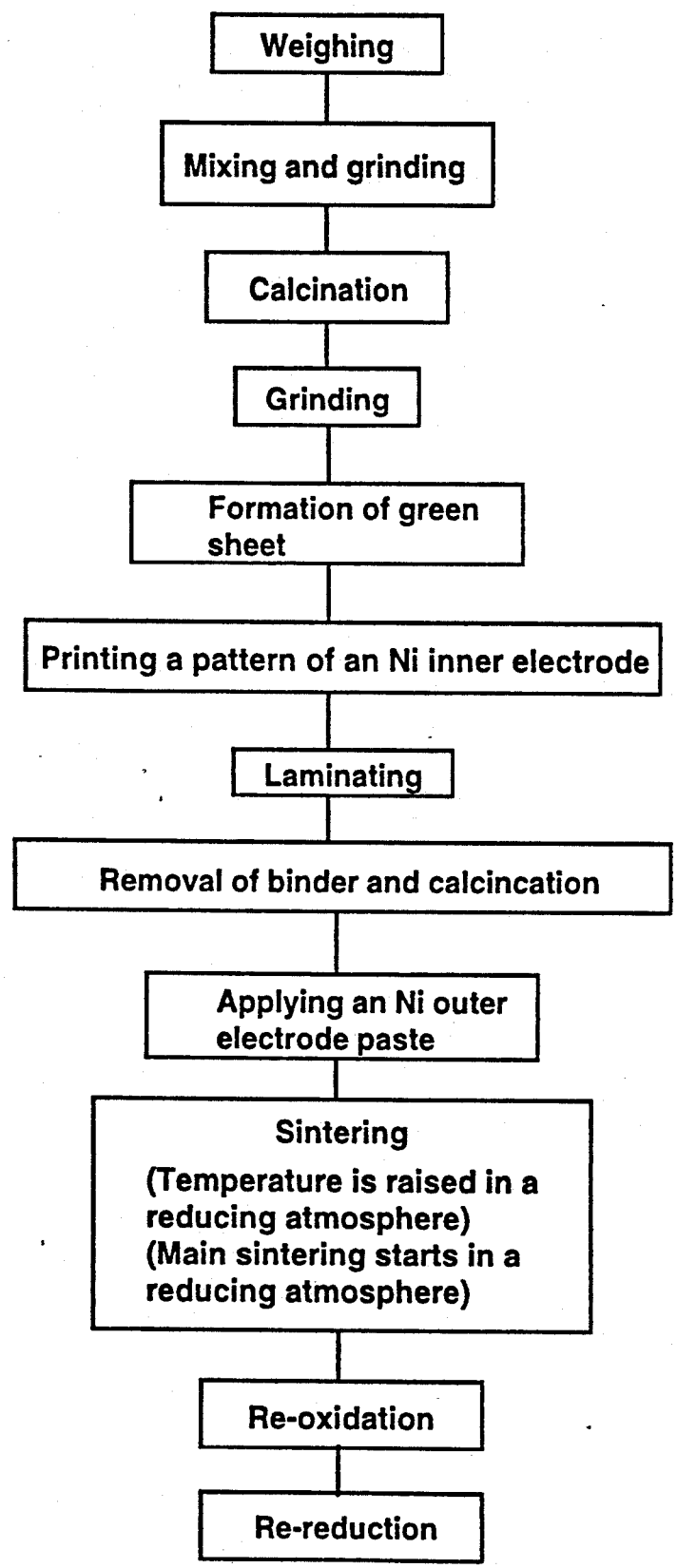
FIG. 7 is a flow chart showing a process for manufacturing the laminated ceramic capacitor with a varistor function in Example 6 of the present invention.

A laminated body prepared by printing patterns with an inner electrode paste, in which 0.5 mol % of Li$_2$CO$_3$ was added to NiO and dispersed in a binder, on green sheets having the same composition as in Examples 1 to 5 was heated at a temperature in the range of 600° to 1,250° C. in air so as to remove the binder, whereby the laminated body was calcinated. Then, an outer electrode paste having the same composition as that of the inner electrode paste was coated on both edges of the inner electrodes of the calcinated body in which terminals of the inner electrodes were exposed alternatively in different directions. The calcinated body was next sintered at a temperature in the range of 1,200° to 1,350° C. in a reducing atmosphere. The calcinated body was re-oxidized by heating at a temperature of 900° to 1,100° C. in air, and then reduced at a temperature of 350° to 800° C. in a reducing atmosphere to manufacture a laminated ceramic capacitor with a varistor function. The electrical characteristics of the laminated ceramic capacitor thus obtained are shown in Table 13. The experimental conditions for preparing the laminated sample were 1,200° C., 2 hours for removal of the binder and calcination in air; 1,300° C., 2 hours for sintering in the reducing atmosphere of N$_2$:H$_2$=99:1; 900° C., 2 hours for re-oxidation in air; and 400° C., 30 minutes for re-reduction in the reducing atmosphere of N$_2$:H$_2$=99:1. Also, the inner electrode paste and the outer electrode paste were prepared by the use of a powder which was obtained by calcinating a mixed powder of NiO and Li$_2$CO$_3$ at 1,100° C. for 2 hours in air. FIG. 7 is a flow chart showing this manufacturing process.

The other manufacturing conditions such as the number of laminated sheets were identical to those of Examples 1 to 5, and various electrical characteristics were measured as described therein.

TABLE 13

Re-oxidation: 900° C. Re-reduction: 400° C.
Inner electrode NiO—Li$_2$CO$_3$ (0.5 mol %)
SrTiO$_3$ (Sr/Ti = 0.97)
Nb$_2$O$_5$: 0.5 mol % MnO$_2$: 1.0 mol % SiO$_2$: 1.0 mol %

| Sample No. | Outer electrode Li$_2$CO$_3$ (mol %) | C (nF) | tan δ (%) | V$_{0.1\ mA}$ (V) | α | ESR (mΩ) | ΔC/C (%) | ΔV/V (%) |
|---|---|---|---|---|---|---|---|---|
| 119 | 0.50 | 357 | 1.6 | 9 | 17 | 26 | −2.5 | −1.1 |

Almost the same electrical characteristics as in Examples 1 to 4 were obtained as shown in Table 13.

The outer electrode paste was coated on the calcinated body from which the binder was removed in Example 6, while it was coated on the laminated body in Examples 3 to 5. According to the experimental results, the ceramic element which was heated at a low temperature of less than 800° C. for removal of the binder and calcination was fragile with lower mechanical strength. Therefore, careful handling was required. On the other hand, the outer electrodes coated on the ceramic element which was heated at a temperature over 1,200° C. and then calcinated were likely to peel off after sintering. Therefore, it is considered that an optimum heating temperature for removal of the binder and calcination is in the range of 800° to 1,200° C.

The outer electrodes were re-reduced at 400° C. for 30 minutes in a reducing atmosphere of $N_2:H_2=99:1$ in Example 6. It was confirmed that when it was re-reduced at lower temperatures, or in the reducing atmosphere containing a lower concentration of $H_2$, oxidized portions remained on the surface of the outer electrodes. When the re-reduction temperature exceeds 700° C., not only the outer electrodes but the ceramic element may be undesirably reduced. For that reason, the re-reduction time should be shortened. An optimum re-reduction temperature was in the range of 400° to 600° C. according to the experimental results.

The effect in withstanding surge current of the laminated ceramic capacitor was 300 to 400 A.

EXAMPLE 7

Figure 8:
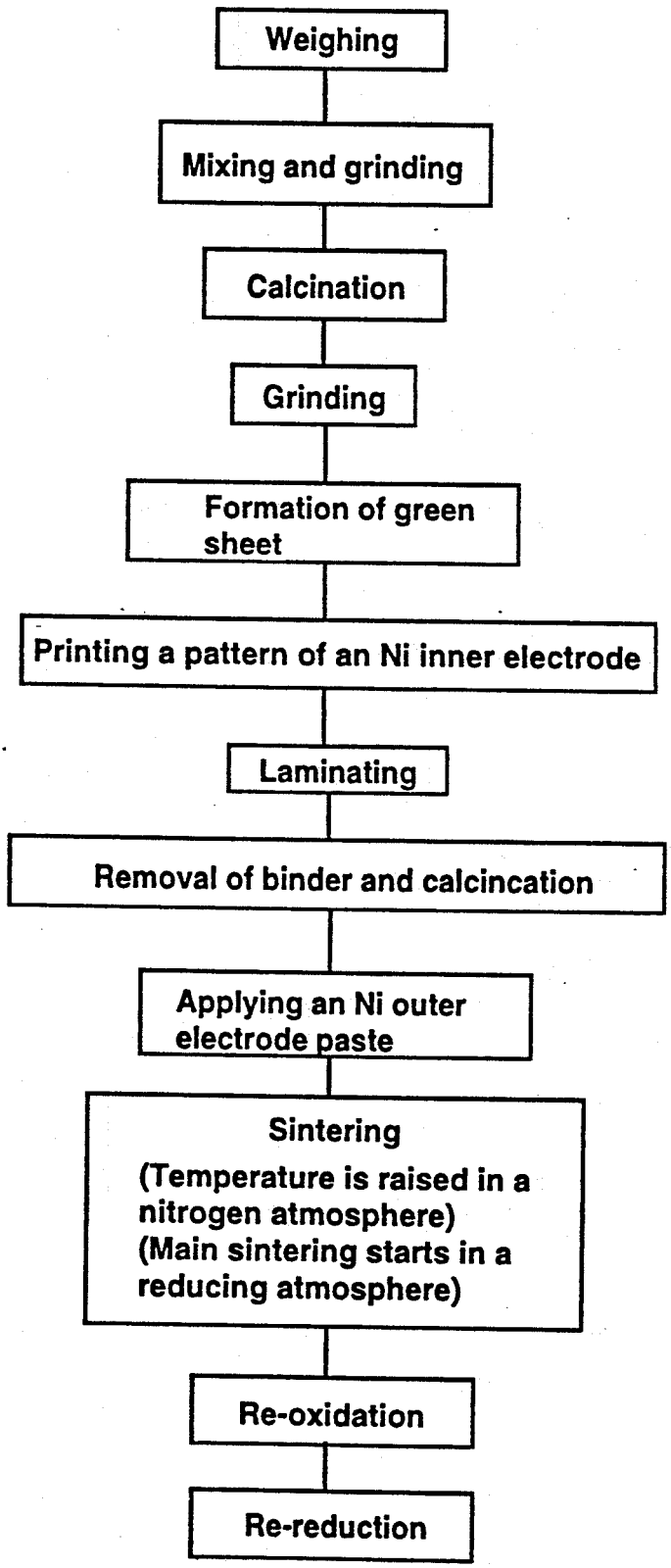
FIG. 8 is a flow chart showing a process for manufacturing the laminated ceramic capacitor with a varistor function in Example 7 of the present invention.

The sintering step of Example 6 was replaced by first heating in a nitrogen atmosphere at an elevated temperature of 1,000° to 1,200° C. and then in a reducing atmosphere at a temperature of 1,200° to 1,350° C. The same re-oxidation and re-reduction steps as in Example 6 were used to manufacture a laminated ceramic capacitor with a varistor function. FIG. 8 is a flow chart showing this manufacturing process.

The other manufacturing conditions such as the number of laminated sheets were identical to those of Examples 1 to 6, and various electrical characteristics were measured as described therein.

Almost the same electrical characteristics as in Example 6 were obtained except that the laminated ceramic capacitor of Example 7 had improved capacitance and effect in withstanding surge current (350–500 A), compared to that of Example 6. This is because preheating in a nitrogen atmosphere during the sintering step prevents the de-lamination of the capacitor, the electrical disconnection of the inner electrodes, and the imperfect contact between the inner electrodes and the outer electrodes as is mentioned in Example 2.

It was confirmed that when the outer electrodes which were made from the outer electrode paste containing further Pd were used in Example 7, the resulting laminated ceramic capacitor with a varistor function had a lower tan δ and equivalent series resistance (ESR) as well as improved capacitance and effect in withstanding surge current. It was also confirmed that this effect of the additive could be attained in the case of using not only Pd, but Pt or a mixture of Pd and Pt.

A powdered starting material obtained by solubilizing at least one compound containing an atom selected from the group consisting of Li, Na, and K into Ni or an Ni-containing compound can be used for inner and outer electrode paste in Examples 5 to 7 as is mentioned in Example 1.

Also, a powdered starting material prepared by solubilizing a combination of at least one compound containing an atom selected from the group consisting of Li, Na, and K and at least one compound containing a Pd atom or a Pt atom into Ni or an Ni-containing compound can be used for an outer electrode paste as is mentioned in Example 1.

As described in Examples 1 to 7, a laminated ceramic capacitor with a varistor function having Ni inner electrodes has been developed. When the Ni which is a base metal is used in the inner electrodes, since Ni is oxidized at relatively low temperatures and the outer electrodes are readily insulated, it has been proposed that an atom such as Li, Na, or K is solubilized into Ni or an Ni-containing compound to prevent the oxidation by valence control. According to this method, the oxidation of the Ni inner electrodes is significantly prevented, and therefore a laminated ceramic capacitor with a varistor function having excellent electrical characteristics for practical use including reliability, and life span can be obtained.

Also, when the outer electrodes containing Ni as its main component are used as well as the inner electrodes, both outer electrodes and inner electrodes contain Ni as their main components, which enables the production of a laminated ceramic capacitor with a varistor function at a low production cost.

Further, when at least one compound containing a Pd atom or a Pt atom is added to the outer electrodes, the electrical characteristics of the laminated ceramic capacitor will be improved.

The Ni outer electrodes (i.e., outer electrodes containing Ni as its main component) have a number of advantages in terms of mounting the capacitor and electrical characteristics of the capacitor such as excellent electrical connection to the Ni inner electrodes (i.e., inner electrodes containing Ni as its main component), thermal resistance to soft solder, low impedance characteristics, less possibility of migration, and the like, compared to conventional Ag or AgPd outer electrodes. However, as is mentioned in Example 3, when the amount of $Li_2CO_3$ added to the outer electrodes is increased, micro-cracks may arise in the vicinity of the outer electrodes of the ceramic element due to the difference in shrinkage ratio between the Ni outer electrodes and the ceramic element, which causes some disadvantages such as poor electrical characteristics, poor reliability, and shorter life span. In order to solve these problems, the following methods have been proposed to narrow the difference in shrinkage ratio:

(1) Adding the same material as that used for a ceramic element to the outer electrode paste;
(2) Controlling the particle size and viscosity of the outer electrode paste;
(3) Examining the sintering conditions; and
(4) Examining the thickness of outer electrode paste after coating.

The methods (1)–(3) are hardly effective, and not substantial solutions. Regarding method (4), when the thickness of the outer electrode paste becomes more than 40 μm, micro-cracks significantly arise. The generation of micro-cracks disappears when the coated thickness is made as thin as possible, resulting in the improvement of electrical characteristics, reliability, and life span of the laminated ceramic capacitor.

However, when the above method (4) is performed, the outer electrodes having a thinner thickness may sometimes cause poor electrical connection to the inner electrodes, and tensile strength of the outer electrodes may sometimes be decreased, which makes it difficult to conduct a testing of the laminated semiconductor ceramic capacitor which is mounted on the substrate.

For that reason, when the thin Ni outer electrodes are covered with another Ag or Ag-Pd outer electrodes, excellent electrical connection to the inner electrodes, and improved tensile strength of the outer electrodes can be attained, which eliminates these problems.

The following examples illustrate a manufacturing process using this method.

EXAMPLE 8

Figure 9:
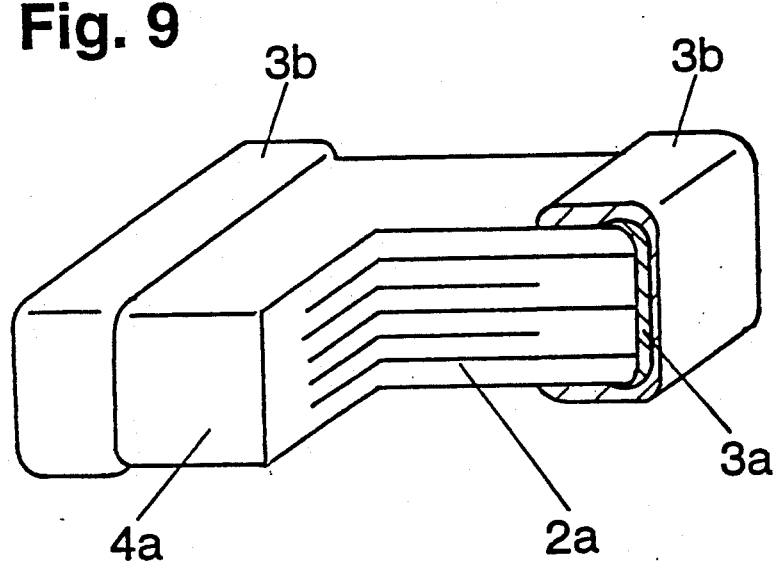
FIG. 9 is a partially cut away view showing the laminated ceramic capacitor with a varistor function obtained from Examples 8 to 21 of the present invention.

First, 0.1 mol % of $Li_2CO_3$ powder was added to a NiO powder having an average particle size of 0.5 μm or less and a purity of 90% or more, and the mixture was calcinated in air at a temperature of 1,100° C. for 2 hours. The calcinated powder was used as a starting material for inner electrodes, and another calcinated powder prepared by adding 1.0 mol % of $Li_2CO_3$ to NiO was used as a starting material for outer electrodes. The powdered starting materials were dispersed in a solvent together with an organic binder such as butyral resin compound to form inner and outer electrode paste. Then, as shown in FIG. 2, a composition of 97 mol % of $SrTiO_3$ (Sr/Ti=0.97), 0.5 mol % of $Nb_2O_5$, 0.5 mol % of $Ta_2O_5$, 1.0 mol % of $MnO_2$, and 1.0 mol % of $SiO_2$ was formed into green sheets 1a, 1b and 1c with a thickness of about 30 μm by the doctor blade method, and the green sheets 1b were cut into a predetermined size. Patterns of the inner electrode paste 2 was printed on the green sheets 1b by the screen printing method in accordance with the predetermined size, as shown in FIG. 2. As is apparent from FIG. 2, the Ni inner electrode paste 2 was not printed on the uppermost and lowermost green sheets 1a and 1c. The patterns of inner electrode paste 2 printed on the intermediate layers of the laminated green sheets 1b reach one edge of the sheets, and the green sheets are stacked in such a manner that the edges which the inner electrodes reach are alternatley overlaid and the edges which the inner electrodes do not reach are alternately overlaid. The uppermost and lowermost green sheets 1a and 1c were placed on the uppermost and lowermost parts (usually, a plurality of green sheets 1b are laminated), and the green sheets 1b printed with the above inner electrode paste thereon were laminated therebetween. Then, the laminated green sheets 1b were heat-pressed and contacted together with the uppermost and lowermost green sheets 1a and 1c to obtain a laminated body. Then, the outer electrode paste (i.e., lower layer outer electrode paste) containing Ni as its main component was coated to a thickness of about 20 μm on both edges of the laminated body in which terminals of the inner electrode paste 2 were exposed alternatively to the opposing ends. The laminated body was then heated at a temperature in the range of 600° to 1,250° C. in air so as to remove the binder, whereby the laminated body was calcinated. The calcinated body was sintered by heating at 1,200° to 1,350° C. in a reducing atmosphere. After sintering, another Ag or Ag-Pd (containing 10% by weight of Pd) outer electrode paste (i.e., upper layer outer electrode paste) was coated on the outer electrodes 3a and the Ag paste was baked by heating at 600° to 950° C. in air, thereby obtaining a laminated ceramic capacitor 4a with a varistor function, as shown in FIG. 9, comprising a plurality of inner electrodes 2a in the ceramic element, the terminals of the inner electrodes 2a reaching each of opposite edges of the ceramic element alternatively one by one; and the outer electrodes 3a being placed at opposite edges of the ceramic element so that the outer electrodes 3a can be connected electrically to the terminals of the inner electrodes 2a exposed to the edges of the element alternatively, and another Ag or Ag-Pd outer electrodes 3b being placed on the outer electrodes 3a.

Figure 10:
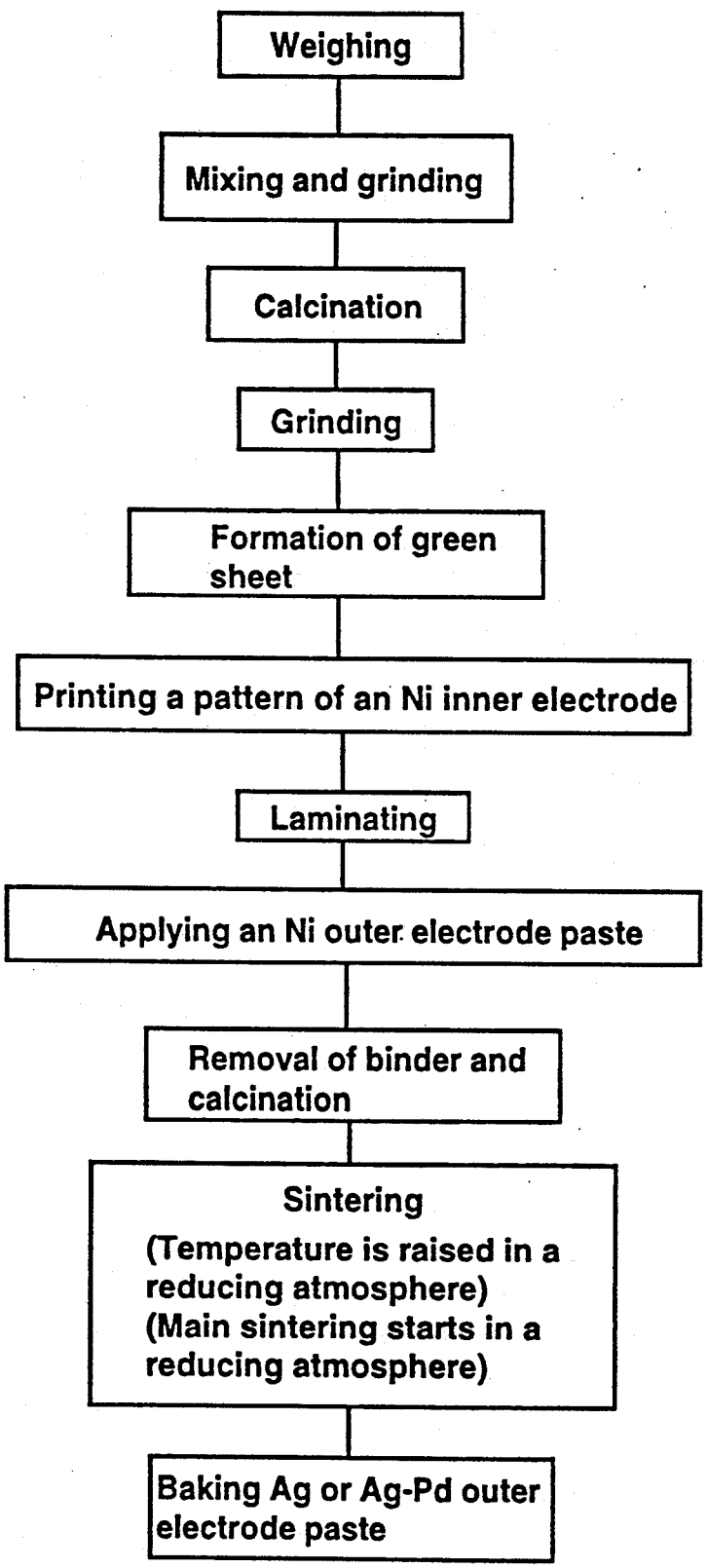
FIG. 10 is a flow chart showing a process for manufacturing the laminated ceramic capacitor with a varistor function in Example 8 of the present invention.

Size of the laminated ceramic capacitor with a varistor function, abbreviated as Type 1.3, is 1.60 mm in width, 3.20 mm in length, and 1.20 mm in thickness. The capacitor comprises 30 effective sheets on which patterns of inner electrodes are printed. FIG. 10 is a flow chart showing a manufacturing process of the present invention.

In the laminated ceramic capacitor with a varistor function thus manufactured, electrical characteristics such as a capacitance, tan δ, a varistor voltage, a voltage non-linear index α, an equivalent series resistance (ESR), an effect in withstanding surge current are shown in Tables 14 and 15.

Each electrical characteristic was obtained under the following experimental conditions. The experimental conditions for preparing the laminated samples were 1,050° C., 2 hours for removal of the binder and calcination in air; and 1,250° C., 2 hours for sintering in the reducing atmosphere of $N_2:H_2=99:1$.

Capacitance C was measured at 1.0 V and 1.0 kHz.

Varistor voltage $V_{0.1mA}$ was measured at 0.1 mA.

Voltage non-linear index α was calculated from the values of varistor voltage measured at 0.1 mA and 1.0 mA, respectively, using the following equation:

$$\alpha = 1/\log(V_{1mA}/V_{0.1mA}).$$

Equivalent series resistance (ESR) is defined as a resistance at the resonance frequency measured at 1.0 V.

Effect in Withstanding surge current was calculated by measuring the maximum current observed under the conditions that current wave was 8×20 μS, and the variation of a varistor voltage $V_{0.1mA}$ changed by 10%.

TABLE 14

| Sample No. | Baking temperature (°C.) | Capacitance (nF) | Varistor voltage $V_{0.1\ mA}$ (V) | α | tan δ (%) | ESR (mΩ) | (Ag outer electrode) Withstanding surge current (A) |
|---|---|---|---|---|---|---|---|
| *120 | 600 | — | — | — | — | — | — |
| *121 | 650 | — | — | — | — | — | — |
| *122 | 700 | — | — | — | — | — | — |
| *123 | 750 | — | — | — | — | — | — |
| 124 | 800 | 205 | 17.0 | 12.0 | 3.0 | 12.0 | 250 |
| 125 | 850 | 188 | 18.5 | 12.0 | 4.1 | 12.0 | 250 |
| 126 | 900 | 164 | 21.5 | 12.1 | 5.0 | 12.4 | 250 |

TABLE 15

| Sample No. | Baking temperature (°C.) | Capacitance (nF) | Varistor voltage $V_{0.1}$ mA (V) | α | tan δ (%) | ESR (mΩ) | (Ag—Pd outer electrode) Withstanding surge current (A) |
|---|---|---|---|---|---|---|---|
| *127 | 600 | — | — | — | — | — | — |
| *128 | 650 | — | — | — | — | — | — |
| *129 | 700 | — | — | — | — | — | — |
| *130 | 750 | — | — | — | — | — | — |
| 131 | 800 | 200 | 17.5 | 12.0 | 3.0 | 17.3 | 250 |
| 132 | 850 | 179 | 19.2 | 12.0 | 4.2 | 17.3 | 250 |
| 133 | 900 | 155 | 22.1 | 12.3 | 5.0 | 17.4 | 250 |

The samples marked by the symbol * in Tables 14 and 15 are comparative examples. These samples of semiconductive ceramic elements marked by the symbol * are not sufficiently re-oxidized and short-circuited because the baking temperature of the Ag or Ag-Pd outer electrodes is less than 800° C. Therefore, the electrical characteristics of these elements are not measured. When the baking temperature is increased to a temperature in the range of 800° to 950° C., the ceramic element is sufficiently oxidized, and the electrical characteristics of a laminated ceramic capacitor with a varistor function can be attained. Also, the laminated ceramic capacitors having Ag outer electrodes have slightly lower equivalent series resistance (ESR) than those having Ag-Pd outer electrodes because Pd has a slightly higher resistivity than Ag.

Also, it was confirmed that the effect in withstanding surge current of the laminated ceramic capacitor was 250 A. When there arise micro-cracks in the ceramic element, the effect in withstanding surge current is usually decreased to 50 A or less. For that reason, it was considered that the generation of micro-cracks did not arise in the vicinity of the outer electrodes of the ceramic element.

No micro-cracks were confirmed when observing the inside of the sintered body with a metal microscope.

Moreover, it was confirmed that the electrical connection of the laminated ceramic capacitor obtained in Example 8, and the tensile strength of its outer electrodes were sufficient for the laminated ceramic capacitor to be mounted on the substrate.

The outer electrodes containing 1.0 mol % of $Li_2CO_3$ were used in Example 8. However, it was confirmed that the outer electrodes containing less than 1.0 mol % of $Li_2CO_3$ provided the same effect.

It was also confirmed that when Pd was further added to the $NiO-Li_2CO_3$ lower layer outer electrode paste, the resulting laminated ceramic capacitor had a lower tan δ and lower equivalent series resistance (ESR). It was observed that a relatively high resistant layer was formed at the boundary between the Ni lower layer outer electrodes and the Ag or Ag-Pd upper layer outer electrodes when Pd was not added to the lower layer outer electrode paste. On the other hand, it was confirmed that such a resistant layer was not formed when Pd was added to the lower layer outer electrode paste because an alloy of Ni and Ag or Ag-Pd is formed through the added Pd. However, this phenomenon was effective only when Pd was added to the lower layer outer electrode paste, but it was not effective even though Pd was added to the upper layer outer electrode paste. Also, Pt, or a combination of Pd and Pt provided the same effect.

EXAMPLE 9

Figure 11:
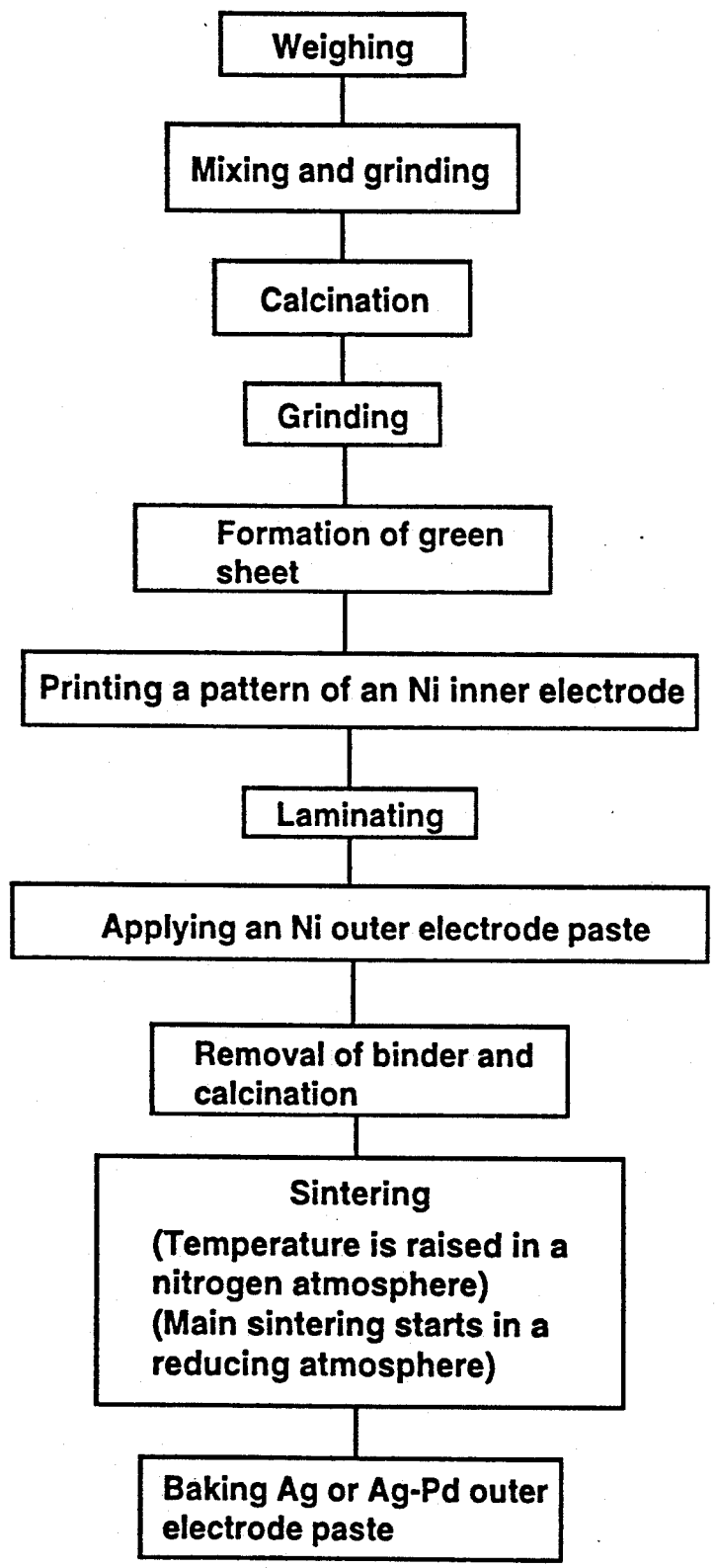
FIG. 11 is a flow chart showing a process for manufacturing the laminated ceramic capacitor with a varistor function in Example 9 of the present invention.

The sintering step of Example 8 was replaced by first heating in a nitrogen atmosphere at an elevated temperature of 1,000° to 1,200° C. and then in a reducing atmosphere at a temperature of 1,200° to 1,350° C. A laminated ceramic capacitor with a varistor function was prepared by the same procedure as in Example 8 except for this sintering step. FIG. 11 is a flow chart showing this manufacturing process.

The other manufacturing conditions such as the number of laminated sheets were identical to those of Example 8, and various electrical characteristics were measured as described therein.

Almost the same electrical characteristics as in Example 8 were obtained except that the laminated ceramic capacitor of Example 9 had improved capacitance and effect in withstanding surge current (300 A), compared to that of Example 8. This is because preheating in a nitrogen atmosphere during the sintering step prevents the de-lamination of the capacitor, the disconnection of the inner electrodes, and the imperfect contact between the inner electrodes and the outer electrodes as is mentioned in Example 2.

It was confirmed that when Pd was further added to the outer electrode paste, the resulting laminated ceramic capacitor had a lower tan δ and equivalent series resistance (ESR) as well as improved capacitance and effect in with standing surge current. Also, Pt, or a combination of Pd and Pt provided the same effect.

EXAMPLE 10

Figure 12:
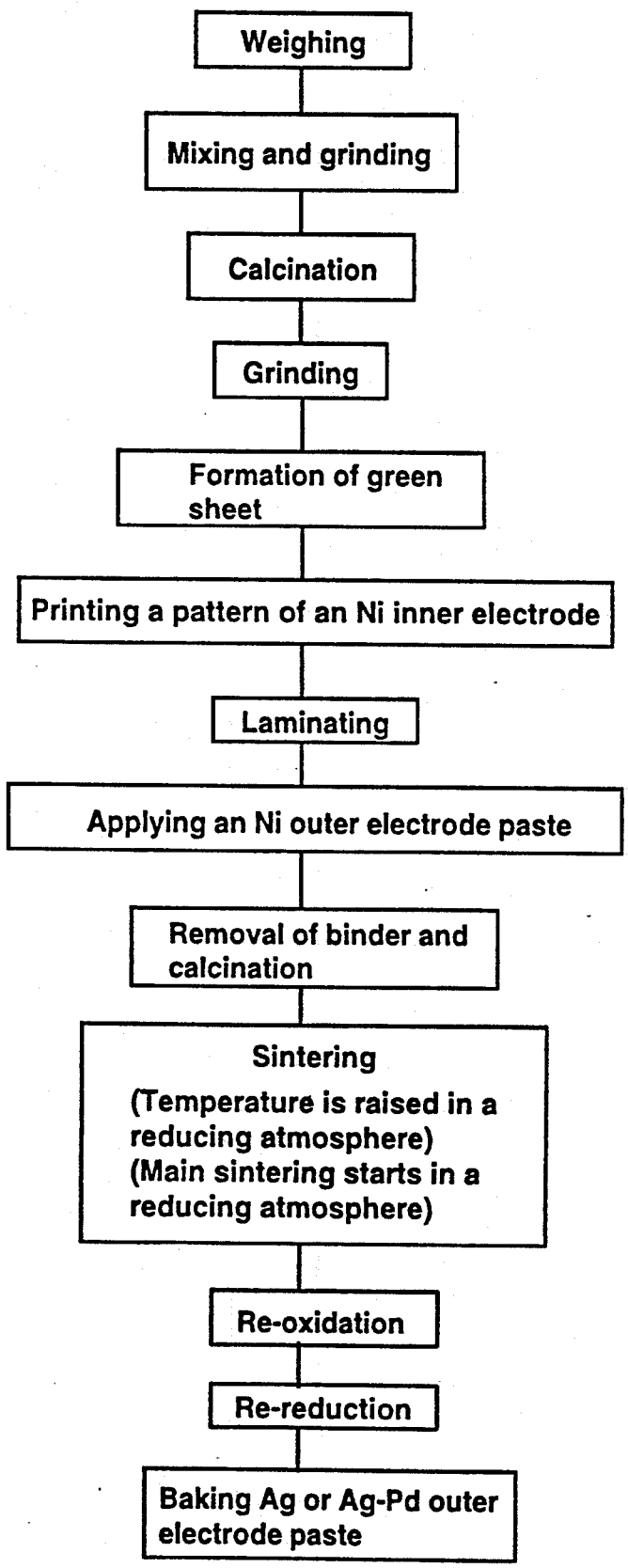
FIG. 12 is a flow chart showing a process for manufacturing the laminated ceramic capacitor with a varistor function in Example 10 of the present invention.

The sintered body obtained by the same procedure as in Examples 8 and 9 was re-oxidized at 900° C. for 1 hour in air, re-reduced at 400° C. for 1 hour in the reducing atmosphere of $N_2$: $H_2$=99:1, followed by coating the Ni outer electrodes (i.e., lower layer outer electrodes) with an Ag or Ag-Pd outer electrode paste (i.e., upper layer outer electrode paste), and then baked at 600° to 950° C. in air to prepare a laminated ceramic capacitor with a varistor function. The electrical characteristics of the laminated ceramic capacitor thus obtained are shown in Tables 16 and 17. Also, FIG. 12 is a flow chart showing the manufacturing process of this example.

The other manufacturing conditions such as the number of laminated sheets were identical to those of Examples 8 and 9, and various electrical characteristics were measured as described therein.

TABLE 16

| Sample No. | Baking temperature (°C.) | Capacitance (nF) | Varistor voltage $V_{0.1\ mA}$ (V) | α | (Ag outer electrode) | | Withstanding surge current (A) |
|---|---|---|---|---|---|---|---|
| | | | | | tan δ (%) | ESR (mΩ) | |
| 134 | 600 | 502 | 6.9 | 10.2 | 2.1 | 10.2 | 250 |
| 135 | 650 | 351 | 9.8 | 10.3 | 2.5 | 10.2 | 250 |
| 136 | 700 | 280 | 12.5 | 11.5 | 2.5 | 11.5 | 250 |
| 137 | 750 | 232 | 15.2 | 11.9 | 2.5 | 11.5 | 250 |
| 138 | 800 | 200 | 17.2 | 12.1 | 3.0 | 12.0 | 250 |
| 139 | 850 | 183 | 19.1 | 12.2 | 4.1 | 12.0 | 250 |
| 140 | 900 | 159 | 22.1 | 12.5 | 5.0 | 12.5 | 250 |

TABLE 17

| Sample No. | Baking temperature (°C.) | Capacitance (nF) | Varistor voltage $V_{0.1\ mA}$ (V) | α | (Ag—Pd outer electrode) | | Withstanding surge current (A) |
|---|---|---|---|---|---|---|---|
| | | | | | tan δ (%) | ESR (mΩ) | |
| 141 | 600 | 489 | 7.0 | 10.2 | 2.1 | 15.8 | 250 |
| 142 | 650 | 346 | 10.0 | 10.3 | 2.5 | 15.9 | 250 |
| 143 | 700 | 278 | 12.7 | 11.4 | 2.5 | 16.5 | 250 |
| 144 | 750 | 228 | 15.6 | 11.8 | 2.5 | 16.5 | 250 |
| 145 | 800 | 198 | 17.8 | 12.0 | 3.0 | 17.2 | 250 |
| 146 | 850 | 178 | 19.6 | 12.1 | 4.2 | 17.2 | 250 |
| 147 | 900 | 152 | 22.5 | 12.4 | 5.0 | 17.4 | 250 |

Almost the same electrical characteristics as in Examples 8 and 9 were obtained as shown in Tables 16 and 17.

The electrical characteristics of the laminated ceramic capacitor with a varistor function of Example 10 are obtained when the baking temperature of the Ag or Ag-Pd outer electrodes is even in the range of 600° to 800° C., or in the range of 800° to 950° C. because the re-oxidation step is inserted in Example 10 unlike Examples 8 and 9.

However, when the re-reduction temperature exceeds 700° C. in a reducing atmosphere after the re-oxidation, not only the outer electrodes but the ceramic element may be reduced. For that reason, the re-reduction time, or $H_2$ concentration should be controlled. Optimum re-reduction temperature was in the range of 400° to 600° C. according to the experimental results.

Moreover, it was confirmed that the electrical connection of the laminated ceramic capacitor obtained in Example 10, and the tensile strength of its outer electrodes were suitable for the laminated ceramic capacitor to be mounted on the substrate.

It was also confirmed that when Pd was further added to the $NiO\text{-}Li_2CO_3$ outer electrode paste, the resulting laminated ceramic capacitor had lower tan δ and lower equivalent series resistance (ESR). Also, Pt, or a combination of Pd and Pt provided the same effect.

EXAMPLE 11

Figure 13:
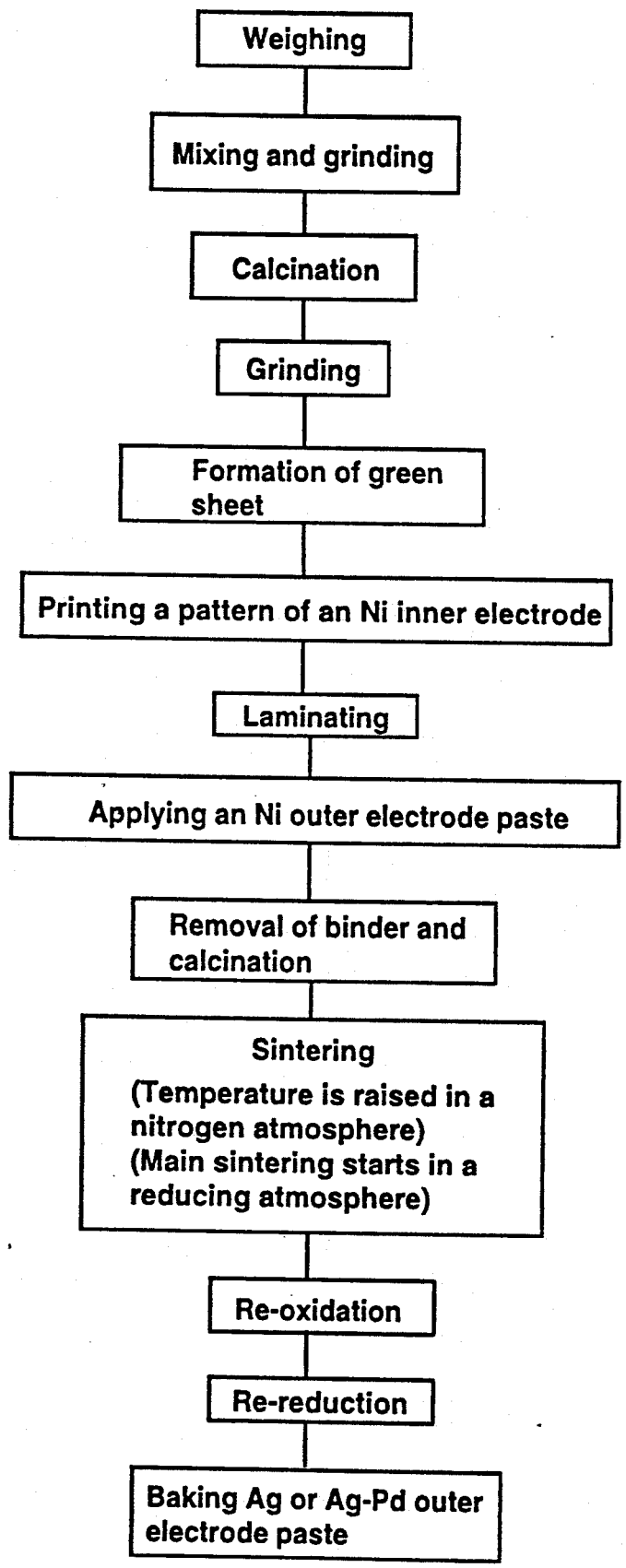
FIG. 13 is a flow chart showing a process for manufacturing the laminated ceramic capacitor with a varistor function in Example 11 of the present invention.

The sintering step of Example 10 was replaced by first heating in a nitrogen atmosphere at an elevated temperature of 1,000° to 1,200° C. and then in a reducing atmosphere at a temperature of 1,200° to 1,350° C. The sintered ceramic capacitor with a varistor function was manufactured by the same procedure as in Example 10 except for this sintering step. FIG. 13 is a flow chart showing this manufacturing process.

The other manufacturing conditions such as the number of laminated sheets were identical to those of Examples 8 to 10, and various electrical characteristics were measured as described therein.

Almost the same electrical characteristics as in Examples 8 to 10 were obtained except that the laminated ceramic capacitor of Example 11 had improved capacitance and effect in withstanding surge current (300 A), compared to that of Example 10. This is because preheating in a nitrogen atmosphere during the sintering step prevents the de-lamination of the capacitor, the disconnection of the inner electrodes, and the imperfect contact between the inner electrodes and the outer electrodes as is mentioned in Example 2.

It was also confirmed that when Pd was further added to the lower layer outer electrode paste, the resulting laminated ceramic capacitor had a lower tan δ and equivalent series resistance (ESR) as well as the improved capacitance and effect in withstanding surge current. Also, Pt, or a combination of Pd and Pt provided the same effect.

EXAMPLE 12

Figure 14:
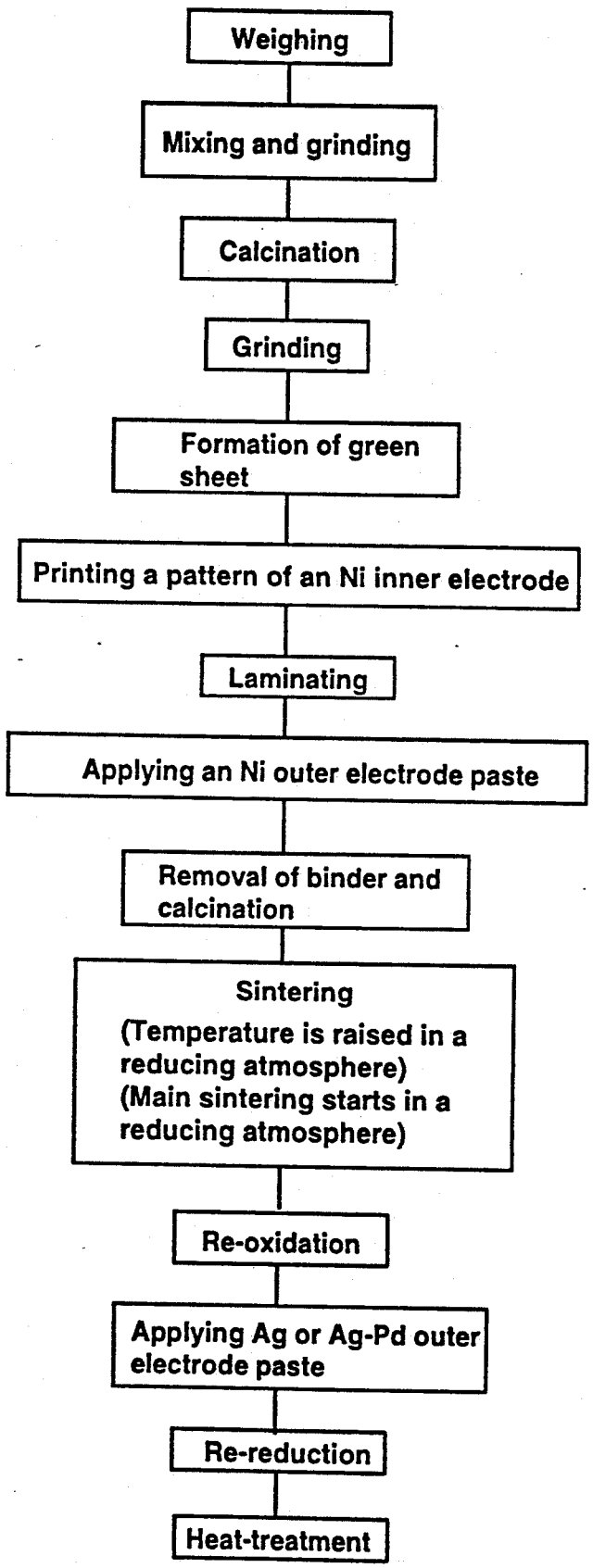
FIG. 14 is a flow chart showing a process for manufacturing the laminated ceramic capacitor with a varistor function in Example 12 of the present invention.

The sintered body obtained by the same procedure as in Examples 8 to 11 was re-oxidized at 900° C. for 1 hour in air, followed by coating the outer electrodes with an Ag or Ag-Pd outer electrode paste, rereduced at 400° C. for 1 hour in the reducing atmosphere of $N_2:H_2=99:1$, and then heat-treated at a temperature in the range of 600° to 950° C. for 30 minutes in air to manufacture a laminated ceramic capacitor with a varistor function. The electrical characteristics of the laminated ceramic capacitor with a varistor function are shown in Tables 18 and 19. FIG. 14 is a flow chart showing the manufacturing process of this example.

The other manufacturing conditions such as the number of laminated sheets were identical to those of Examples 8 to 11, and various electrical characteristics were measured as described therein.

TABLE 18

| Sample No. | Heat treatment temperature (°C.) | Capacitance (nF) | Varistor voltage $V_{0.1 mA}$ (V) | α | tan δ (%) | ESR (mΩ) | (Ag outer electrode) Withstanding surge current (A) |
|---|---|---|---|---|---|---|---|
| 148 | 600 | 503 | 7.0 | 10.5 | 2.1 | 10.3 | 250 |
| 149 | 650 | 353 | 10.0 | 10.7 | 2.5 | 10.3 | 250 |
| 150 | 700 | 282 | 12.7 | 11.8 | 2.5 | 11.4 | 250 |
| 151 | 750 | 233 | 15.3 | 12.4 | 2.5 | 11.5 | 250 |
| 152 | 800 | 202 | 17.3 | 12.6 | 3.0 | 12.1 | 250 |
| 153 | 850 | 184 | 19.2 | 12.8 | 4.1 | 12.1 | 250 |
| 154 | 900 | 160 | 22.2 | 12.8 | 5.0 | 12.6 | 250 |

TABLE 19

| Sample No. | Heat treatment temperature (°C.) | Capacitance (nF) | Varistor voltage $V_{0.1}$ mA (V) | α | tan δ (%) | ESR (mΩ) | (Ag—Pd outer electrode) Withstanding surge current (A) |
|---|---|---|---|---|---|---|---|
| 155 | 600 | 491 | 7.1 | 10.4 | 2.1 | 15.9 | 250 |
| 156 | 650 | 347 | 10.2 | 10.5 | 2.5 | 15.9 | 250 |
| 157 | 700 | 279 | 12.6 | 11.9 | 2.5 | 16.6 | 250 |
| 158 | 750 | 228 | 15.8 | 12.0 | 2.5 | 16.6 | 250 |
| 159 | 800 | 199 | 17.9 | 12.2 | 3.0 | 17.2 | 250 |
| 160 | 850 | 179 | 19.7 | 12.4 | 4.1 | 17.2 | 250 |
| 161 | 900 | 153 | 22.6 | 12.7 | 5.0 | 17.5 | 250 |

Almost the same electrical characteristics as in Examples 8 to 11 were obtained as shown in Tables 18 and 19.

The method of Example 12 comprises the steps of: coating the sintered body with the Ag or Ag-Pd outer electrode paste immediately after the re-oxidation; re-reducing in a reducing atmosphere; and heattreating the body in air. The resulting laminated ceramic capacitor has higher capacitance, varistor voltage product, and voltage non-linear index than those of Examples 10 and 11. However, as described in Examples 10 and 11, when the re-reduction temperature exceeds 700° C. in a reducing atmosphere after the reoxidation, not only the outer electrodes but the ceramic element may be reduced. For that reason, the rereduction time or $H_2$ concentration should be controlled. Optimum re-reduction temperature was in the range of 400° to 600° C. according to the experimental results.

Moreover, it was confirmed that the electrical connection of the laminated ceramic capacitor obtained in this example, and the tensile strength of its outer electrodes were suitable for the laminated ceramic capacitor to be mounted on the substrate.

It was also confirmed that when Pd was further added to the $NiO\text{-}Li_2CO_3$ outer electrode paste, the resulting laminated ceramic capacitor had a lower tan δ, and equivalent series resistance (ESR). Also, Pt, or a combination of Pd and Pt provided the same effect.

EXAMPLE 13

Figure 15:
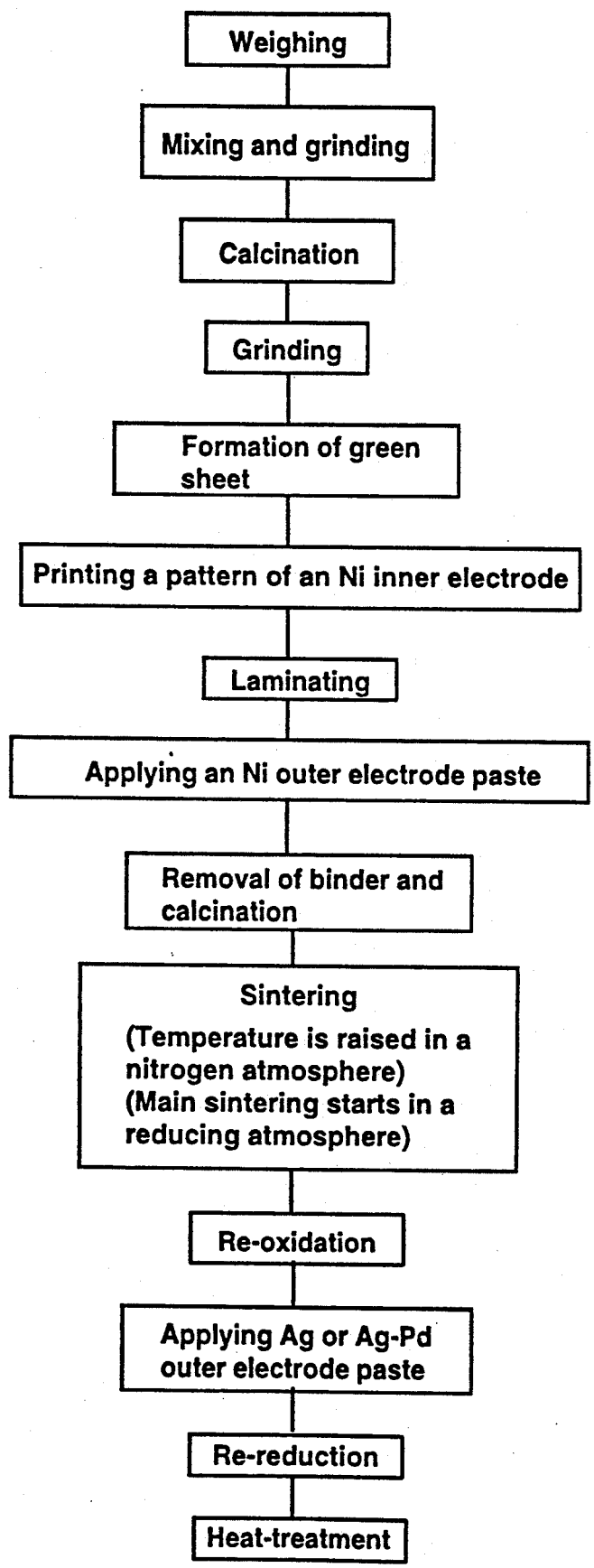
FIG. 15 is a flow chart showing a process for manufacturing the laminated ceramic capacitor with a varistor function in Example 13 of the present invention.

The sintering step of Example 12 was replaced by first heating in a nitrogen atmosphere at an elevated temperature of 1,000° to 1,200° C. and then in a reducing atmosphere at a temperature of 1,200° to 1,350° C. A laminated ceramic capacitor with a varistor function was prepared by the same procedure as in Example 12 except for this sintering step. FIG. 15 is a flow chart showing this manufacturing process.

The other manufacturing conditions such as the number of laminated sheets were identical to those of Examples 8 to 12, and various electrical characteristics were measured as described therein.

Almost the same electrical characteristics as in Examples 8 to 12 were obtained except that the laminated ceramic capacitor of Example 13 had improved capacitance and effect in withstanding surge current (300 A), compared to that of Example 12. This is because preheating in a nitrogen atmosphere during the sintering step prevents the de-lamination of the capacitor, the disconnection of the inner electrodes, and the imperfect contact between the inner electrodes and the outer electrodes as is mentioned in Example 2.

It was also confirmed that when Pd was further added to the lower outer electrode paste, the resulting laminated capacitor had a lower tan $\delta$ and equivalent series resistance (ESR) as well as the improved capacitance and effect in withstanding surge current. Also, Pt, or a combination of Pd and Pt provided the same effect.

According to six different methods of Examples 8 to 13, a laminated ceramic capacitor with a varistor function having satisfactory electrical characteristics and mechanical strength can be prepared by coating a laminated body with an Ni outer electrode paste. In the methods of Examples 8 and 9, the baking step of the Ag or Ag-Pd outer electrodes can also be the re-oxidation step of the ceramic element. Therefore, the baking temperature is limited to 800° C. or more, which makes it difficult to control the electrical characteristics of the laminated ceramic capacitor such as capacitance and varistor voltage. However, the resulting laminated ceramic capacitor has constant electrical characteristics with good yield, and good reproducibility for practical uses. On the other hand, since the methods of Examples 10 to 13 involve a reoxidation step provided in addition to the baking step, the regulation of the re-oxidation temperature and of the temperatures in the succeeding steps makes it easier to control the electrical characteristics. However, there is another aspect to these methods in that it is difficult to control the re-reduction step in a reducing atmosphere after the re-oxidation. Also, the electrical characteristics of the laminated ceramic capacitor arise in Examples 8 and 9 when the baking temperature of the Ag or Ag-Pd outer electrodes reaches 800° C., not only because the grain boundaries of the ceramic element are oxidized, but because glass flax is contained in the outer electrode paste.

In the methods of Examples 8 to 13, a laminated ceramic capacitor with a varistor function was prepared by coating a laminated body with an Ni outer electrode paste (i.e., outer electrode paste containing Ni as its main component). The following Examples 14 to 19 illustrate a method for manufacturing a laminated ceramic capacitor with a varistor function by coating the calcinated body in which the binder is removed with an Ni outer electrode paste (i.e., outer electrode paste containing Ni as its main component).

EXAMPLE 14

Figure 16:
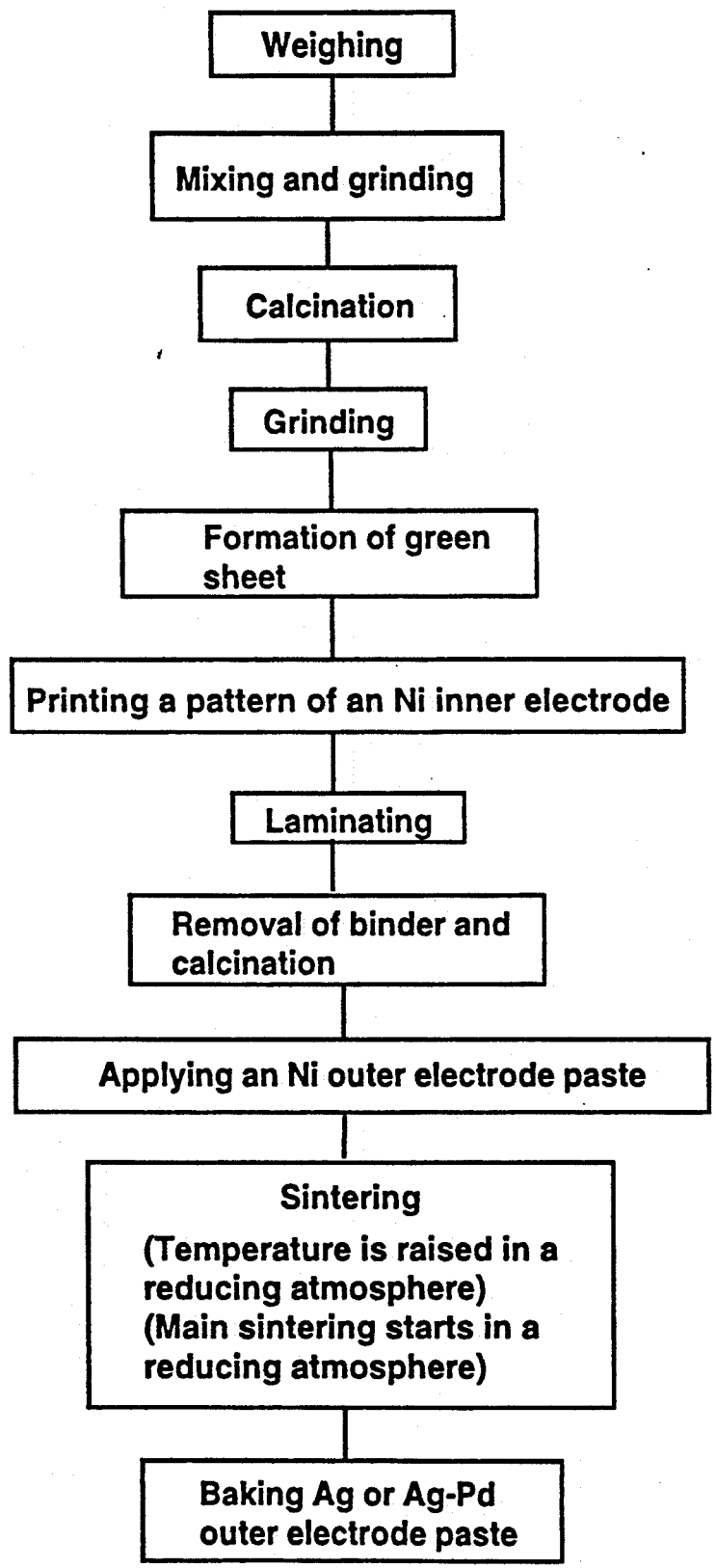
FIG. 16 is a flow chart showing a process for manufacturing the laminated ceramic capacitor with a varistor function in Example 14 of the present invention.

The laminated body obtained by using the inner electrode paste having the same composition and the same inner electrodes as in Examples 8 to 13 was heated at a temperature of 1,050° C. in air, whereby the binder was removed and the laminated body was calcinated. Then, Ni outer electrode paste (i.e., lower layer outer electrode paste) was coated to a thickness of 20 μm on both edges of the calcinated body in which terminals of the inner electrodes were exposed alternatively in opposite directions. The calcinated body was sintered at 1,250° C. in the reducing atmosphere of $N_2:H_2=99:1$, followed by coating the outer electrodes with an Ag or Ag-Pd outer electrode paste (i.e., upper layer outer electrode paste), and baked at a temperature in the range of 600° to 950° C. in air. The electrical characteristics of the laminated ceramic capacitor thus manufactured are shown in Tables 20 and 21. FIG. 16 is a flow chart showing the manufacturing process of this example.

The other manufacturing conditions such as the number of laminated sheets were identical to those of Examples 8 to 13, and various electrical characteristics were measured as described therein.

TABLE 20

| Sample No. | Baking temperature (°C.) | Capacitance (nF) | Varistor voltage $V_{0.1\ mA}$ (V) | $\alpha$ | tan $\delta$ (%) | ESR (mΩ) | (Ag outer electrode) Withstanding surge current (A) |
|---|---|---|---|---|---|---|---|
| *162 | 600 | — | — | — | — | — | — |
| *163 | 650 | — | — | — | — | — | — |
| *164 | 700 | — | — | — | — | — | — |
| *165 | 750 | — | — | — | — | — | — |
| 166 | 800 | 207 | 16.5 | 12.0 | 3.0 | 12.0 | 250 |
| 167 | 850 | 190 | 18.2 | 12.0 | 4.1 | 12.0 | 250 |
| 168 | 900 | 170 | 20.9 | 12.2 | 4.9 | 12.4 | 250 |

TABLE 21

| Sample No. | Baking temperature (°C.) | Capacitance (nF) | Varistor voltage $V_{0.1\ mA}$ (V) | $\alpha$ | tan $\delta$ (%) | ESR (mΩ) | (Ag—Pd outer electrode) Withstanding surge current (A) |
|---|---|---|---|---|---|---|---|
| *169 | 600 | — | — | — | — | — | — |
| *170 | 650 | — | — | — | — | — | — |
| *171 | 700 | — | — | — | — | — | — |
| *172 | 750 | — | — | — | — | — | — |
| 173 | 800 | 205 | 17.2 | 12.0 | 3.0 | 17.3 | 250 |
| 174 | 850 | 182 | 19.0 | 12.0 | 4.2 | 17.3 | 250 |
| 175 | 900 | 158 | 21.6 | 12.2 | 4.9 | 17.4 | 250 |

The samples marked by the symbol * in Tables 20 and 21 are comparative examples. These sintered semiconductive ceramic elements marked by the symbol * are not sufficiently re-oxidized because the baking temperature of the Ag or Ag-Pd outer electrodes is less than 800° C. and short-circuited. When the baking temperature is increased to a temperature in the range of 800° to 950° C., the ceramic element is sufficiently reoxidized, and the electrical characteristics of a laminated ceramic capacitor with a varistor function can be attained. Almost the same electrical characteristics as in Example 8 were obtained. According to the experimental results, the ceramic element which was heated in air at a low temperature of less than 800° C. for removal of the binder and calcination was fragile with lower mechanical strength, and required careful handling. On the other hand, the lower layer outer electrodes coated on the ceramic element which was heated to a temperature over 1,200° C. for removal of the binder and calcination were likely to peel off after sintering. Therefore, optimum heating temperature for the removal of the binder and the calcination was in the range of 800° to 1,200° C.

It was confirmed that the electrical connection of the laminated ceramic capacitor obtained in Example 14, and the tensile strength of its outer electrodes were suitable for the laminated ceramic capacitor to be mounted on the substrate.

EXAMPLE 15

Figure 17:
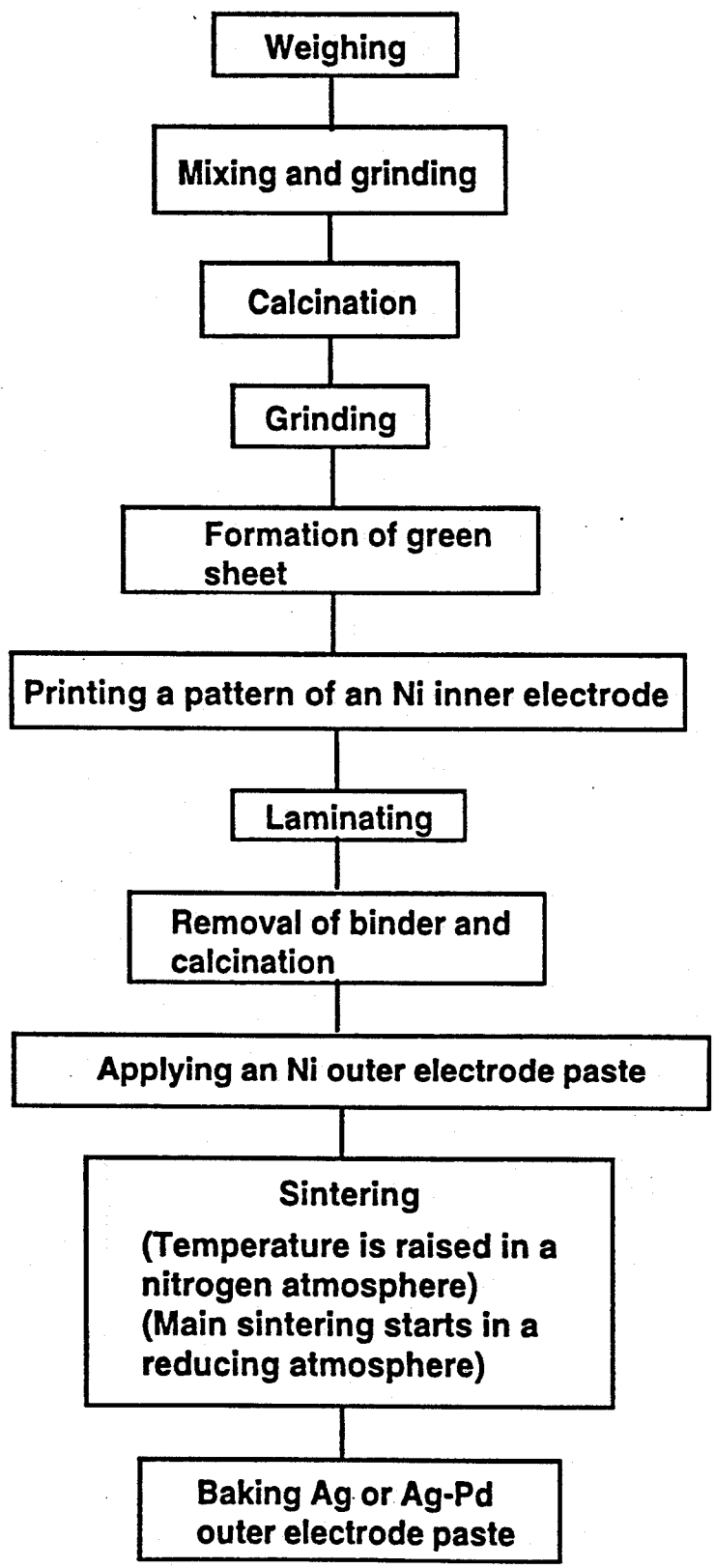
FIG. 17 is a flow chart showing a process for manufacturing the laminated ceramic capacitor with a varistor function in Example 15 of the present invention.

The sintering step of Example 14 was replaced by first heating under a nitrogen atmosphere at an elevated temperature of 1,000° to 1,200° C. and then in a reducing atmosphere at a temperature of 1,200° to 1,350° C. A laminated ceramic capacitor with a varistor function was prepared by the same procedure as in Example 14 except for this sintering step. FIG. 17 is a flow chart showing this manufacturing process.

The other manufacturing conditions such as the number of laminated sheets were identical to those of Example 14, and various electrical characteristics were measured as described therein.

Almost the same electrical characteristics as in Example 14 were obtained except that the laminated ceramic capacitor of Example 15 had improved capacitance and effect in withstanding surge current (300 A), compared to that of Example 14. This is because preheating in a nitrogen atmosphere during the sintering step prevents the de-lamination of the capacitor, the disconnection of the inner electrodes, and the imperfect contact between the inner electrodes and the outer electrodes as is mentioned in Example 2.

It was confirmed that when Pd was further added to the outer electrode paste, the resulting laminated ceramic capacitor had a lower tan δ and equivalent series resistance (ESR) as well as improved capacitance and effect in withstanding surge current. Also, Pt, or a combination of Pd and Pt provided the same effect.

EXAMPLE 16

Figure 18:
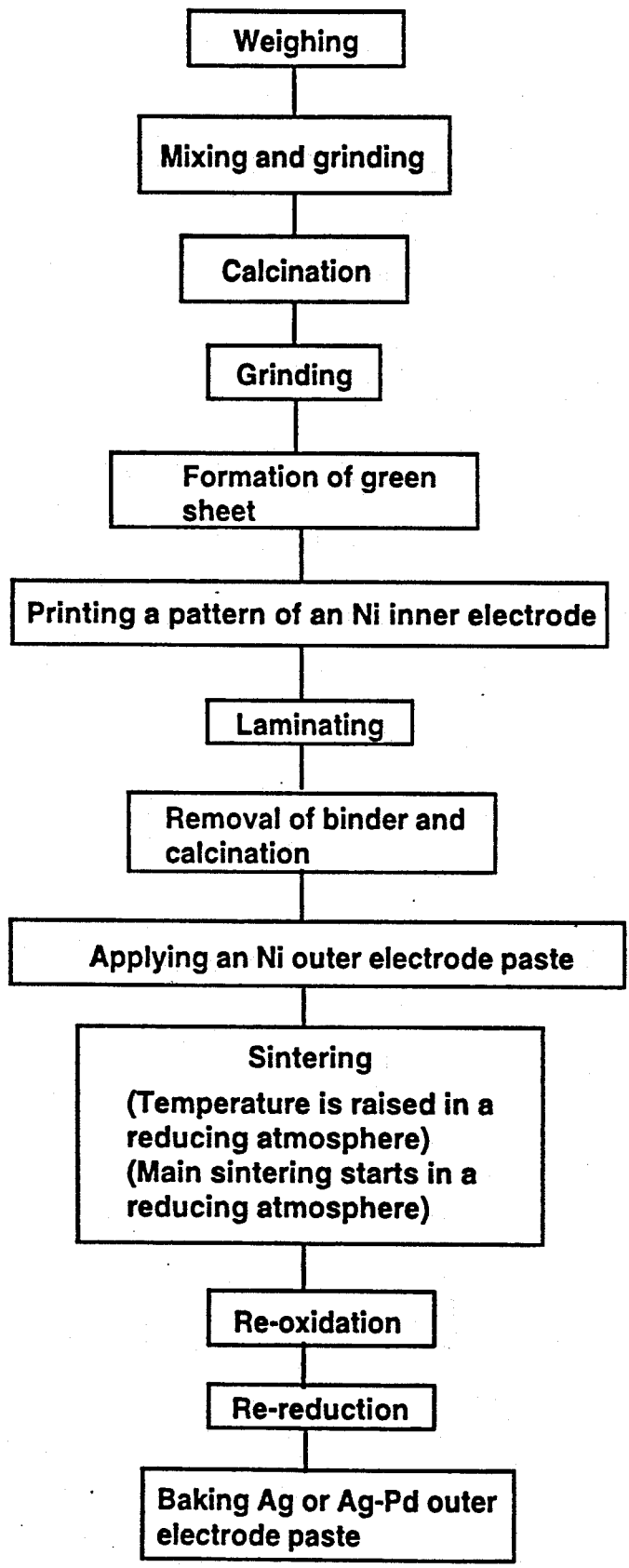
FIG. 18 is a flow chart showing a process for manufacturing the laminated ceramic capacitor with a varistor function in Example 16 of the present invention.

The sintered body obtained by the same procedure as in Examples 14 and 15 was re-oxidized at 900° C. for 1 hour in air, re-reduced at 400° C. for 30 minutes in the reducing atmosphere of $N_2$: $H_2 = 99:1$, followed by coating the Ni outer electrodes with an Ag or Ag-Pd outer electrode paste, and then baked at a temperature of 600° to 950° C. in air to prepare a laminated ceramic capacitor with a varistor function. The electrical characteristics of the laminated ceramic capacitor are shown in Tables 22 and 23. Also, FIG. 18 is a flow chart showing the manufacturing process of this example.

The other manufacturing conditions such as the number of laminated sheets were identical to those of Examples 14 and 15, and various electrical characteristics were measured as described therein.

TABLE 22

| Sample No. | Baking temperature (°C.) | Capacitance (nF) | Varistor voltage $V_{0.1 mA}$ (V) | α | tan δ (%) | ESR (mΩ) | (Ag outer electrode) Withstanding surge current (A) |
|---|---|---|---|---|---|---|---|
| 176 | 600 | 505 | 6.2 | 10.2 | 2.1 | 10.2 | 250 |
| 177 | 650 | 356 | 9.7 | 10.3 | 2.4 | 10.2 | 250 |
| 178 | 700 | 283 | 12.1 | 11.4 | 2.4 | 11.4 | 250 |
| 179 | 750 | 234 | 14.9 | 11.7 | 2.4 | 11.5 | 250 |
| 180 | 800 | 202 | 16.8 | 11.9 | 2.9 | 12.0 | 250 |
| 181 | 850 | 186 | 18.6 | 12.2 | 4.0 | 12.0 | 250 |
| 182 | 900 | 162 | 21.8 | 12.4 | 4.9 | 12.5 | 250 |

TABLE 23

| Sample No. | Baking temperature (°C.) | Capacitance (nF) | Varistor voltage $V_{0.1 mA}$ (V) | α | tan δ (%) | ESR (mΩ) | (Ag—Pd outer electrode) Withstanding surge current (A) |
|---|---|---|---|---|---|---|---|
| 183 | 600 | 492 | 6.9 | 10.2 | 2.1 | 15.9 | 250 |
| 184 | 650 | 351 | 9.8 | 10.3 | 2.4 | 15.9 | 250 |
| 185 | 700 | 281 | 12.5 | 11.4 | 2.4 | 16.5 | 250 |
| 186 | 750 | 230 | 15.4 | 11.8 | 2.4 | 16.5 | 250 |
| 187 | 800 | 200 | 17.5 | 12.0 | 2.9 | 17.3 | 250 |
| 188 | 850 | 181 | 19.4 | 12.0 | 4.1 | 17.3 | 250 |
| 189 | 900 | 154 | 22.3 | 12.3 | 5.0 | 17.4 | 250 |

Almost the same electrical characteristics as in Examples 14 and 15 were obtained as shown in Tables 22 and 23.

The electrical characteristics of the laminated ceramic capacitor with a varistor function of Example 16 are obtained when the baking temperature of the Ag or Ag-Pd outer electrodes is even in the range of 600° to 800° C. or in the range of 800° to 950° C. because the re-oxidation step is inserted unlike Examples 14 and 15. However, when the re-reduction temperature exceeds 700° C. in a reducing atmosphere after the re-oxidation, not only the outer electrodes but the ceramic element may be reduced. For that reason, the re-reduction time, or $H_2$ concentration should be controlled. Optimum re-reduction temperature was in the range of 400° to 600° C. according to the experimental results. Also, almost the same electrical characteristics as Example 10 were obtained.

It was confirmed that the electrical connection of the laminated ceramic capacitor obtained in this example, and the tensile strength of its outer electrodes were suitable for the laminated ceramic capacitor to be mounted on the substrate.

EXAMPLE 17

Figure 19:
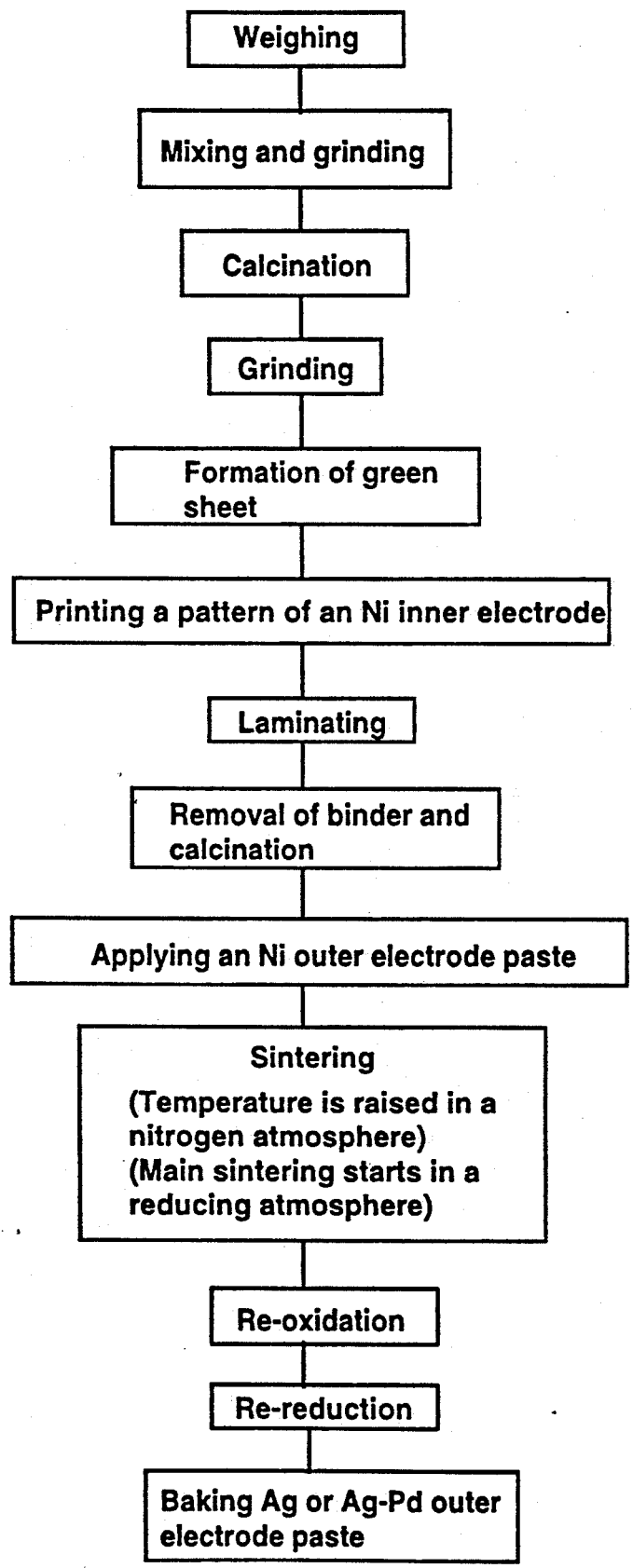
FIG. 19 is a flow chart showing a process for manufacturing the laminated ceramic capacitor with a varistor function in Example 17 of the present invention.

The sintering step of Example 16 was replaced by first heating in a nitrogen atmosphere at an elevated temperature of 1,000° to 1,200° C. and then in a reducing atmosphere at 1,200° to 1,350° C. A laminated ceramic capacitor with a varistor function was prepared by the same procedure as in Example 16 except for this sintering step. FIG. 19 is a flow chart showing this manufacturing process.

The other manufacturing conditions such as the number of laminated sheets were identical to those of Examples 14 to 16, and various electrical characteristics were measured as described therein.

Almost the same electrical characteristics as in Examples 14 to 16 were obtained except that the laminated ceramic capacitor of Example 17 had improved capacitance and effect in withstanding surge current (300 A), compared to that of Example 16. This is because preheating in a nitrogen atmosphere during the sintering step prevents the de-lamination of the capacitor, the disconnection of the inner electrodes, and the imperfect contact between the inner electrodes and the outer electrodes as is mentioned in Example 2.

It was also confirmed that when Pd was further added to the outer electrode paste, the resulting laminated ceramic capacitor had a lower tan δ and equivalent series resistance (ESR) as well as improved capacitance and effect in withstanding surge current. Also, Pt, or a combination of Pd and Pt provided the same effect.

EXAMPLE 18

Figure 20:
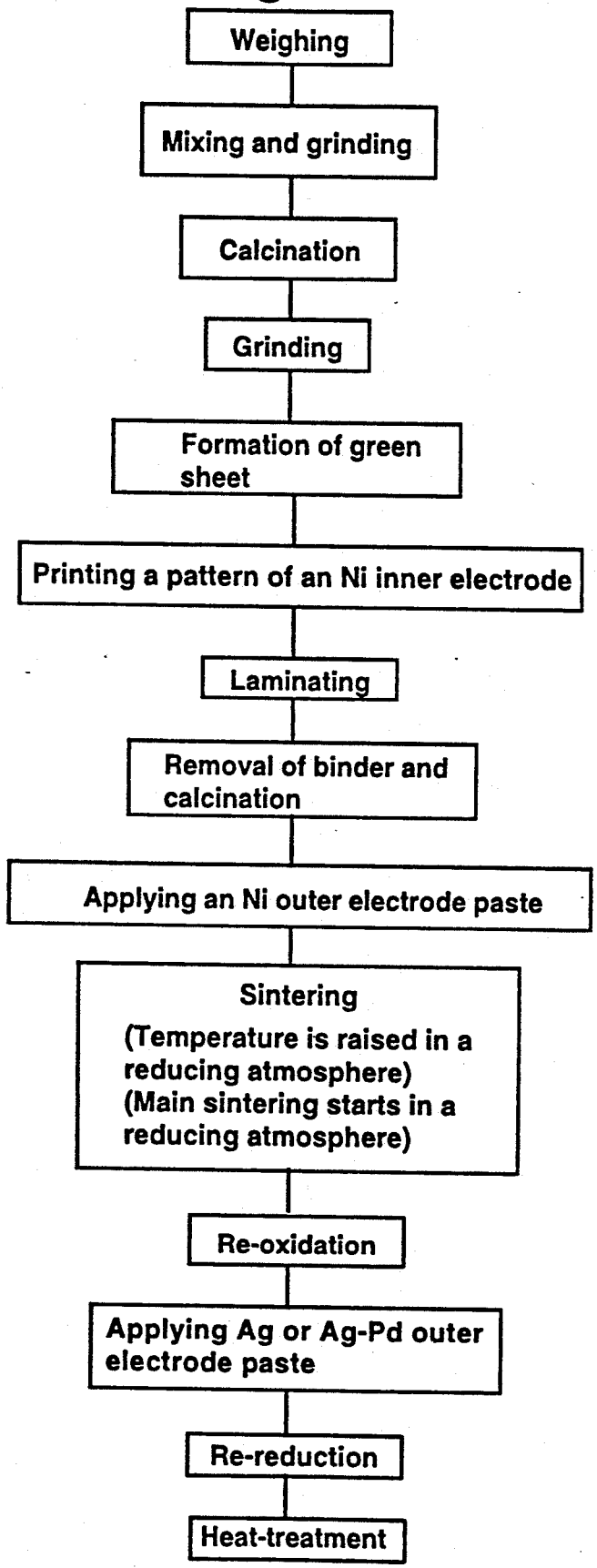
FIG. 20 is a flow chart showing a process for manufacturing the laminated ceramic capacitor with a varistor function in Example 18 of the present invention.

A sintered body obtained by the same procedure as in Examples 14 to 17 was re-oxidized at 900° C. for 1 hour in air, followed by coating the Ni outer electrodes with an Ag or Ag-Pd outer electrode paste, re-reduced at 400° C. for 30 minutes in the reducing atmosphere of $N_2: H_2=99:1$, and then heat-treated at 800° C. for 30 minutes in air to prepare a laminated ceramic capacitor with a varistor function. The electrical characteristics of the laminated ceramic capacitor are shown in Tables 24 and 25. FIG. 20 is a flow chart showing the manufacturing process of this example.

The other manufacturing conditions such as the number of laminated sheets were identical to those of Examples 14 to 17, and various electrical characteristics were measured as described therein.

TABLE 24

| Sample No. | Heat treatment temperature (°C.) | Capacitance (nF) | Varistor voltage $V_{0.1\ mA}$ (V) | α | tan δ (%) | ESR (mΩ) | (Ag outer electrode) Withstanding surge current (A) |
|---|---|---|---|---|---|---|---|
| 190 | 600 | 506 | 7.1 | 10.2 | 2.0 | 10.4 | 250 |
| 191 | 650 | 357 | 10.0 | 10.3 | 2.4 | 10.4 | 250 |
| 192 | 700 | 285 | 12.7 | 11.5 | 2.4 | 11.3 | 250 |
| 193 | 750 | 235 | 15.3 | 12.1 | 2.4 | 11.4 | 250 |
| 194 | 800 | 203 | 17.6 | 12.2 | 2.9 | 12.0 | 250 |
| 195 | 850 | 186 | 19.4 | 12.0 | 4.0 | 12.0 | 250 |
| 196 | 900 | 164 | 22.2 | 12.3 | 4.9 | 12.5 | 250 |

TABLE 25

| Sample No. | Heat treatment temperature (°C.) | Capacitance (nF) | Varistor voltage $V_{0.1\ mA}$ (V) | α | tan δ (%) | ESR (mΩ) | (Ag—Pd outer electrode) Withstanding surge current (A) |
|---|---|---|---|---|---|---|---|
| 197 | 600 | 493 | 7.1 | 10.2 | 2.1 | 15.8 | 250 |
| 198 | 650 | 351 | 10.1 | 10.2 | 2.5 | 15.9 | 250 |
| 190 | 700 | 282 | 12.7 | 11.5 | 2.6 | 16.7 | 250 |
| 200 | 750 | 232 | 15.7 | 11.8 | 2.6 | 16.7 | 250 |
| 201 | 800 | 201 | 18.1 | 12.0 | 3.0 | 17.3 | 250 |
| 202 | 850 | 182 | 20.0 | 12.1 | 4.2 | 17.3 | 250 |
| 203 | 900 | 155 | 22.5 | 12.3 | 4.9 | 17.6 | 250 |

Almost the same electrical characteristics as in Examples 14 to 17 were obtained as shown in Tables 24 and 25.

The method of Example 18 comprises the steps of: coating the sintered body with the Ag or Ag-Pd outer electrode paste immediately after the re-oxidation; re-reducing in a reducing atmosphere; and heat-treating the body in air. The resulting laminated ceramic capacitor has higher capacitance, varistor voltage product, and voltage non-linear index than those of Examples 16 and 17. However, as described in Examples 16 and 17, when the re-reduction temperature exceeds 700° C. in a reducing atmosphere after the re-oxidation, not only the outer electrodes but the ceramic element may be reduced. For that reason, the re-reduction time, or $H_2$ concentration should be controlled. Optimum re-reduction temperature was in the range of 400° to 600° C. according to the experimental results. Almost the same electrical characteristics as in Example 12 were obtained.

It was confirmed that the electrical connection of the laminated ceramic capacitor obtained in Example 18, and the tensile strength of its outer electrodes were suitable for the laminated ceramic capacitor to be mounted on the substrate.

EXAMPLE 19

Figure 21:
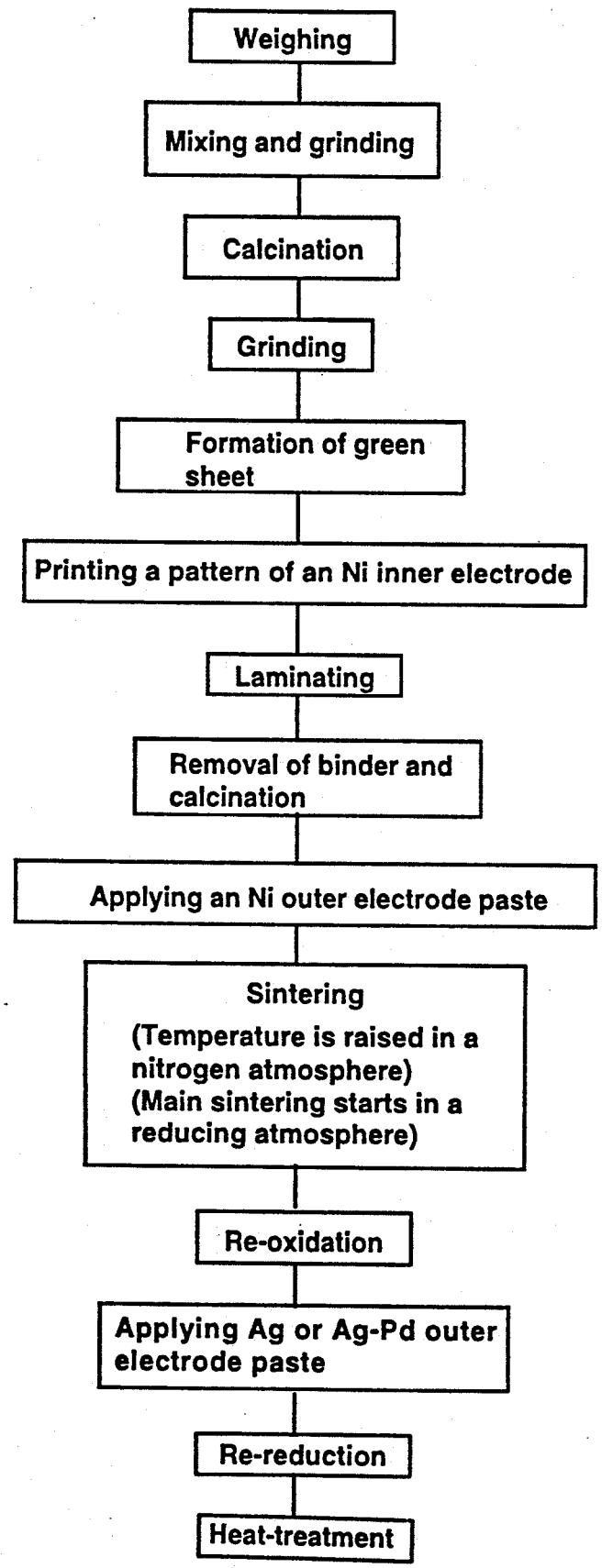
FIG. 21 is a flow chart showing a process for manufacturing the laminated ceramic capacitor with a varistor function in Example 19 of the present invention.

The sintering step of Example 18 was replaced by first heating in a nitrogen atmosphere at an elevated temperature of 1,000° to 1,200° C. and then in a reducting atmosphere at a temperature of 1,200° to 1,350° C. A laminated ceramic capacitor with a varistor function was prepared by the same procedure as in Example 18 except for this sintering step. FIG. 21 is a flow chart showing this manufacturing process.

The other manufacturing conditions such as the number of laminated layers were identical to those of Examples 14 to 18, and various electrical characteristics were measured as described therein.

Almost the same electrical characteristics as in Examples 14 to 18 were obtained except that the laminated ceramic capacitor of Example 19 had improved capacitance and effect in withstanding surge current (300 A), compared to that of Example 18. This is because preheating in a nitrogen atmosphere during the sintering step prevents the de-lamination of the capacitor, the disconnection of the inner electrodes, and the imperfect contact between the inner electrodes and the outer electrodes as is mentioned in Example 2.

It was also confirmed that when Pd was further added to the lower outer electrode paste, the resulting laminated ceramic capacitor had a lower tan δ and equivalent series resistance (ESR) as well as improved capacitance and effect in withstanding surge current. Also, Pt, or a combination of Pd and Pt provided the same effect.

According to the six different methods used in Examples 14 to 19, a laminated ceramic capacitor with a varistor function having satisfactory electrical characteristics and mechanical strength can be prepared by coating a calcinated body in which the binder is removed with an Ni outer electrode paste. In the methods used in Examples 14 and 15, the baking step of the Ag or Ag-Pd outer electrodes can also be the re-oxidation process of the ceramic element. Therefore, the baking temperature is limited to 800° C. or more, which makes it difficult to control the electrical characteristics of the laminated ceramic capacitor such as capacitance and varistor voltage. However, the resulting laminated ceramic capacitor has constant electrical characteristics with good yield, and good reproducibility for practical uses. On the other hand, because the methods used in Examples 16 to 19 involve a re-oxidation step provided in addition to the baking step, the regulation of the re-oxidation temperature and the temperatures in the succeeding steps makes it easier to control the electrical characteristics. However, there is another aspect to these methods in that it is difficult to control the re-reduction step in a reducing atmosphere after the re-oxidation. Also, the electrical characteristics of the laminated ceramic capacitor arise in Examples 14 and 15 when the baking temperature of the Ag or Ag-Pd outer electrodes reaches 800° C. or more, not only because the grain boundaries of the ceramic element are oxidized, but because glass flax is contained in the outer electrode paste. Also, almost the same electrical characteristics as in Examples 8 to 13 were obtained in Examples 14 to 19. According to the experimental results, the ceramic element which was heated at a low temperature of less than 800° C. for removal of the binder and calcination was fragile with lower mechanical strength, and required careful handling. On the other hand, the outer electrodes coated on the ceramic element which was heated at a temperature over 1,200° C. for removal of the binder and calcination were likely to peel off after sintering. Therefore, optimum temperature for the removal of the binder and the calcination was in the range of 800° to 1,200° C.

If a chamfering is further introduced to provide a ceramic element with a R shape in its edge in manufacturing the laminated ceramic capacitor, it is difficult to chamfer the laminated body in the methods of Examples 8 to 13. When the chamfering step is conducted, it is easy to chamfer the ceramic element after heating at a temperature in the range of 100° to 200° C. in air to remove the solvent contained therein. In the methods of Examples 14 to 19, it is relatively easier to introduce the chamfering step because the calcinated body in which the binder is removed is chamfered, compared to the former methods. However, a body which is heated at a temperature of less than 800° C. for removal of the binder and calcination is difficult to be chamfered because of poor mechanical strength and difficulty in handling.

In the methods of Examples 8 to 19, a laminated ceramic capacitor with a varistor function was prepared by coating a laminated body or a calcinated body in which the binder is removed with an Ni outer electrode paste, followed by the various manufacturing steps.

The following examples illustrate a method for manufacturing a laminated ceramic capacitor with a varistor function obtained by coating the sintered body with an Ni outer electrode paste (i.e., outer electrode paste containing Ni as its main component) after the re-oxidation.

EXAMPLE 20

Figure 22:
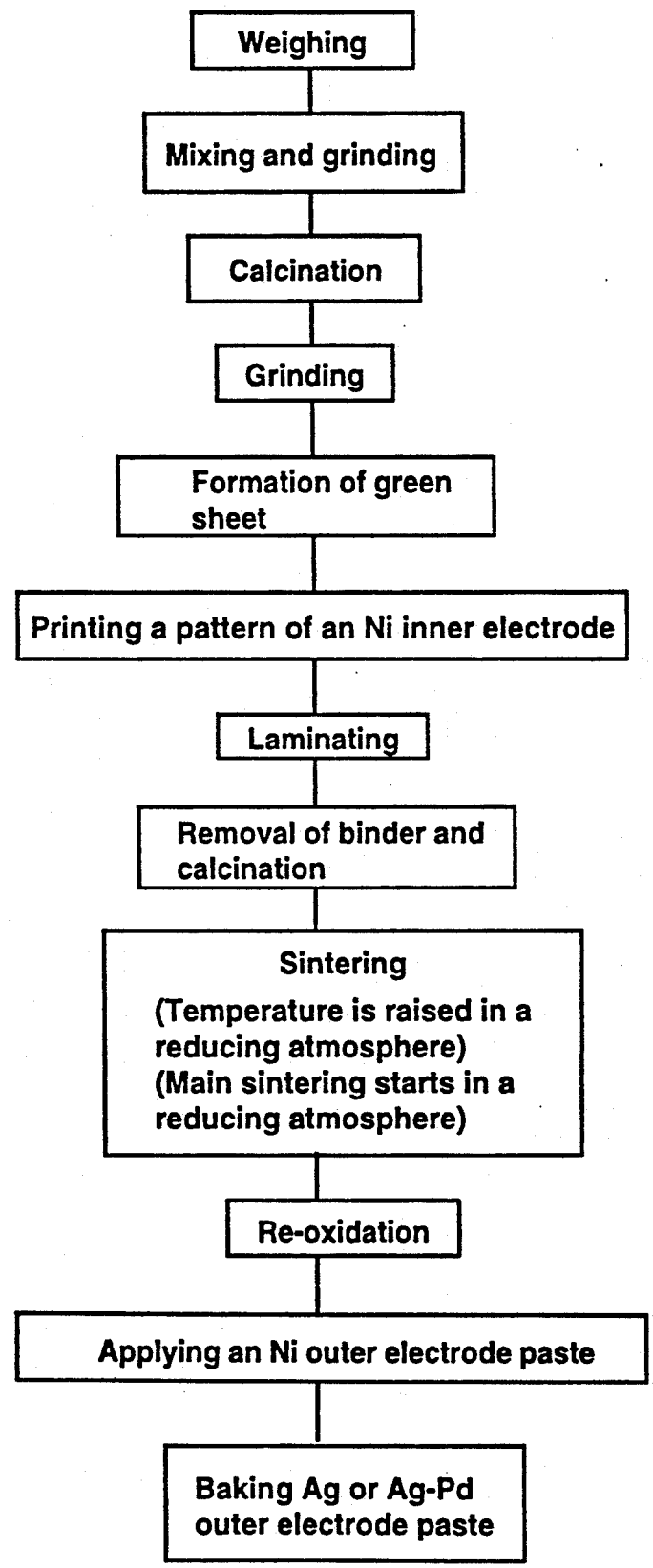
FIG. 22 is a flow chart showing a process for manufacturing the laminated ceramic capacitor with a varistor function in Example 20 of the present invention.

The laminated body obtained by using an inner electrode paste having the same composition and the same inner electrodes as in Examples 8 to 19 was calcinated at 1,050° C. in air. Then, the calcinated body was sintered at 1,250° C. in the reducing atmosphere of $N_2:H_2=99:1$. After the sintering, the sintered body was re-oxidized at 900° C. for 1 hour in air, and an Ni outer electrode paste was coated to a thickness of 20 μm on both edges of the sintered body in which terminals of the inner electrodes were exposed alternatively in opposite directions. The sintered body was baked at 650° C. in the reducing atmosphere of $N_2:H_2=99:1$, followed by coating the Ni outer electrodes with an Ag or Ag-Pd outer electrode paste, and baked at 600° to 950° C. in air. The electrical characteristics of the laminated ceramic capacitor are shown in Tables 26 and 27. FIG. 22 is a flow chart showing the manufacturing process this example.

The other manufacturing conditions such as the number of laminated sheets were identical to those of Examples 8 to 19, and various electrical characteristics were measured as described therein.

TABLE 26

| Sample No. | Baking temperature (°C.) | Capacitance (nF) | Varistor voltage $V_{0.1\,mA}$ (V) | α | tan δ (%) | ESR (mΩ) | (Ag outer electrode) Withstanding surge current (A) |
|---|---|---|---|---|---|---|---|
| 204 | 600 | 620 | 5.8 | 9.7 | 2.5 | 10.5 | 250 |
| 205 | 650 | 400 | 9.0 | 9.8 | 2.5 | 10.6 | 250 |
| 206 | 700 | 321 | 11.2 | 10.0 | 2.5 | 11.7 | 250 |

TABLE 26-continued

| Sample No. | Baking temperature (°C.) | Capacitance (nF) | Varistor voltage $V_{0.1\,mA}$ (V) | α | tan δ (%) | ESR (mΩ) | (Ag outer electrode) Withstanding surge current (A) |
|---|---|---|---|---|---|---|---|
| 207 | 750 | 257 | 14.0 | 10.8 | 2.7 | 11.9 | 250 |
| 208 | 800 | 225 | 16.1 | 11.2 | 3.2 | 12.2 | 250 |
| 209 | 850 | 200 | 18.0 | 11.2 | 4.2 | 12.5 | 250 |
| 210 | 900 | 181 | 20.7 | 11.2 | 5.2 | 12.8 | 250 |

TABLE 27

| Sample No. | Baking temperature (°C.) | Capacitance (nF) | Varistor voltage $V_{0.1\,mA}$ (V) | α | tan δ (%) | ESR (mΩ) | (Ag—Pd outer electrode) Withstanding surge current (A) |
|---|---|---|---|---|---|---|---|
| 211 | 600 | 564 | 6.2 | 9.7 | 2.5 | 16.3 | 250 |
| 212 | 650 | 380 | 9.3 | 9.8 | 2.6 | 16.8 | 250 |
| 213 | 700 | 291 | 12.0 | 10.0 | 2.7 | 17.3 | 250 |
| 214 | 750 | 233 | 14.8 | 10.8 | 2.7 | 17.4 | 250 |
| 215 | 800 | 207 | 16.9 | 11.2 | 3.2 | 18.5 | 250 |
| 216 | 850 | 189 | 18.8 | 11.2 | 4.5 | 19.0 | 250 |
| 217 | 900 | 162 | 21.7 | 11.3 | 5.3 | 19.8 | 250 |

Almost the same electrical characteristics as in Examples 8 to 19 were obtained as shown in Tables 26 and 27.

The laminated ceramic capacitor with a varistor function of Example 20 has lower varistor voltage, and lower voltage non-linear index, compared to those of Examples 8 to 19. This is because the ceramic element is slightly reduced when the Ni outer electrode paste is baked at an elevated temperature of 650° C. in a reducing atmosphere. When the baking temperature is less than 650° C., the Ni outer electrode paste is not readily sintered. On the other hand, when the baking temperature exceeds 700° C., not only the outer electrodes but the ceramic element may be reduced.

It was confirmed that the electrical connection of the laminated ceramic capacitor obtained in Example 20, and the tensile strength of its outer electrodes were suitable for the laminated ceramic capacitor to be mounted on the substrate.

EXAMPLE 21

Figure 23:
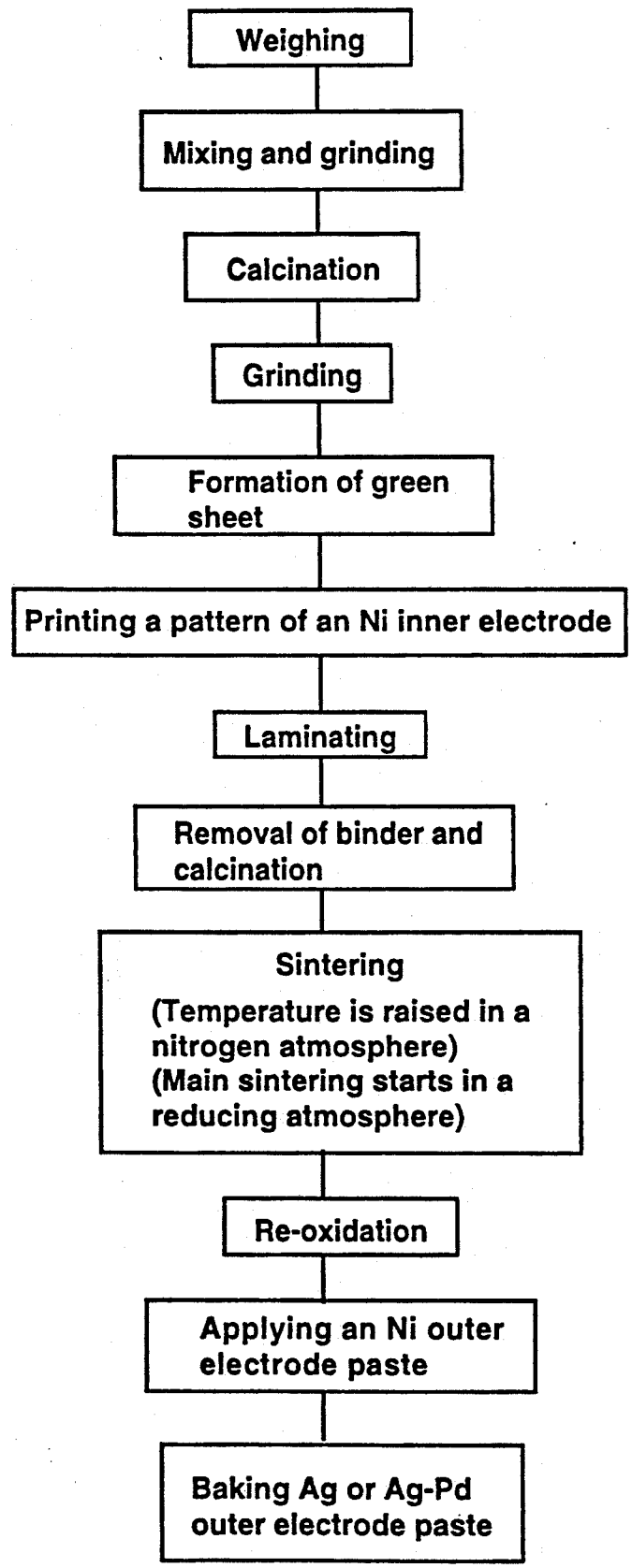
FIG. 23 is a flow chart showing a process for manufacturing the laminated ceramic capacitor with a varistor function in Example 21 of the present invention.

The sintering step of Example 20 was replaced by first heating in a nitrogen atmosphere at an elevated temperature of 1,000° to 1,200° C. and then in a reducing atmosphere at a temperature of 1,200° to 1,350° C. A laminated ceramic capacitor with a varistor function was prepared by the same procedure as in Example 20 except for this sintering step. FIG. 23 is a flow chart showing this manufacturing process.

The other manufacturing conditions such as the number of laminated sheets were identical to those of Examples 8-20, and various electric characteristics were measured as described therein.

Almost the same electric characteristics as in Examples 14 to 20 were obtained except that the laminated ceramic capacitor of Example 21 had improved capacitance and effect in withstanding surge current (300 A), compared to that of Example 20. This is because preheating in a nitrogen atmosphere during the sintering step prevents the de-lamination of the capacitor, the disconnection of the inner electrodes, and the imperfect contact between the inner electrodes and the outer electrodes as is mentioned in Example 2.

It was also confirmed that when Pd was further added to the lower outer electrode paste, the resulting laminated ceramic capacitor had a lower tan δ and equivalent series resistance (ESR) as well as the improved capacitance and effect in withstanding surge current. Also, Pt, or a combination of Pd and Pt provided the same effect.

A powdered starting material obtained by solubilizing at least one compound containing an atom selected from the group consisting of Li, Na, and K into Ni or an Ni-containing compound can be used for inner and outer electrode paste in Examples 8 to 21 as is mentioned in Example 1.

Also, a powdered starting material prepared by solubilizing a combination of at least one compound containing an atom selected from the group consisting of Li, Na, and K and at least one compound containing a Pd atom and a Pt atom into Ni or an Ni-containing compound can be used for a lower layer outer electrode paste as is mentioned in Example 1.

The outer electrodes containing 0.1 mol % of $Li_2CO_3$ were used in Examples 9 to 21. However, it was confirmed that the outer electrodes containing less than 1.0 mol % of $Li_2CO_3$ provided the same effect.

A laminated ceramic capacitor with a varistor function can be readily prepared by various manufacturing methods as described in Examples 1 to 21.

A material (composition) of a ceramic capacitor with a grain boundary-insulated structure will be described below.

A ceramic material containing $SrTiO_3$ as its main component is generally made semiconductive by reducing, or sintering in a reducing atmosphere with the addition of a semiconductivity accelerating agent. However, only this process does not necessarily make the ceramic material semiconductive depending on the kinds of the semiconductivity accelerating agent. The use of $SiTiO_3$ containing a stoichiometrically excess amount of Sr or Ti, accelerates making the ceramic material semiconductive with the increase of lattice defects in the crystal. Moreover, the addtion of at least one selected from the group consisting of $Nd_2O_5$, $Ta_2O_5$, $V_2O_5$, $W_2O_5$, $Dy_2O_3$, $Nd_2O_3$, $Y_2O_3$, $La_2O_3$ and $CeO_2$ (hereinafter, these compounds are referred to as the first component) accelerates making the ceramic material semiconductive because of the valence control.

Both Mn and Si (hereinafter, referred to as the second component) are essential materials for the formation of a laminated structure, and an absence of one of these two compounds does not result in the exhibition of the function.

It has been considered that it was difficult to prepare a $SrTiO_3$ type laminated ceramic capacitor with a varistor function so far for the following reasons.

First of all, a ceramic capacitor material with a varistor function such as $SrTiO_3$ has different function and properties from an inner electrode material in a sintering step and a re-oxidation step. When the ceramic capacitor material is sintered in a reducting atmosphere, the inner electrode material occludes a $H_2$ gas contained in the reducing atmosphere and is expanded in this sintering step because it is made of metal. Also, the inner electrode material may be oxidized into the metal oxide in a re-oxidation step or prevent the ceramic capacitor material from being re-oxidized.

Secondly, a surface dispersion process which comprises the steps of: sintering the ceramic capacitor material in a reducing atmosphere so as to be semicondutive; coating the surface of the ceramic capacitor material with a metal oxide having high resistance such as $MnO_2$, $CuO_2$, $Bi_2O_3$, and $Co_2O_3$; and re-oxidizing the resulting material in air so as to disperse the metal oxide in the grain-boundaries of the material, resulting in an insulated ceramic body is required for the formation of a laminated ceramic capacitor with a varistor function. However, it is technically difficult to disperse the metal oxide into a ceramic element with a laminated structure having inner electrodes alternatively.

The inventors of the present invention have discovered the following facts as described in Japanese Patent Application No. 1-36757.

First, a ceramic capacitor with a varistor function was readily manufactured by adding the second components as well as the first components to the ceramic material of $SrTiO_3$ with an excess amount of Ti, and by sintering the material in a reducing atmosphere, followed by a re-oxidation step. Spreading of metal oxide paste with high electric resistance over the surface of the ceramic plates was found to be needless to form insulating grain boundaries. The experimental facts are interpreted as follows; the second components added, together with an excess amount of Ti, forms a liquid phase comprising Mn, Si, and Ti ternary oxide system at relatively low temperatures during the sintering step. The liquid phase enhances sintering of grains while the oxides melt and segregate in the grain boundaries. When the capacitor element, in which a liquid phase comprising Mn, Si, and Ti ternary oxide system segregates in these grain boundaries, is re-oxidized in air, the capacitor element is insulated because of the Mn, Si, and Ti ternary oxide system which segregates in the grain boundaries, whereby a ceramic capacitor with a varistor function having a grain-insulated boundary structure can be readily produced. Moreover, an excess amount of Ti was found to prevent the oxidation of the inner electrodes as well as the diffusion of metal oxides into the inner electrodes. For this reason, the ceramic material of $SrTiO_3$ with an excess amount of Ti was used in the present invention.

Second, the material of $SrTiO_3$ with an excess amount of Ti, to which the second component was added, was made semiconductive by sintering in the nitrogen atmosphere as well as in the reducing atmosphere. This fact can be partly interpreted by the same reasoning as is described in the above discussions, in that the solid metal oxides are converted to a liquid phase at relatively low temperature. The added Mn not only forms a liquid phase but also works as an atomic valence control agent. When Mn works as an atomic valence control agent, the ionic valence of Mn ion is +2 or +4, and its electronic state is unstable and liable to be activated, thereby increasing the sinterability. This is the reason why the ceramic material is readily made semiconductive through the sintering step in the nitrogen atmosphere by adding Mn ion as a second component.

Third, the raw materials formed into the laminated capacitor sheets were calcinated in air before being subjected to the sintering step. This treatment prevented the problems caused in the laminated ceramic capacitor with a varistor function, such as the electric disconnections in the inner electrodes, de-lamination of the ceramic sheets, cracking in the ceramic sheets, decrease in sintering density, and non-uniformity in the sintered body. Furthermore, electrical characteristics such as capacitance, voltage non-linear index $\alpha$ and varistor voltage, and reliability in performance of the capacitor was also largely improved.

According to the present invention, in view of the above, a laminated ceramic capacitor with a varistor function can be readily manufactured by sintering the material of the ceramic capacitor with a varistor function together with the material of inner electrode simultaneously.

In the present invention, the Sr/Ti ratio of $SrTiO_3$ is controlled because, when the Sr/Ti ratio is greater than 1.00, the amount of Sr will be in excess relative to the amount of Ti. Thus, the liquid phase composed of Mn, Si and Ti ternary oxide system is difficult to be formed, grain boundary insulated structure of the ceramics is difficult to be formed with above-mentioned composition and, moreover, oxidation and diffusion of the materials of the inner electrodes occur, resulting in poor electrical characteristics and reliability. On the other hand, when Sr/Ti ratio is less than 0.95, the sintered body obtained becomes porous and sintering density decreases. Powder materials having a mean particle size of 0.5 μm or less were used for the starting material of the laminated ceramic capacitor with a varistor function for the following reason. If a powder having a mean particle size of more than 0.5 μm is used, the particles tend to coagulate in the slurry, whereby the surface of the green sheets formed by using such non-uniform slurry becomes rough and smoothness cannot be obtained. Sintering density and packing density of the sintered body obtained are small and the sintered body is difficult to be made semiconductive, whereby electrical characteristics of the ceramic capacitor tend to be unstable.

Next, the reason why the total amount of the added second components, $MnO_2$ and $SiO_2$, are also controlled is as follows. When the total amount of these components is less than 0.2 mol %, the effect of the added material cannot be obtained. Therefore, the formation of a liquid phase composed of Mn, Si, and Ti ternary oxide system is difficult, formation of a grain boundary insulated structure of the ceramics is difficult, and electrical characteristics and sintering density are decreased. On the other hand, when the total amount of these components exceed 5.0 mol %, the amount of metal oxides with high electrical resistance segregating in the grain boundaries increases and the electrical characteristics of the ceramic capacitor also degrade.

The step for heating the laminated body for the removal of the binder therefrom and the calcination thereof at a temperature of 800° to 1,250° C. is the most important step in the method for the formation of a laminated ceramic capacitor with a varistor function in the present invention. Most of the electrical characteristics and reliablity of the ceramic capacitor with a varistor function manufactured are determined during this step. The purposes of this step are to enhance adhesiveness between the material of the ceramic portion of the ceramic capacitor with a varistor function and the material of the inner electrodes, and to regulate sintering density, uniformity in the texture of sintered body, and mean grain size of the crystal particles in the grain boundary insulated semiconductor ceramics of the laminated ceramic capacitor with a varistor function. The rate of temperature increase was adjusted to 200° C./hr or less in the heating step for the removal of the binder and the calcination, since the slower the temperature increase was, the more desirable results were obtained after the heating step for the removal of the binder and the calcination.

The heating temperature for the removal of the binder and the calcination in air was limited in the range of 800° to 1,250° C. When the temperature is lower than 800° C., this step is not effective enough, and when the temperature exceeds 1,250° C., electrical characteristics and reliability of the capacitor will be largely decreased for the following reasons:

(1) The ceramic capacitor with a varistor function is sintered instead of being calcinated by heating at this high temperature range. When the capacitor sintered previously in air is subjected to sintering in a reducing atmosphere or in a nitrogen atmosphere, the sintered body shrinks rapidly and suffers from concentrated stress, whereby the de-lamination and cracks are caused in the laminated ceramic capacitor with a varistor function.

(2) Oxidation of Ni as well as sintering of the ceramic portion of the ceramic capacitor with a varistor function will proceed at the same time, when Ni is used as a material for inner electrode. The sintered body reacts with Ni, followed by the diffusion of Ni, resulting in the breaking of the inner electrodes, delamination, and formation of cracks in the laminated ceramic capacitor with a varistor function.

(3) When the laminated ceramic body is calcinated to a high temperature of over 1,250° C., oxides containing Mn, Si, or Ti which are comprised in the ceramic body form a liquid phase of the ternary oxide. This liquid phase is rapidly sintered together with the ceramic body, so that the growth of grains of the oxide is accelerated. Accordingly, the sintering density becomes low and the packing density of the oxide into the ceramic grain boundary is decreased.

(4) The sintered body treated by the above-mentioned manner is difficult to be made semiconductive during the sintering step in the reducing or nitrogen atmosphere afterward.

The laminated ceramic capacitor with a varistor function thus manufactured has larger capacitance and exhibits much better temperature and frequency characteristics than the laminated varistor disclosed in the above-mentioned Japanese Patent Publication No. 58-23921. The ceramic capacitor in the present invention is manufactured by laminating ceramic capacitor materials with a varistor function which possesses both functions of a normal capacitor which absorbs noises, and of a varistor which absorbs pulses and static electricity, while the above-mentioned varistor in the prior art is simply made of piled varistor materials which exhibit prominent absorbing ability for surge current. The laminated ceramic capacitor with a varistor function in the present invention is different from that in the prior art in its functions and uses.

Although $TiO_2$ was added to $SrTiO_3$ in preparing a $SrTiO_3$ containing an excess amount of Ti in the examples of the present invention, other Ti-containing compounds such as carbonates, hydroxides, organic compounds, and the like may also be used to provide the same effect.

In the Examples, $SrTiO_3$ was used as a starting material, but the same effect can be obtained by the use of a combination of SrO or $SrCO_3$ and $TiO_2$.

It was confirmed that when $Sr_{(1-x)}Ba_xTiO_3$ (where, x is in the range of $0 < x \leq 0.3$) is used as a main component of the green sheet instead of $SrTiO_3$, a laminated ceramic capacitor with a varistor function can be prepared by using the same inner electrode composition, outer electrode composition, and manufacturing method as described above. As described in Japanese Patent Application No. 1-62402, when $Sr_{(1-x)}Ba_xTiO_3$ containing a solubilized Ba is used, the resulting laminated ceramic capacitor has improved capacitance. The reason why the range of x of $Sr_{(1-x)}Ba_xTiO_3$ was defined is that the Curie point of $BaTiO_3$ appears when x exceeds 0.3, capacitance-temperature change rate and temperature coefficient of varistor voltage become larger, and the capacitor characteristics and varistor characteristics become unstable with respect to the temperature. Therefore, the reliability and performance are decreased.

It was also confirmed that when $Sr_{(1-x)}Ca_xTiO_3$ (where, x is in the range of $0.001 \leq x \leq 0.2$) is used as a main component of the green sheet instead of $SrTiO_3$, a laminated ceramic capacitor with a varistor function can be prepared by using the same inner electrode composition, outer electrode composition, and manufacturing method as described above. As described in Japanese Patent Application No. 1-69651, when $Sr_{(1-x)}Ca_xTiO_3$ containing a solubilized Ca is used, the resulting laminated ceramic capacitor has an improved tan $\delta$ and temperature characteristics because of controlled growth of crystal grain. The reason why the range of x of $Sr_{(1-x)}Ca_xTiO_3$ was defined is that the growth of crystal grain is not under control when x is less than 0.001 and the particle size of the crystal is distributed widely, whereby the tan $\delta$ and temperature characteristics become poor. When x exceeds 0.2, the resulting laminated ceramic capacitor will have lower capacitance and reduced varistor characteristics due to the accelerated oxidation.

As for $MnO_2$ and $SiO_2$ as a second component, carbonates or hydroxides thereof are also effective for the preparation of the starting material. However, with respect to Mn, $MnCO_3$ was found to be more appropriate for manufacturing a capacitor element with stable characteristics and good mass productivity, since the particle size distribution of the compound is fine and uniform, and the compound is readily pyrolyzed.

In the aforementioned examples, the sintering step was performed in a reducing atmosphere of the composition of $N_2:H_2 = 99:1$. When $H_2$ concentration in the atmosphere is increased, the following phenomena are observed with regard to both the material of the inner electrode and the material of the ceramic capacitor with a varistor function.

(1) Electrode material is expanded by occluding $H_2$ gas.

(2) The material of the ceramic capacitor with a varistor function is accelerated to be semiconductive.

These phenomena entail problems in the laminated ceramic capacitor with a varistor function with respect to electrical and mechanical characteristics, such as breaking of electrical connections in the inner electrodes, de-lamination of the ceramic sheets, formation of cracks in the ceramic sheets, and incomplete re-oxidation of ceramic materials. Consequently, when sintering is performed in an atmosphere in which $H_2$ concentration is increased, it is preferable for manufacturing a ceramic capacitor with desirable characteristics that the sintering temperature range is made slightly lower (1,200° to 1,300° C.). On the contrary, a ceramic capacitor with a varistor function is rather difficult to be made semiconductive, when it is sintered in a reducing atmosphere containing a smaller amount of $H_2$ gas. Therefore, the material is preferably sintered in a slightly higher temperature range (1,300° C. to 1,450° C.). The concentration ratio of $H_2$ to $N_2$ is preferably in the range of 99.5:0.5 to 95.0:5.0.

In the above-mentioned examples, a mixed powder was calcinated in air. However, the calcination step when performed in a nitrogen atmosphere was confirmed to be also advantageous.

Also, the capacitance-temperature change rate and temperature coefficient of varistor voltage are improved by adding at least one selected from the group consisting of $Na_2SiO_3$ and $Li_2SiO_3$. At least one selected from the group consisting of $Na_2SiO_3$ and $Li_2SiO_3$ works as a carrier to diffuse the liquid phase of Mn, Si and Ti ternary oxide system uniformly in the grain boundaries, thereby forming distinct interfaces among the semiconductor crystal region and a high resistance grain boundary region. When the amount of at least one selected from the group consisting of $Na_2SiO_3$ and $Li_2SiO_3$ added as the third component is less than 0.05 mol %, the effects of the additive cannot be obtained, and few improvements in capacitance-temperature change rate and temperature coefficient of varistor voltage are observed. When the added amount of the third component exceeds 2.0 mol %, at least one selected from the group consisting of $Na_2SiO_3$ and $Li_2SiO_3$ which serves as a carrier will be in excess in grain boundaries, thereby decreasing capacitance and voltage nonlinear index $\alpha$, increasing equivalent series resistance (ESR), decreasing sintering density, and degrading mechanical strength.

A mixture of $SiO_2$ and at least one selected from the group consisting of $Na_2O$ and $Li_2O$ can be also used as the third component instead of at least one selected from the group consisting of $Na_2SiO_3$ and $Li_2SiO_3$. However, when a mixture of $SiO_2$ and at least one selected from the group consisting of $Na_2O$ and $Li_2O$ is used, since at least one selected from the group consisting of $Na_2O$ and $Li_2O$ is a very unstable compound, it readily decomposes during the sintering step and is liable to scatter or diffuse into the atmosphere, leaving few of at least one selected from the group consisting of Na atoms and Li atoms in the manufactured sintered body. Moreover, it was confirmed that at least one selected from the group consisting of $Na^+$ and $Li^+$ formed by the partially ionization of $Na_2O$ and $Li_2O$ migrates under the load of high temperature and high voltage, which entails degradation of capacitor characteristics. The effects of at least one selected from the group consisting of added Na ion and Li ion is provided advantageously by adding the ion in the form of a compound with $SiO_2$.

It was confirmed that Na ion and Li ion should be added to the material in the form of a compound of at least one selected from the group consisting of $Na_2SiO_3$ and $Li_2SiO_3$.

Moreover, the addition of the fourth component, $Al_2O_3$ increases voltage non-linear index $\alpha$ and decreases equivalent series resistance (ESR), since added $Al_2O_3$ is solubilized into the crystal lattice and decreases electrical resistance of the crystal grains. When the added amount of $Al_2O_3$ as the forth component is less than 0.05 mol %, characteristics of the capacitor are not influenced desirably by the additive, giving no improvements in voltage non-linear index $\alpha$ and not decreasing equivalent series resistance (ESR). On the other hand, when the added amount exceeds 2.0 mol %, this amount exceeds the saturated solubility in the crystal lattice.

Therefore, an excess amount of $Al_2O_3$ segregates in the grain boundaries, thereby decreasing electrical resistance of grain boundaries and hence rapidly decreasing capacitance and voltage non-linear index $\alpha$.

Also, capacitance-temperature change rate and temperature coefficient of varistor voltage are improved by adding at least one selected from the group consisting of $NaAl_2O_3$ and $LiAl_2O_3$ as the variation of the third and fourth components in the same way as when at least one selected from the group consisting of $Na_2SiO_3$ and $Li_2SiO_3$ is added. Na atoms or Li atoms contained in at least one selected from the group consisting of $NaAlO_2$ and $LiAlO_2$ work as carriers to diffuse the liquid phase of Mn, Si, and Ti ternary oxide system uniformly in the grain boundaries, thereby forming distinct interfaces among the semiconductor crystal region and a high resistance grain boundary region.

Secondly, voltage non-linear index $\alpha$ is increased and equivalent series resistance (ESR) is decreased by adding at least one selected from the group consisting of $NaAl_2O_3$ and $LiAl_2O_3$, since at least one atom selected from the group consisting of Al and Li contained in the added compounds $NaAl_2O_3$ and $LiAl_2O_3$ is solubilized into the crystal lattice, thereby decreasing electrical resistance of crystal grains. When the added amount of at least one selected from the group consisting of $NaAl_2O_3$ and $LiAl_2O_3$ is less than 0.05 mol %, the effects of the additive cannot be obtained and few improvements in capacitance-tempperature change rate and temperature coefficient of varistor voltage are observed. Also, the voltage non-linear index $\alpha$ is not improved and the equivalent series resistance (ESR) is not decreased. When the added amount of the third component exceeds 4.0 mol %, this amount exceeds the saturated solubility in the crystal lattice. Therefore, at least one selected from the group consisting of $NaAl_2O_3$ and $LiAl_2O_3$ is deposited in the grain boundaries and decreases the electrical resistance of the grain boundaries, thereby decreasing capacitance and voltage non-linear index $\alpha$, increasing equivalent series resistance (ESR), decreasing sintering density and degrading mechanical strength.

A mixture of $Al_2O_3$ and at least one selected from the group consisting of $Na_2O$ and $Li_2O$ can be also used as the fifth component instead of at least one selected from the group consisting of $NaAl_2O_3$ and $LiAl_2O_3$. However, when a mixture of $Al_2O_3$ and at least one selected from the group consisting of $Na_2O$ and $Li_2O$ is used, since at least one selected from the group consisting of $Na_2O$ and $Li_2O$ is a very unstable compound and readily decomposes during the sintering step, it is liable to scatter or diffuse into the atmosphere, leaving few of at least one selected from the group consisting of Na atoms and Li atoms in the manufactured sintered body. Moreover, it was confirmed that at least one selected from the group consisting of $Na^+$ and $Li^+$ formed by the partially ionization of $Na_2O$ and $Li_2O$ migrates under the load of high temperature and high voltage, which entails degradation of capacitor characteristics. The effects of at least one selected from the group consisting of added Na ion and Li ion are provided advantageously by adding the ion in the form of $NaAlO_2$ or $LiAlO_2$. These compounds are stable in grain boundaries.

It was confirmed that Na ion and Li ion should be added to the material in the form of a compound of at least one selected from the group consisting of $NaAlO_2$ and $LiAlO_2$.

Although the sintered body was re-oxidized at 900° C. in air during the re-oxidation step of Examples 3 to 21, it was confirmed that the electrical characteristics arise when the re-oxidation temperature was changed to a temperature in the range of 900° to 1,250° C. Since Ni tends to be oxidized in the re-oxidation in air, the sintered body is preferably re-oxidized in a slightly lower temperature range (900°–1,050° C.).

Also, the Ag or Ag-Pd outer electrodes may be baked under a nitrogen atmosphere instead of in air used in Examples 8 to 21. However, the material is preferably baked in a slightly higher temperature range (800°–950° C.) in a nitrogen atmosphere to provide better electrical characteristics.

Moreover, the mixed powder of NiO and $Li_2CO_3$ may be also calcinated in the different temperature range under a nitrogen atmosphere instead of 1,100° C. in air to provide the same effect. However, it was confirmed that when the mixed powder is not calcinated, the laminated ceramic capacitor has a slight adverse effect on the electrical characteristics, reliability, life span, and mass productivity.

Although at least one compound containing an atom selected from the group consisting of Li, Na, and K, and at least one compound containing a Pd atom or a Pt atom are solubilized into Ni or an Ni-containing compound in the above examples, it was confirmed that the same effect can be attained when only at least one compound containing a Pd atom or a Pt atom is solubilized into Ni or an Ni-containing compound without the addition of at least one compound containing an atom selected from the group consisting of Li, Na, and K.

The capacitor element thus obtained comprises the advantages of: large capacitance and voltage nonlinear index $\alpha$; small varistor voltage and equivalent series resistance (ESR); and excellent temperature, frequency, and noise characteristics; whereby the capacitor element absorbs low voltage noises and high frequency noises as a function of an ordinary capacitor, absorbs high voltage pulses and static electricity as a function of a varistor, and quickly responds to invading abnormal voltages such as noises, pulses and static electricity. The capacitor is expected to replace various uses of conventional capacitors such as a film capacitor, a laminated ceramic capacitor, and a semiconductor capacitor. Moreover, the laminated ceramic capacitors with a varistor function of the present invention are smaller in size, larger in capacitance, and higher in performance compared to conventional single plate type ceramic capacitor with a varistor function, whereby a wide range of applications such as mounting parts is also expected. Furthermore, the laminated ceramic capacitor of the present invention uses Ni of a low cost as inner electrodes, so that the raw material cost in this capacitor is expected to be lowered, compared to the laminated ceramic capacitor with a varistor function which uses noble metals such as Pd and Ag as inner electrodes.

As described above, according to the present invention, a laminated ceramic capacitor with a varistor function, comprising both functions of a capacitor and a varistor, can be obtained. The capacitor works as an ordinary capacitor which absorbs low voltage noises and high frequency noises while it functions as a varistor when high voltage pulses and static electricity are generated by surrounding electronic equipment. Therefore, this capacitor can protect semiconductors and electronic equipment from abnormal voltages such as noises, pulses, and static electricity generated in the electronic equipment. Practical applications of the capacitor are as follows:

(1) The capacitor can replace conventional film, laminated ceramic, and semiconductor ceramic capacitors which are used for by-pass capacitors for protecting IC and LSI used in the electronic equipment.

(2) The capacitor can replace ZnO type capacitors which are used for preventing the breaking and malfunctioning of electronic equipment caused by static electricity and for adsorbing ON-OFF surge arising from inductive loads.

The capacitor possesses both functions described in the above items (1) and (2), and a wide range of applications are to be expected.

A laminated ceramic capacitor with a varistor function of the present invention which has Ni inner electrodes can be readily manufactured according to the present invention, since the improvement of both the oxidation resistance of Ni inner electrodes and the oxidation of the crystal boundaries of the ceramic element has become possible for the following reasons. First, the oxidation rate of Ni which produces a p-type oxide is reduced by solubilizing a compound containing an atom selected from the group consisting of Li, Na, and K, into Ni or an Ni-containing compound, whereby the oxidation resistance of Ni is improved. Secondly, an atom selected from the group consisting of Li, Na, and K is readily dispersed into crystal grain boundaries of a ceramic element in a re-oxidation step, functions as an oxygen carrier, and accelerates the oxidation of the crystal grain boundaries. The present invention provides these major advantages in the manufacturing process of the capacitors.

Since the laminated ceramic capacitor with a varistor function of the present invention is smaller in size, larger in capacitance, and higher in performance, compared to conventional single plate type ceramic capacitors with a varistor function, the capacitor of the present invention is expected to have a wide range of applications as highly integrated mounting elements for electronic equipment such as video cameras and communication apparatuses.

Therefore, according to the present invention, capacitor elements comprising the functions of protecting semiconductors and electronic equipment from invading abnormal voltages such as noises, pulses, and static electricity can be obtained. Characteristics of the capacitor are so stable to temperature changes that the effects of the present invention are greatly improved from the point of practical applications.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing all the features of patentable novelty that reside in the present invention, including all features that would be treated as equivalents thereof by those skilled in the art to which this invention pertains.

What is claimed is:

1. A laminated semiconductor ceramic capacitor with a grain boundary-insulated structure comprising a semiconductor ceramic block with a grain boundary-insulated structure, a plurality of Ni inner electrodes and outer electrodes, wherein said Ni inner electrodes are obtained from paste containing a powder prepared by solubilizing at least one compound containing an atom selected from the group consisting of Li, Na and K into Ni or an Ni containing compound; said Ni inner electrodes are placed in a substantially parallel manner within said ceramic block to reach the corresponding opposite edges of said ceramic block alternatively one by one; and said outer electrodes are electrically connected to the corresponding edges of said inner electrodes, respectively.

2. A laminated semiconductor ceramic capacitor with a grain boundary-insulated structure according to claim 1, wherein said outer electrodes are made of at least one metal selected from the group consisting of Pd, Ag, Cu, Zn, and Ni; an alloy thereof; or a mixture thereof.

3. A laminated semiconductor ceramic capacitor with a grain boundary-insulated structure according to claim 1, wherein said outer electrodes are obtained by solubilizing at least one compound containing an atom selected from the group consisting of Li, Na, and K; or a combination of at least one compound containing an atom selected from the group consisting of Li, Na, and K and at least one compound containing a Pd atom or a Pt atom into Ni or an Ni containing compound.

4. A laminated semiconductor ceramic capacitor with a grain boundary-insulated structure according to claim 1, wherein said outer electrodes comprise (1) lower outer electrodes which are obtained by solubilizing at least one compound containing an atom selected from the group consisting of Li, Na and K, or a combination of at least one compound containing an atom selected from the group consisting of Li, Na, and K and at least one compound containing a Pd atom or a Pt atom into Ni or an Ni containing compound, and (2) upper outer electrodes of an Ag or Ag-Pd type.

5. A laminated semiconductor ceramic capacitor with a grain boundary-insulated structure according to claim 1, wherein said outer electrodes are obtained by solubilizing at least one compound containing a Pd atom or a Pt atom into Ni or an Ni containing compound.

6. A laminated semiconductor ceramic capacitor with a grain boundary-insulated structure according to claim 1, wherein said outer electrodes comprise (1) lower outer electrodes which are obtained by solubilizing at least one compound containing a Pd atom or a Pt atom into Ni or an Ni containing compound, and (2) upper outer electrodes of an Ag or Ag-Pd type.

7. A laminated semiconductor ceramic capacitor with a grain boundary-insulated structure according to claim 1, wherein said grain boundary insulated semiconductor ceramic comprises as its main component $SrTiO_3$ containing an excess amount of Ti so as to make a molar ratio of Sr to Ti in the range of $0.95 \leq Sr/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; and a combination of at least one compound containing an Mn atom and at least one compound containing an Si atom, the total amount of said combination being in the range of 0.2 to 5.0 mol % in terms of $MnO_2$ and $SiO_2$, respectively.

8. A laminated semiconductor ceramic capacitor with a grain boundary-insulated structure according to claim 1, wherein said grain boundary insulated semiconductor ceramic comprises as its main component $SrTiO_3$ containing an excess amount of Ti so as to make a molar ratio of Sr to Ti in the range of $0.95 \leq Sr/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; at least one compound containing an Mn atom or an Si atom in the range of 0.2 to 5.0 mol % in terms of $MnO_2$ or $SiO_2$; and at least one compound selected from the group consisting of $Na_2SiO_3$ and $Li_2SiO_3$ in the range of 0.05 to 2.0 mol %.

9. A laminated semiconductor ceramic capacitor with a grain boundary-insulated structure according to claim 1, wherein said grain boundary insulated semiconductor ceramic comprises as its main component $SrTiO_3$ containing an excess amount of Ti so as to make a molar ratio of Sr to Ti in the range of $0.95 \leq Sr/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; at least one compound containing an Mn atom or an Si atom in the range of 0.2 to 5.0 mol % in terms of $MnO_2$ or $SiO_2$; at least one compound selected from the group consisting of $Na_2SiO_3$ and $Li_2SiO_3$ in the range of 0.05 to 2.0 mol %; and $Al_2O_3$ in the range of 0.05 to 2.0 mol %.

10. A laminated semiconductor ceramic capacitor with a grain boundary-insulated structure according to claim 1, wherein said grain boundary insulated semiconductor ceramic comprises as its main component $SrTiO_3$ containing an excess amount of Ti so as to make a molar ratio of Sr to Ti in the range of $0.95 \leq Sr/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; at least one compound containing an Mn atom or an Si atom in the range of 0.2 to 5.0 mol % in terms of $MnO_2$ or $SiO_2$; and at least one compound selected from the group consisting of $NaAlO_2$ and $LiAlO_2$ in the range of 0.05 to 4.0 mol %.

11. A laminated semiconductor ceramic capacitor with a grain boundary-insulated structure according to claim 1, wherein said grain boundary insulated semiconductor ceramic comprises as its main component $Sr_{(1-x)}Ba_xTiO_3$ (where, $0 < x \leq 0.3$) containing an excess amount of Ti so as to make a molar ratio of $Sr_{(1-x)}Ba_x$ to Ti in the range of $0.95 \leq Sr_{(1-x)}Ba_x/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; and at least one compound containing an Mn atom or an Si atom in the range of 0.2 to 5.0 mol % in terms of $MnO_2$ or $SiO_2$.

12. A laminated semiconductor ceramic capacitor with a grain boundary-insulated structure according to claim 1, wherein said grain boundary insulated semiconductor ceramic comprises as its main component $Sr_{(1-x)}Ba_xTiO_3$ (where, $0 < x \leq 0.3$) containing an excess amount of Ti so as to make a molar ratio of $Sr_{(1-x)}Ba_x$ to Ti in the range of $0.95 \leq Sr_{(1-x)}Ba_x/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; at least one compound containing an Mn atom or an Si atom in the range of 0.2 to 5.0 mol % in terms of $MnO_2$ or $SiO_2$; and at least one compound selected from the group consisting of $Na_2SiO_3$ and $Li_2SiO_3$ in the range of 0.05 to 2.0 mol %.

13. A laminated semiconductor ceramic capacitor with a grain boundary-insulated structure according to claim 1, wherein said grain boundary insulated semiconductor ceramic comprises as its main component $Sr_{(1-x)}Ba_xTiO_3$ (where, $0 < x \leq 0.3$) containing an excess amount of Ti so as to make a molar ratio of $Sr_{(1-x)}Ba_x$ to Ti in the range of $0.95 \leq Sr_{(1-x)}Ba_x/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; at least one compound containing an Mn atom or an Si atom in the range of 0.2 to 5.0 mol % in terms of $MnO_2$ or $SiO_2$; at least one compound selected from the group consisting of $Na_2SiO_3$ and $Li_2SiO_3$ in the range of 0.05 to 2.0 mol %; and $Al_2O_3$ in the range of 0.05 to 2.0 mol %.

14. A laminated semiconductor ceramic capacitor with a grain boundary-insulated structure according to claim 1, wherein said grain boundary insulated semiconductor ceramic comprises as its main component $Sr_{(1-x)}Ba_xTiO_3$ (where, $0 < x \leq 0.3$) containing an excess amount of Ti so as to make a molar ratio of $Sr_{(1-x)}Ba_x$ to Ti in the range of $0.95 \leq Sr_{(1-x)}Ba_x/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$ and $CeO_2$ in the range of 0.05 to 2.0 mol %; at least one compound containing an Mn atom or an Si atom in the range of 0.2 to 5.0 mol % in terms of $MnO_2$ or $SiO_2$; and at least one compound selected from the group consisting of $NaAlO_2$ and $LiAlO_2$ in the range of 0.05 to 4.0 mol %.

15. A laminated semiconductor ceramic capacitor with a grain boundary-insulated structure according to claim 1, wherein said grain boundary insulated semiconductor ceramic comprises as its main component $Sr_{(1-x)}Ca_xTiO_3$ (where, $0.001 \leq x \leq 0.2$) containing an excess amount of Ti so as to make a molar ratio of $Sr_{(1-x)}Ca_x$ to Ti in the range of $0.95 \leq Sr_{(1-x)}Ca_x/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; and at least one compound containing an Mn atom or an Si atom in the range of 0.2 to 5.0 mol % in terms of $MnO_2$ or $SiO_2$.

16. A laminated semiconductor ceramic capacitor with a grain boundary-insulated structure according to claim 1, wherein said grain boundary insulated semiconductor ceramic comprises as its main component $Sr_{(1-x)}Ca_xTiO_3$ (where, $0.001 \leq x \leq 0.2$) containing an excess amount of Ti so as to make a molar ratio of $Sr_{(1-)}Ca_x$ to Ti in the range of $0.95 \leq Sr_{(1-x)}Ca_x/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; at least one compound containing an Mn atom or an Si atom in the range of 0.2 to 5.0 mol % in terms of $MnO_2$ or $SiO_2$; and at least one compound selected from the group consisting of $Na_2SiO_3$ and $Li_2SiO_3$ in the range of 0.05 to 2.0 mol %.

17. A laminated semiconductor ceramic capacitor with a grain boundary-insulated structure according to claim 1, wherein said grain boundary insulated semiconductor ceramic comprises as its main component $Sr_{(1-x)}Ca_xTiO_3$ (where, $0.001 \leq x \leq 0.2$) containing an excess amount of Ti so as to make a molar ratio of $Sr_{(1-x)}Ca_x$ to Ti in the range of $0.95 \leq Sr_{(1-x)}Ca_x/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; at least one compound containing an Mn atom or an Si atom in the range of 0.2 to 5.0 mol % in terms of $MnO_2$ or $SiO_2$; at least one compound selected from the group consisting of $Na_2SiO_3$ and $Li_2SiO_3$ in the range of 0.05 to 2.0 mol %; and $Al_2O_3$ in the range of 0.05 to 2.0 mol %.

18. A laminated semiconductor ceramic capacitor with a grain boundary-insulated structure according to claim 1, wherein said grain boundary insulated semiconductor ceramic comprises as its main component $Sr_{(1-x)}Ca_xTiO_3$ (where, $0.001 \leq x \leq 0.2$) containing an excess amount of Ti so as to make a molar ratio of $Sr_{(1-x)}Ca_x$ to Ti in the range of $0.95 \leq Sr_{(1-x)}Ca_x/Ti < 1.00$; at least one compound selected from the group consisting of $Nb_2O_5$, $Ta_2O_5$, $V_2O_5$, $W_2O_5$, $Dy_2O_3$, $Nd_2O_3$, $Y_2O_3$, $La_2O_3$ and $CeO_2$ in the range of 0.05 to 2.0 mol %; at least one compound containing an Mn atom or an Si atom in the range of 0.2 to 5.0 mol % in terms of $MnO_2$ or $SiO_2$; and at least one compound selected from the group consisting of $NaAlO_2$ and $LiAlO_2$ in the range of 0.05 to 4.0 mol %.

19. A method for manufacturing a laminated semiconductor ceramic capacitor with a grain boundary-insulated structure comprising the steps of:
calcinating a mixed powder of a ceramic composition for the formation of a grain boundary-insulated structure in air or in a nitrogen atmosphere;
forming green sheets by dispersing said calcinated powder in a solvent with an organic binder and molding said dispersed powder, said calcinated powder being ground before dispersing and after calcinating;
preparing a mixed powder containing at least one compound containing an atom selected from the group consisting of Li, Na, and K; and Ni or an Ni containing compound;
calcinating said mixed powder in air or in a nitrogen atmosphere to solubilize said compound containing an atom selected from the group consisting of Li, Na, or K into said Ni or an Ni containing compound;
grinding said calcinated mixed powder and mixing in a solvent with an organic binder, resulting in an inner electrode paste;
forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;
laminating and compressing said green sheets with the inner electrode pattern with the uppermost and lowermost green sheets, followed by calcinating the resulting green sheets in air;
sintering said calcinated sheets in a reducing atmosphere, resulting in a sintered ceramic body with inner electrodes;
re-oxidizing said sintered ceramic body in air;
covering the edges of said sintered ceramic sheets with an outer electrode paste, terminals of said inner electrodes being exposed to said edges; and
baking the paste to form outer electrodes so that said inner electrodes are electrically connected to said outer electrodes.

20. A method for manufacturing a laminated semiconductor ceramic capacitor with a grain boundary-insulated structure according to claim 19, wherein said outer electrodes are made of at least one metal selected from the group consisting of Pd, Ag, Cu, Zn, and Ni; an alloy thereof; or a mixture thereof.

21. A method for manufacturing a laminated semiconductor ceramic capacitor with a grain boundary-insulated structure according to claim 19, wherein said outer electrodes are obtained by solubilizing at least one compound containing an atom selected from the group consisting Li, Na, and K; or a combination of at least one compound containing an atom selected from the group consisting of Li, Na, and K and at least one compound containing a Pd atom or a Pt atom into Ni or an Ni containing compound.

22. A method for manufacturing a laminated semiconductor ceramic capacitor with a grain boundary-insulated structure according to claim 19, wherein said outer electrodes are obtained by solubilizing at least one compound containing a Pd atom or a Pt atom into Ni or an Ni containing compound.

23. A method for manufacturing a laminated semiconductor ceramic capacitor with a grain boundary-insulated structure comprising the steps of:
calcinating a mixed powder of ceramic composition for the formation of a grain boundary-insulated structure in air or in a nitrogen atmosphere;
forming green sheets by dispersing said calcinated powder in a solvent with an organic binder and molding said dispersed powder, said calcinated powder being ground before dispersing and after calcinating;
preparing a mixed powder containing at least one compound containing an atom selected from the group consisting of Li, Na, and K; and Ni or an Ni containing compound;
calcinating said mixed powder in air or in a nitrogen atmosphere to solubilize said compound containing an atom selected from the group consisting of Li, Na, or K into said Ni or an Ni containing compound;
grinding said calcinated mixed powder and mixing in a solvent with an organic binder, resulting in an inner electrode paste;
forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;
laminating and compressing said green sheets with the inner electrode pattern with the uppermost and lowermost green sheets, followed by calcinating the resulting green sheets in air;
raising the temperature of said calcinated sheets to a temperature in the range from 1,000° to 1,200° C. in a nitrogen atmosphere and sintering said calcinated sheets in a reducing atmosphere, resulting in a sintered ceramic body with inner electrodes;
re-oxidizing said sintered ceramic body in air;
covering the edges of said sintered ceramic body with an outer electrode paste, terminals of said inner electrodes being exposed to said edges, and
baking the paste to form outer electrodes so that said inner electrodes are electrically connected to said outer electrodes.

24. A method for manufacturing a laminated semiconductor ceramic capacitor with a grain boundary-insulated structure comprising the steps of:
calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, or K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets;

covering the edges of said green sheets with an outer electrode paste, terminals of said inner electrodes being exposed to said edges, followed by calcinating the resulting green sheets in air;

sintering said calcinated sheets in a reducing atmosphere, resulting in a sintered ceramic body with inner and outer electrodes;

re-oxidizing said sintered ceramic body in air; and re-reducing said outer electrodes.

25. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets and covering the edges of said green sheets with an outer electrode paste, terminals of the inner electrodes being exposed to said edges, followed by calcinating the resulting green sheets in air;

raising the temperature of said calcinated sheets to a temperature in the range from 1,000° to 1,200° C. in a nitrogen atmosphere and sintering said calcinated laminated sheets in a reducing atmosphere, resulting in a sintered ceramic body with inner and outer electrodes;

re-oxidizing said sintered ceramic body in air; and re-reducing said outer electrodes.

26. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets, followed by calcinating the resulting green sheets in air;

covering the edges of said calcinated ceramic sheets with an outer electrode paste, terminals of said inner electrodes being exposed to said edges, and sintering said calcinated ceramic sheets in a reducing atmosphere, resulting in a sintered ceramic body with inner and outer electrodes;

re-oxidizing said sintered ceramic body in air; and re-reducing said outer electrodes.

27. A method for manfacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets, followed by calcinating the resulting green sheets in air;

covering the edges of said calcinated ceramic sheets with an outer electrode paste, terminals of said inner electrodes being exposed to said edges;

raising the temperature of said calcinated sheets to a temperature in the range from 1,000° to 1,200° C. in a nitrogen atmosphere and sintering said calcinated sheets in a reducing atmosphere, resulting in a sintered ceramic body with inner and outer electrodes;

re-oxidizing said sintered ceramic body in air; and re-reducing said outer electrodes.

28. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets and covering the edges of said green sheets with a lower layer outer electrode paste, terminals of said inner electrodes being exposed to said edges, followed by calcinating said green sheets;

sintering said calcinated sheets in a reducing atmosphere, resulting in a sintered ceramic body with inner electrodes and lower layer outer electrodes;

applying an upper layer outer electrode paste containing Ag or a mixture of Ag and Pd on said lower layer outer electrodes; and baking said upper layer outer electrode paste in air or in a nitrogen atmosphere to form upper layer outer electrodes on the lower layer outer electrodes.

29. A method for manufacturing a laminated semiconductor ceramic capacitor with a grain boundary-insulated structure according to claim 28, wherein said lower layer outer electrodes are obtained by solubilizing at least one compound containing an atom selected from the group consisting of Li, Na, and K; or a combination of at least one compound containing an atom selected from the group consisting of Li, Na, and K and at least one compound containing a Pd atom or a Pt atom into Ni or an Ni containing compound.

30. A method for manufacturing a laminated semiconductor ceramic capacitor with a grain boundary-insulated structure according to claim 28, wherein said lower layer outer electrodes are obtained by solubilizing at least one compound containing a Pd atom or a Pt atom into Ni or an Ni containing compound.

31. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets and covering the edges of said green sheets with a lower layer outer electrode paste, terminals of said inner electrodes being exposed to said edges, followed by calcinating said green sheets;

raising the temperature of said calcinated laminated sheets to a temperature in the range from 1,000° to 1,200° C. in a nitrogen atmosphere and sintering said calcinated sheets in a reducing atmosphere, resulting in a sintered ceramic body with inner electrodes and lower layer outer electrodes;

applying an upper layer outer electrode paste containing Ag or a mixture of Ag and Pd on said lower layer outer electrodes; and baking said upper layer electrode paste in air or in a nitrogen atmosphere to form upper layer outer electrodes on the lower layer outer electrodes in air or in a nitrogen atmosphere.

32. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets and covering the edges of said green sheets with a lower layer outer electrode paste containing Ni, terminals of said inner electrodes being exposed to said edges, followed by calcinating said green sheets;

sintering said calcinated green sheets in a reducing atmosphere, resulting in a sintered ceramic body with inner electrodes and lower layer outer electrodes;

re-oxidizing said sintered ceramic body in air;

re-reducing said lower layer outer electrodes;

applying an upper layer outer electrode paste containing Ag or a mixture of Ag and Pd on said lower layer outer electrodes; and baking said upper layer electrode paste to form upper layer outer electrodes on the lower layer outer electrodes in air or in a nitrogen atmosphere.

33. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets and covering the edges of said green sheets with a lower layer outer electrode paste containing Ni, terminals of said inner electrodes being exposed to said edges, followed by calcinating said green sheets;

raising the temperature of said calcinated sheets to a temperature in the range from 1,000° to 1,200° C. in a nitrogen atmosphere and sintering said calcinated sheets in a reducing atmosphere, resulting in a sintered ceramic body with inner electrodes and lower layer outer electrodes;

re-oxidizing said sintered ceramic body in air;

re-reducing said lower layer outer electrodes;

applying an upper layer outer electrode paste containing Ag or a mixture of Ag and Pd on said lower layer outer electrodes; and baking said upper layer electrode paste to form upper layer outer electrodes on the lower layer outer electrodes in air or in a nitrogen atmosphere.

34. A method for manufacturing a laminated semiconductor ceramic capacitor with a grain boundary-insulated structure comprising the steps of:

calcinating a mixed powder of ceramic semiconductor composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets and covering the edges of said green sheets with a lower layer outer electrode paste, terminals of said inner electrodes being exposed to said edges, followed by calcinating said green sheets;

sintering said calcinated sheets in a reducing atmosphere;

re-oxidizing said sintered sheets in air;

applying an upper layer outer electrode paste containing Ag or a mixture of Ag and Pd on said lower layer outer electrodes;

re-reducing said sheets with inner electrodes and lower outer electrodes on which said upper layer outer electrode paste is applied; and heat-treating said re-reduced sheets in air to from upper layer outer electrodes on the lower layer outer electrodes.

35. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets and covering the edges of said green sheets with a lower layer outer electrode paste, terminals of the inner electrodes being exposed to said edges, followed by calcinating said green sheets;

raising the temperature of said calcinated laminated sheets to a temperature in the range from 1,000° to 1,200° C. in a nitrogen atmosphere and sintering said calcinated sheets in a reducing atmosphere, resulting in a sintered ceramic body with inner electrodes and lower layer outer electrodes;

re-oxidizing said sintered ceramic body in the air;

applying an upper layer outer electrode paste containing Ag or a mixture of Ag and Pd on said lower layer outer electrodes;

re-reducing said sintered ceramic body with inner electrodes and lower outer electrodes on which said upper layer outer electrode paste is applied: and heat-treating said re-reduced ceramic body in air to form upper layer outer electrodes on the lower layer outer electrodes.

36. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets, followed by calcinating said green sheets in air;

covering the edges of said calcinated sheets with a lower layer outer electrode paste, terminals of said inner electrodes being exposed to said edges, and sintering said calcinated sheets in a reducing atmosphere;

applying an upper layer outer electrode paste containing Ag or a mixture of Ag and Pd on said lower layer outer electrodes; and baking said upper layer outer electrode paste to form upper layer outer electrodes on the lower layer outer electrodes in air or in a nitrogen atmosphere.

37. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets, followed by calcinating the resulting green sheets in air;

covering the edges of said green sheets with a lower layer outer electrode paste, terminals of said inner electrodes being exposed to said edges, and raising the temperature of said calcinated laminated sheets to a temperature in the range from 1,000° to 1,200° C. in a nitrogen atmosphere, followed by sintering said calcinated laminated sheets in a reducing atmosphere, resulting in a sintered ceramic body with inner electrodes and lower layer outer electrodes;

applying an upper layer outer electrode paste containing Ag or a mixture of Ag and Pd on said lower layer outer electrodes; and baking said upper layer outer electrode paste to form upper layer outer electrodes on the lower layer electrodes in air or in a nitrogen atmosphere.

38. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets, followed by calcinating the resulting green sheets in air;

covering the edges of said green sheets with a lower layer outer electrode paste, terminals of the inner electrodes being exposed to said edges, followed by sintering said green sheets in a reducing atmosphere to obtain a sintered ceramic body with inner electrodes and lower layer outer electrodes;

re-oxidizing said sintered ceramic body in air;

re-reducing said re-oxidized sintered ceramic body;

applying an upper layer outer electrode paste containing Ag or a mixture of Ag and Pd on said lower layer outer electrodes; and baking said upper layer outer electrode paste to form upper layer outer electrodes on the lower layer outer electrodes in air or in a nitrogen atmosphere.

39. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets, followed by calcinating the resulting green sheets in air;

covering the edges of said calcinated sheets with a lower layer outer electrode paste, terminals of the inner electrodes being exposed to said edges, followed by raising the temperature of said calcinated sheets to a temperature in the range from 1,000° to 1,200° C., followed by sintering in a reducing atmosphere to obtain a sintered ceramic body with inner electrodes and lower layer outer electrodes;

re-oxidizing said sintered ceramic body in air;

re-reducing said sintered and re-oxidized ceramic body;

applying an upper layer outer electrode paste containing Ag or a mixture of Ag and Pd on said lower layer outer electrodes; and baking said upper layer outer electrode paste to form upper layer outer electrodes on the lower layer outer electrodes in air or in a nitrogen atmosphere.

40. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets, followed by calcinating the resulting green sheets in air;

covering the edges of said green sheets with a lower layer outer electrode paste, terminals of the inner electrodes being exposed to said edges, followed by sintering said green sheets in a reducing atmosphere to obtain a sintered ceramic body with inner electrodes and lower layer outer electrodes;

re-oxidizing said sintered ceramic body in air;

applying an upper layer outer electrode paste containing Ag or a mixture of Ag and Pd on said lower layer outer electrodes;

re-reducing said sintered and re-oxidized ceramic body; and heat-treating said sintered re-oxidized, and re-reduced ceramic body in air.

41. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets, followed by calcinating the resulting green sheets in air;

covering the edges of said green sheets with a lower layer outer electrode paste, terminals of the inner electrodes being exposed to said edges, and raising the temperature of said green sheets to a temperature in the range from 1,000° to 1,200° C. in a nitrogen atmosphere, followed by sintering in a reducing atmosphere to obtain a sintered ceramic body with inner electrodes and lower layer outer electrodes;

re-oxidizing said sintered ceramic body in the air;

applying an upper layer outer electrode paste containing Ag or a mixture of Ag and Pd on said lower layer outer electrodes;

re-reducing said sintered and re-oxidized ceramic body; and heat-treating said sintered, re-oxidized, and re-reduced ceramic body in air.

42. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets, followed by calcinating the resulting green sheets in air;

sintering said green sheets in a reducing atmosphere, resulting in a sintered ceramic body;

re-oxidizing said sintered ceramic body in air;

covering the edges of said sintered ceramic body with a lower layer outer electrode paste, terminals of the inner electrodes being exposed to said edges, and baking said lower layer outer electrode paste in a reducing or in a nitrogen atmosphere;

applying an upper layer outer electrode paste containing Ag or a mixture of Ag and Pd on said lower layer outer electrodes; and baking said upper layer electrode paste to form upper layer outer electrodes on the lower layer outer electrodes in air or in a nitrogen atmosphere.

43. A method for manufacturing a laminated semiconductor ceramic capacitor with a grain boundary-insulated structure comprising the steps of:

calcinating a mixed powder of ceramic composition for the formation of a grain boundary-insulated structure in air or in a nitrogen atmosphere;

forming green sheets by dispersing said calcinated powder in a solvent with an organic binder and molding said dispersed powder, said calcinated powder being ground before dispersing and after calcinating;

preparing a mixed powder containing at least one compound containing an atom selected from the group consisting of Li, Na, and K; and Ni or an Ni containing compound;

calcinating said mixed powder in air or in a nitrogen atmosphere to solubilize said compound containing an atom selected from the group consisting of Li, Na, and K into said Ni or an Ni containing compound;

grinding said calcinated mixed powder and mixing in a solvent with an organic binder, resulting in an inner electrode paste;

forming an inner electrode pattern by the application of said inner electrode paste on one surface of each of said green sheets except for the uppermost and lowermost sheets, terminals of said inner electrodes being extended to reach the corresponding opposite edges of said green sheets alternatively one by one;

laminating and compressing said green sheets with the inner electrode pattern with the uppermost and lowermost green sheets, followed by calcinating the resulting green sheets in air;

raising the temperature of said green sheets to a temperature in the range from 1,000° to 1,200° C. and sintering said green sheets in a reducing atmosphere, resulting in a sintered ceramic body;

oxidizing said sintered ceramic body in air;

covering the edges of said sintered ceramic body with a lower layer outer electrode paste, terminals of the inner electrodes being exposed to said edges, and baking said lower layer outer electrode paste in a reducing or in a nitrogen atmosphere;

applying an upper layer outer electrode paste containing Ag or a mixture of Ag and Pd on said lower layer outer electrodes; and baking said upper layer outer electrode paste to form upper layer outer electrodes on the lower layer outer electrodes in air or in a nitrogen atmosphere.

* * * * *

UNITED STATES PATENT AND TRADEMARK OFFICE
CERTIFICATE OF CORRECTION

PATENT NO. : 5,166,859
DATED : November 24, 1992
INVENTOR(S) : Iwao Ueno et al.

It is certified that error appears in the above-identified patent and that said Letters Patent is hereby corrected as shown below:

In Column 2, lines 38-39, "54-53250 and 54-54250" should read --54-53248 and 54-53250--;

In Column 52, line 22, "$Y_2O_3$ and $CeO_2$" should read --$Y_2O_3$, $La_2O_3$ and $CeO_2$--; In Column 52; line 47, "$Sr_{(1-)} Ca_x$" should read --$Sr_{(1-x)} Ca_x$--.

Signed and Sealed this

First Day of February, 1994

Attest:

BRUCE LEHMAN

Attesting Officer   Commissioner of Patents and Trademarks